US012081035B2

(12) United States Patent
Haug et al.

(10) Patent No.: US 12,081,035 B2
(45) Date of Patent: Sep. 3, 2024

(54) DOCKING STATIONS WITH HINGED CHARGING PUCK

(71) Applicant: Apple Inc., Cupertino, CA (US)

(72) Inventors: Grant S. Haug, Mountain View, CA (US); Christopher S. Graham, San Francisco, CA (US); Paul J. Thompson, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 445 days.

(21) Appl. No.: 17/472,497

(22) Filed: Sep. 10, 2021

(65) Prior Publication Data

US 2022/0094201 A1 Mar. 24, 2022

Related U.S. Application Data

(60) Provisional application No. 63/082,183, filed on Sep. 23, 2020.

(51) Int. Cl.

| | |
|---|---|
| ***H02J 50/00*** | (2016.01) |
| ***H02J 7/00*** | (2006.01) |
| ***H02J 50/10*** | (2016.01) |
| ***H02J 50/70*** | (2016.01) |
| ***H02J 50/90*** | (2016.01) |

(52) U.S. Cl.
CPC .......... *H02J 50/005* (2020.01); *H02J 7/0044* (2013.01); *H02J 50/10* (2016.02); *H02J 50/70* (2016.02); *H02J 50/90* (2016.02)

(58) Field of Classification Search
CPC .................................................... H02J 50/005
USPC ......................................................... 320/108
See application file for complete search history.

(56) References Cited

U.S. PATENT DOCUMENTS

| | | | |
|---|---|---|---|
| 6,888,940 | B1 | 5/2005 | Deppen |
| 8,073,324 | B2 | 12/2011 | Tsai |
| 8,558,411 | B2 | 10/2013 | Baarman |
| 8,688,037 | B2 | 4/2014 | Chatterjee et al. |
| 8,907,752 | B2 | 12/2014 | Wodrich et al. |

(Continued)

FOREIGN PATENT DOCUMENTS

| | | | |
|---|---|---|---|
| CN | 104467129 | A | 3/2015 |
| CN | 205670700 | U | 11/2016 |

(Continued)

*Primary Examiner* — Edward Tso
*Assistant Examiner* — Ahmed H Omar
(74) *Attorney, Agent, or Firm* — Kilpatrick Townsend & Stockton LLP

(57) ABSTRACT

Charging devices that can securely hold an electronic device in a useful position, fold into a compact shape, and provide power to the electronic device. One example can provide a wireless charger that can include a wireless charging assembly, a base, and a hinge connecting the wireless charging assembly to the base. When opened, the wireless charging assembly can be positioned upright relative to the base such that an electronic device being charged by the wireless charging assembly can be maintained in an upright position for easy viewing. The wireless charging assembly can be rotated, folded, or otherwise closed into a cavity or passage in the base, which can provide for easy transport. The hinge can be configured to readily open for use, while providing increased friction to resist closing. This increased friction can help the charger to securely hold the electronic device in place while charging.

20 Claims, 58 Drawing Sheets

100
200
220
210
310
400
320
300

(56) References Cited

U.S. PATENT DOCUMENTS

| | | | | |
|---|---|---|---|---|
| 8,912,686 | B2 | 12/2014 | Stoner et al. | |
| 9,038,971 | B1 | 5/2015 | Guthrie | |
| 9,106,083 | B2 | 8/2015 | Partovi | |
| 9,112,364 | B2 | 8/2015 | Partovi | |
| 9,413,191 | B2 | 8/2016 | Kim et al. | |
| 9,577,467 | B1 * | 2/2017 | Karanikos | H02J 50/005 |
| 9,627,130 | B2 | 4/2017 | Golko et al. | |
| 10,153,666 | B2 | 12/2018 | Lee et al. | |
| 10,243,402 | B2 | 3/2019 | Park et al. | |
| 10,273,942 | B2 | 4/2019 | Nakamura | |
| 10,298,037 | B2 | 5/2019 | Wang et al. | |
| 10,404,089 | B2 | 9/2019 | Kasar et al. | |
| 10,418,839 | B2 | 9/2019 | Miller | |
| 10,491,041 | B2 | 11/2019 | Wittenberg et al. | |
| 10,622,842 | B2 | 4/2020 | Lee et al. | |
| 11,342,800 | B2 | 5/2022 | Oro et al. | |
| 11,689,038 | B2 * | 6/2023 | Patel | H02J 7/0044 320/108 |
| 2009/0212637 | A1 | 8/2009 | Baarman et al. | |
| 2009/0278642 | A1 | 11/2009 | Fullerton et al. | |
| 2010/0081377 | A1 | 4/2010 | Chatterjee et al. | |
| 2012/0068942 | A1 | 3/2012 | Lauder | |
| 2012/0112553 | A1 | 5/2012 | Stoner, Jr. et al. | |
| 2012/0146576 | A1 | 6/2012 | Partovi | |
| 2012/0306440 | A1 | 12/2012 | Yeh | |
| 2013/0099730 | A1 | 4/2013 | Yoon | |
| 2013/0113423 | A1 | 5/2013 | Baarman | |
| 2013/0187596 | A1 | 7/2013 | Eastlack | |
| 2013/0260677 | A1 | 10/2013 | Partovi | |
| 2014/0242429 | A1 | 8/2014 | Lee | |
| 2016/0094076 | A1 | 3/2016 | Kasar et al. | |
| 2016/0105047 | A1 | 4/2016 | Cui | |
| 2016/0128210 | A1 | 5/2016 | Lee | |
| 2016/0206065 | A1 | 7/2016 | Ehrlich | |
| 2017/0005399 | A1 | 1/2017 | Ito et al. | |
| 2017/0070076 | A1 | 3/2017 | Karanikos | |
| 2017/0245040 | A1 | 8/2017 | Hankey | |
| 2018/0248406 | A1 | 8/2018 | Bae et al. | |
| 2018/0301936 | A1 | 10/2018 | Lee et al. | |
| 2019/0089188 | A1 | 3/2019 | Chien et al. | |
| 2019/0198212 | A1 | 6/2019 | Levy | |
| 2019/0363565 | A1 | 11/2019 | Graham et al. | |
| 2020/0346006 | A1 | 11/2020 | Eigentler et al. | |
| 2021/0099026 | A1 | 4/2021 | Larsson | |
| 2021/0099027 | A1 | 4/2021 | Larsson | |
| 2022/0014655 | A1 | 1/2022 | Hu | |

FOREIGN PATENT DOCUMENTS

| | | | |
|---|---|---|---|
| CN | 106877429 | A | 6/2017 |
| CN | 207442540 | U | 6/2018 |
| CN | 208581077 | U | 3/2019 |
| EP | 0823717 | A2 | 2/1998 |
| JP | 2013120837 | A | 6/2013 |
| JP | 3197750 | U | 5/2015 |
| JP | 2015171166 | A | 9/2015 |
| JP | 6233504 | B2 | 11/2017 |
| TW | M414057 | U | 10/2011 |
| TW | 201347349 | A | 11/2013 |
| TW | 201711335 | A | 3/2017 |
| WO | 2010129369 | A2 | 11/2010 |
| WO | 2011156768 | A2 | 12/2011 |
| WO | 2016053633 | A1 | 4/2016 |

* cited by examiner

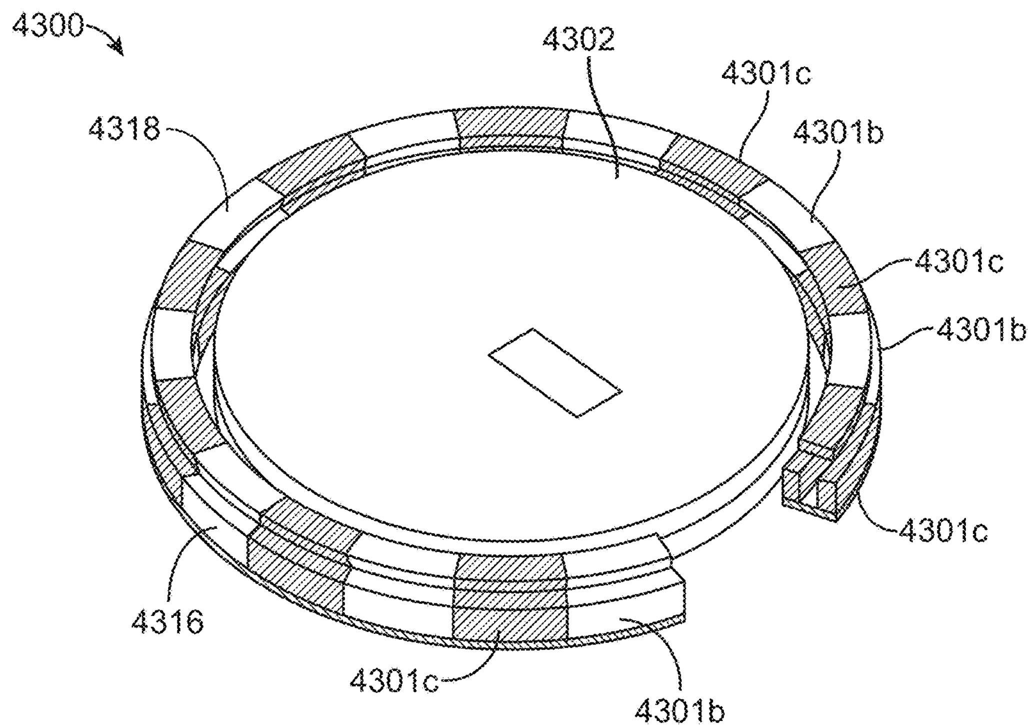
FIG. 43A
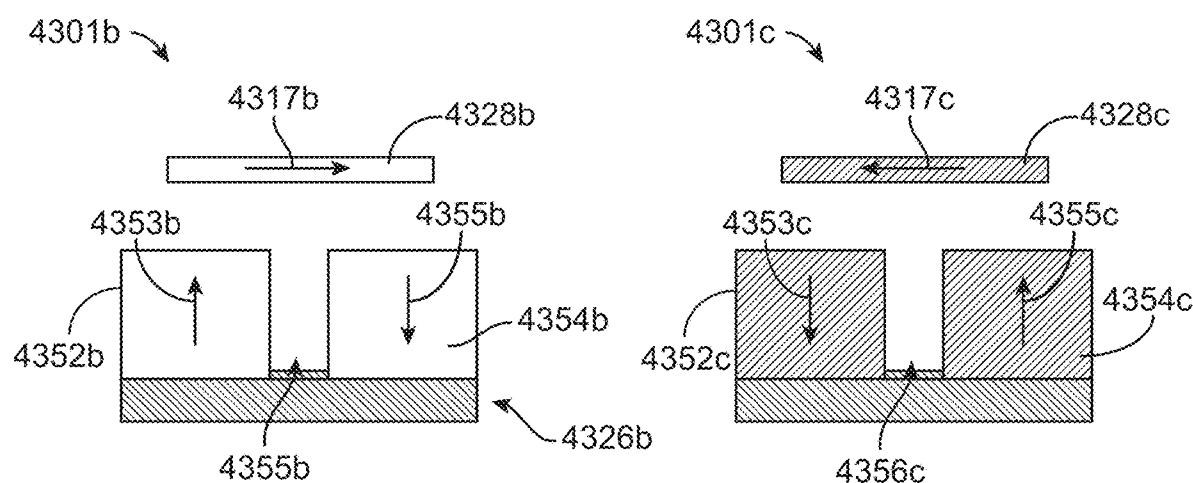
FIG. 43B
FIG. 43C 4600
4610
4640
4650
4612

4600
4612
4640
4650
4660

4600
4610
4620
4630
4612

DOCKING STATIONS WITH HINGED CHARGING PUCK

CROSS-REFERENCES TO RELATED APPLICATIONS

The present application claims the benefit of and priority to U.S. Provisional Application No. 63/082,183, filed Sep. 23, 2020, which is incorporated by reference.

BACKGROUND

Electronic devices have become ubiquitous over the past several years. We take them wherever we go. An electronic device can be integral to some of our actives, such as checking email, watching a video, or catching up on news. An electronic device can also be a supplement to some of our activities, such as when providing email updates or acting as a meeting reminder.

These electronic devices need to be charged periodically. Every so often, a cable needs to be inserted into the electronic device, or the electronic device needs to be put on a wireless charging pad or other surface, in order to charge a battery internal to or otherwise associated with the electronic device.

It can also be desirable to continue to use the electronic device while it is being charged. Accordingly, it can be desirable to provide chargers that can hold an electronic device in a useful position while the charger charges the battery of the electronic device. That is, it can be desirable that the charger hold the electronic device in an upright position such that a screen of the electronic device can be seen during charging. This can allow an electronic device to be used for watching videos, for viewing meeting reminders, and for other electronic device interactions during charging.

This charging can take place in various locations, for example, at work, in coffee shops, hotel rooms, and other locations. As a result, it can be desirable to bring these chargers along. To facilitate this, it can be desirable that the chargers fold up or otherwise close into a compact arrangement.

But electronic devices do have mass associated with them. It could be unfortunate if the weight of an electronic device caused a charger to inadvertently fold up or close while the electronic device was being charged. Accordingly, it can be desirable that a charger hold an electronic device securely in place while charging.

Thus, what is needed are charging devices that can securely hold an electronic device in a useful position, fold into a compact shape, and provide charging power to the electronic device.

SUMMARY

Accordingly, embodiments of the present invention can provide charging devices that can securely hold an electronic device in a useful position, fold into a compact shape, and provide charging power to the electronic device.

An illustrative embodiment of the present invention can provide a wireless charger for the wireless charging of an electronic device. The wireless charger can include a wireless charging assembly, a base, and a hinge connecting the wireless charging assembly to the base. The wireless charging assembly can wirelessly provide power to the electronic device. When the wireless charger is open, the wireless charging assembly can be positioned upright relative to the base such that an electronic device being charged by the wireless charging assembly can be maintained in an upright position for easy viewing. When the wireless charger is closed, the wireless charging assembly can be rotated, folded, or otherwise closed into a cavity or passage in the base. The resulting compact form factor can provide for easy transport. The hinge can be configured to allow the wireless charger to readily open for use, but can provide increased friction to resist closing. This increased friction can help the wireless charger to securely hold the electronic device in an upright position while charging.

These and other embodiments of the present invention can provide a wireless charger that includes a wireless charging assembly having a housing that includes a cap over an enclosure. The cap can include a high-friction or high-stiction surface that can increase a shear force needed to remove an electronic device from the charger. The cap can be at least partially adhesive to increase a normal force necessary to remove the electronic device from the charger. The cap can be formed of a rigid layer covered by a high-friction layer. For example, the cap can be formed of a polycarbonate layer covered by a softer, silicone layer. The cap can be formed using a double-shot molding process. The enclosure can be formed of aluminum, stainless steel, or other material. The enclosure can be formed by computer-numerically controlled (CNC) machining, metal-injection-molding, stamping, forging, by using a deep-draw process, or other technique.

The wireless charging assembly can include one or more magnets that can magnetically attract a corresponding one or more magnets in an electronic device in order to hold the electronic device in place in against the cap of the wireless charging assembly. The wireless charging assembly can include a magnet array that can magnetically attract a corresponding magnet array in an electronic device in order to hold the electronic device in place in against the cap of the wireless charging assembly. The magnet array can include a number of arcuate magnetic segments arranged in a circular, or partially circular configuration. The magnets can be fixed in position in the wireless charging assembly. This fixed position can be away from the cap in the enclosure to prevent accidental erasure of magnetic data, for example data on credit cards or transit passes. The magnetic field can be increased as the electronic device is or is about to be attached to the wireless charger. For example, an electro-magnet can be used to increase the magnetic field. Also or instead, the one or more magnets or magnet array can move towards the cap of the wireless charging assembly as the electronic device is or is about to be connected to the wireless charger. The use of an electro-magnet or moving one or more magnets or magnet array can improve the wireless charger's capacity to securely hold the electronic device in place during charging while limiting stray magnetic flux when an electronic device is not attached to the wireless charging assembly.

The wireless charging assembly can further include a coil and control electronics for charging a battery in or associated with an electronic device. The control electronics can receive power, for example from a connector on the wireless charger, via a tethered cable that terminates in the wireless charger, or from a battery or other power source in or associated with the wireless charger. The control electronics can use the received power to generate a current in the coil. The control electronics can modulate the current in the coil in the wireless charging assembly to generate a time-varying magnetic field. This time-varying magnetic field can induce a current in a corresponding coil in the electronic device. The current in the corresponding coil can be used to charge a battery in or associated with the electronic device. Similarly, data can be sent from the wireless charger to the electronic device. The control electronics can modulate the current in the coil in the wireless charging assembly to transmit data. This modulation can be in phase, frequency, amplitude, or other parameter or combination thereof. The resulting modulated flux can induce currents in a corresponding coil in the electronic device, which the electronic device can read as data.

Data can similarly be transmitted from the electronic device to the wireless charger. The coil in the wireless charging assembly can receive a time-varying magnetic field generated by the corresponding coil in the electronic device. This time-varying magnetic field can be a modulated magnetic field that can be used to convey data from the electronic device to the wireless charger. This modulation can be in phase, frequency, amplitude, or other parameter or combination thereof.

A ferrite shield can be included in the wireless charging assembly. The shield can be located behind and partially around the coil to direct the time-varying magnetic field and to improve coupling to the corresponding coil. Additional ferritic material (a ferrite filler) can be shaped around the control electronics to further direct the magnetic field and improve shielding. An e-shield can be placed over the coil, between the coil and the cap of the wireless charging assembly. The e-shield can be formed of a layer of copper or other conductive material to intercept electric fields between the coil in the wireless charging assembly and a corresponding coil in the electronic device. The e-shield can have a low magnetic permeability to pass magnetic fields between the coil and the corresponding coil. The e-shield can include breaks to prevent the formation of eddy currents.

The wireless charging assembly can further include identification components that an electronic device can use to determine that it is attached to a wireless charger. Once the wireless charger is identified, the electronic device can determine charging capabilities and other information about the wireless charger. The identification components can be near-field communication circuits or components, for example, a tag, a loop, and one or more capacitors.

These and other embodiments of the present invention can provide a wireless charger that includes a base to support a wireless charging assembly. The base can include a passage that the wireless charging assembly can fold up or close into. The base can be formed of aluminum, stainless steel, or other material. The base can be formed by CNC machining, metal-injection-molding, stamping, forging, by using a deep-draw process, or other technique. The base can rest on a foot that can be formed of plastic, silicone, or other non-marring material to protect desks and other surfaces on which the wireless charger can reside.

These and other embodiments of the present invention can provide a wireless charger that includes a hinge to attach a wireless charging assembly to the base. The hinge can include a stem having a sleeve. The sleeve can include a cylindrical opening at a first end and a cylindrical opening at a second end. The sleeve can further include one or more other openings for routing a wire internally from a connector, which can be located on the base, to the control electronics housed in the wireless charging assembly. The stem can further include a joining portion having a first end attached to the sleeve and a second end attached to the wireless charging assembly. The hinge can include a first support block attached to the base and having a slot and a second support block attached to the base and having a slot. A first cylindrical shaft can have a first end inserted into the opening at the first end of the sleeve. A second end of the first shaft can be supported by the first support block. A second cylindrical shaft can have a first end inserted into the opening at the second end of the sleeve. A second end of the second shaft can be supported by the second support block. The hinge can further include a first clip having a loop portion around the first shaft and a tab attached to a first end of the loop portion, where the tab is in the slot in the first support block, and a second clip having a loop portion around the second shaft and a tab attached to a first end of the loop portion, the tab in the slot in the second support block.

The hinge can allow the wireless charging assembly to be movable between down position in which the wireless charging assembly is disposed within the passage of the base and an up position in which the wireless charging assembly extends outside the base. As the wireless charging assembly moves from the down position to the up position, the loop portion of the first clip can loosen around the first shaft and the loop portion of the second clip can loosen around the second shaft. This can help the wireless charger to easily open for use. Conversely, as the wireless charging assembly moves from the up position to the down position, the loop portion of the first clip can tighten around the first shaft and the loop portion of the second clip can tighten around the second shaft. This can help the wireless charger to stay open and to more securely hold an electronic device in an upright position during charging.

These and other embodiments of the present invention can include other friction mechanisms in the hinge. For example, one or more wrapped springs can be used where a first end of a wrapped spring can attach to a support block while the remaining portion can be wrapped around a shaft. The wrapped springs can tighten around the shaft when the wireless charging assembly moves from the up position to the down position, thereby providing a resistance to the wireless charger closing and enabling the wireless charger to hold an electronic device in an upright position. The wrapped springs can loosen around the shaft when the wireless charging assembly moves from the down position to the up position, thereby allowing the wireless charger to readily open.

These and other embodiments of the present invention can include other friction mechanisms in the hinge. For example, a hinge can include a shaft including a plurality of lengthwise slots. A plurality of bearings can be positioned such that each bearing is located in one of the slots in the shaft. Each bearing can be biased, for example by a spring. As the shaft rotates in a first direction, the bearings can be pushed against their springs allowing the shaft to rotate. This can allow a wireless charger to easily open. As the shaft rotates in a second direction, the bearings can interfere with an inside surface of the sleeve of the stem, thereby increasing a resistance to rotation. This can provide resistance to the wireless charger closing and can enable the wireless charger to hold an electronic device in an upright position.

Portions of these hinges can be formed of aluminum, stainless steel, or other material. The hinges can be formed by CNC machining, metal-injection-molding, stamping, forging, by using a deep-draw process, or other technique.

These and other embodiments of the present invention can include features that can help to ensure that a wireless charger properly closes such that a top surface of a wireless charging assembly is properly aligned with a top surface of a base. In one example, a stop can be attached to a sleeve of a stem in a hinge. Specifically, the wireless charger can be properly closed. The stop can be soldered, or spot or laser-welded to the sleeve and against a surface of the base. In this way, as the wireless charger is closed, the stop can bottom out against the base ensuring that the wireless charger is properly closed. In these and other embodiments of the present invention, magnets, steps, and other features can be used to ensure that a wireless charger properly closes.

Various embodiments of the present invention can incorporate one or more of these and the other features described herein. A better understanding of the nature and advantages of the present invention can be gained by reference to the following detailed description and the accompanying drawings.

BRIEF DESCRIPTION OF THE DRAWINGS

FIG. 40B shows an axial cross-section view through a portion of the system of FIG. 40A, while

FIG. 43A shows a perspective view of a magnetic alignment system according to some embodiments, and FIGS. 43B and 43C show axial cross-section views through different portions of the system of FIG. 43A;

DESCRIPTION OF ILLUSTRATIVE EMBODIMENTS

Figure 1:
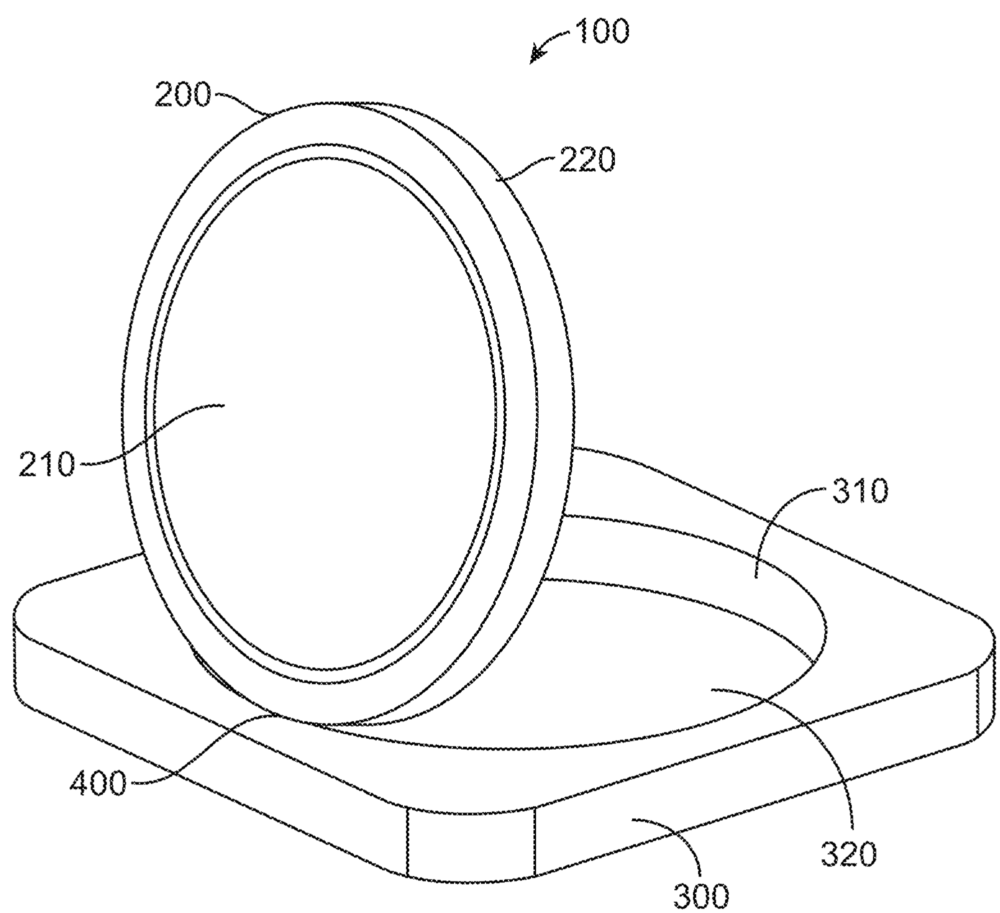
FIG. 1 illustrates a wireless charger according to an embodiment of the present invention.

FIG. 1 illustrates a wireless charger according to an embodiment of the present invention. Wireless charger 100 can include a wireless charging assembly 200, base 300, and hinge 400. Wireless charging assembly 200 can include cap 210 and enclosure 220. Base 300 can include a passage 320 defining interior sidewall 310. Wireless charging assembly 200 can be attached to base 300 by hinge 400.

Wireless charging assembly 200 can rotate relative to base 300 along hinge 400. Wireless charging assembly 200 can be in an up position as shown, where wireless charging assembly 200 is positioned outside of base 300. In this configuration, wireless charger 100 can be open. Wireless charging assembly 200 can move to a down or closed position, or wireless charging assembly 200 is positioned in passage 320 of base 300. In this configuration, wireless charger 100 can be closed.

An electronic device (not shown) can securely be held by wireless charger 100 at cap 210. Wireless charging assembly 200 can be tilted or repositioned relative to base 300 such that a screen (not shown) of the electronic device can be positioned at a proper angle for viewing. For example, wireless charging assembly 200 can be positioned 90 degrees relative to base 300. Wireless charging assembly 200 can be positioned 80-90 degrees relative to base 300. Wireless charging assembly 200 can be positioned 70-85 degrees relative to base 300. Wireless charging assembly 200 can be positioned at another angle or through a range of angles relative to base 300.

Figure 2:
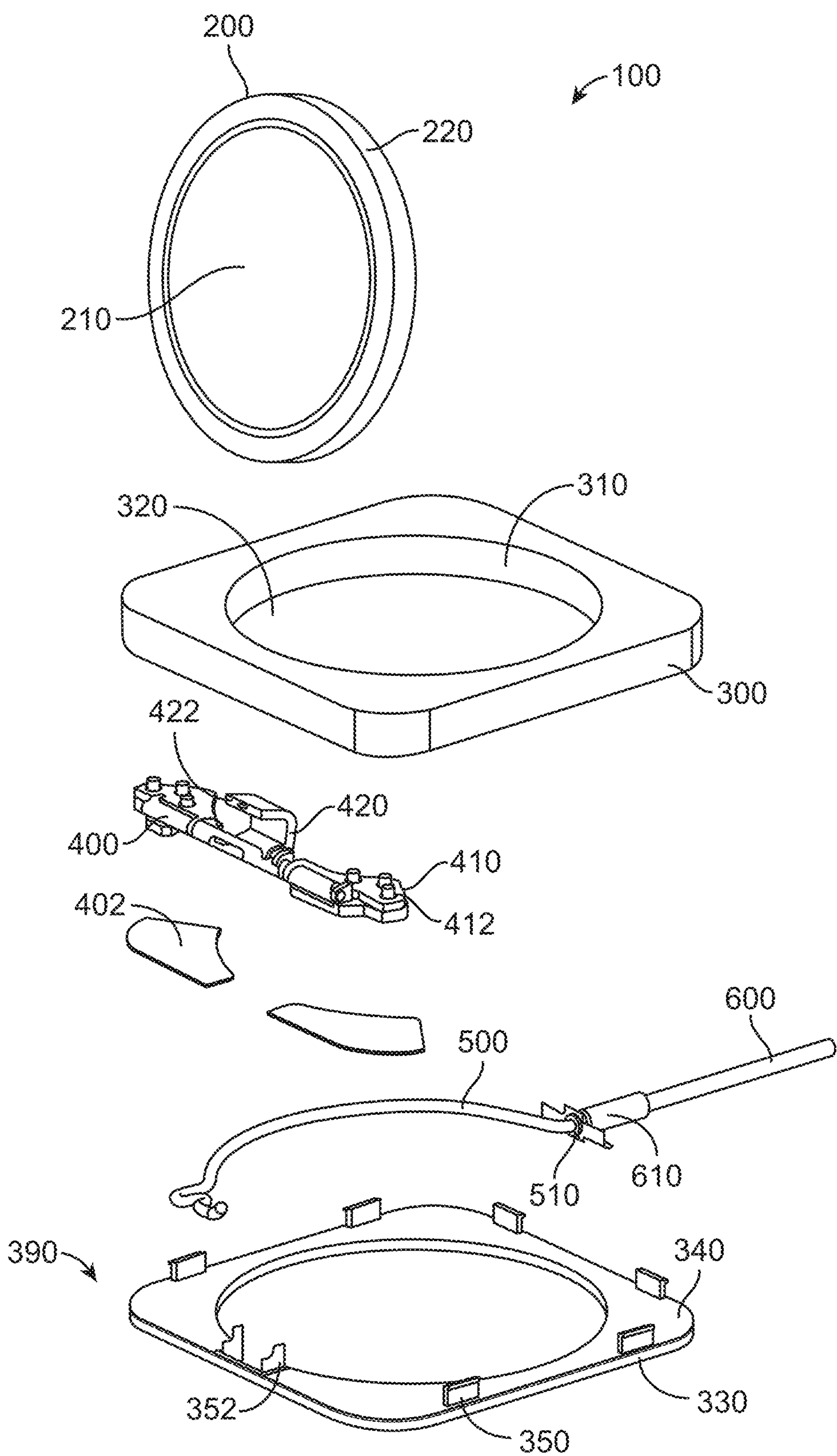
FIG. 2 is an exploded view of the wireless charger of FIG. 1.

FIG. 2 is an exploded view of the wireless charger of FIG. 1. Wireless charger 100 can include wireless charging assembly 200. Wireless charging assembly 200 can include cap 210 and enclosure 220. Cap 210 can have a high friction or high stiction surface to increase a shear force needed to remove an electronic device (not shown) from the surface of cap 210. The surface of cap 210 can be at least partially adhesive in order to increase a normal force needed to remove the electronic device from the surface of cap 210.

Cap 210 can be formed of a rigid layer covered by a silicone layer. Cap 210 can be formed using a double-shot injection molding process, where a first shot molds a disk formed of polycarbonate or other material that is then covered with a second shot of silicone or other material. Enclosure 220 can be formed of aluminum, stainless steel, or other material. Enclosure 220 can be formed by metal injection molding, stamping, CNC machining, using a deep drawn process, forging, or other manufacturing technique. Similar portions of the other wireless chargers shown here or otherwise provided by embodiments of the present invention can be formed in a same or similar manner and they can be formed of a same or similar material or materials.

Base 300 can include passage 320 defining interior sidewall 310. Base 300 can be positioned on foot 390. Foot 390 can include a bottom layer 330 that can be made out of a non-scuff or non-marring material, such as silicone, to protect desktops and other surfaces on which wireless charger 100 can reside. Foot 390 can further have non-slip properties to keep wireless charger 100 from sliding during use. Foot 390 can include a second layer 340 formed of a more rigid material to secure bottom layer 330 to base 300. Second layer 340 can include tabs 350 that can fit into slots (not shown) in a bottom side of base 300. Tabs 352 on second layer 340 can support hinge 400.

Base 300 and second layer 340 can be formed of aluminum, stainless steel, or other material. Base 300 and second layer 340 can be formed by CNC machining, metal-injection-molding, stamping, forging, by using a deep-draw process, or other technique. Second layer 340 can instead be formed of plastic, polycarbonate, or other material. Similar portions of the other wireless chargers shown here or otherwise provided by embodiments of the present invention can be formed in a same or similar manner and they can be formed of a same or similar material or materials.

Hinge 400 can include support blocks 410 and stem 420. Stem 420 can terminate at first end 422. First end 422 of stem 420 can be attached to wireless charging assembly 200. Support blocks 410 can be attached using fasteners 412 to an underside of base 300. Covers 402 can be used to protect hinge 400.

Portions of hinge 400 and the other hinges shown herein or otherwise provided by embodiments of the present invention can be formed of aluminum, stainless steel, or other material. Hinge 400 and the other hinges can be formed by CNC machining, metal-injection-molding, stamping, forging, by using a deep-draw process, or other technique. Similar portions of the other wireless chargers shown here or otherwise provided by embodiments of the present invention can be formed in a same or similar manner and they can be formed of a same or similar material or materials.

Cable 600 can terminate in connector insert 610, which can be inserted into connector receptacle 510 in base 300. Connector receptacle 510 can be attached to wire 500. Wire 500 can traverse base 300 and be attached to components in wireless charging assembly 200. Examples of components that can be used in wireless charging assembly 200 are shown in the following figure.

Figure 3:
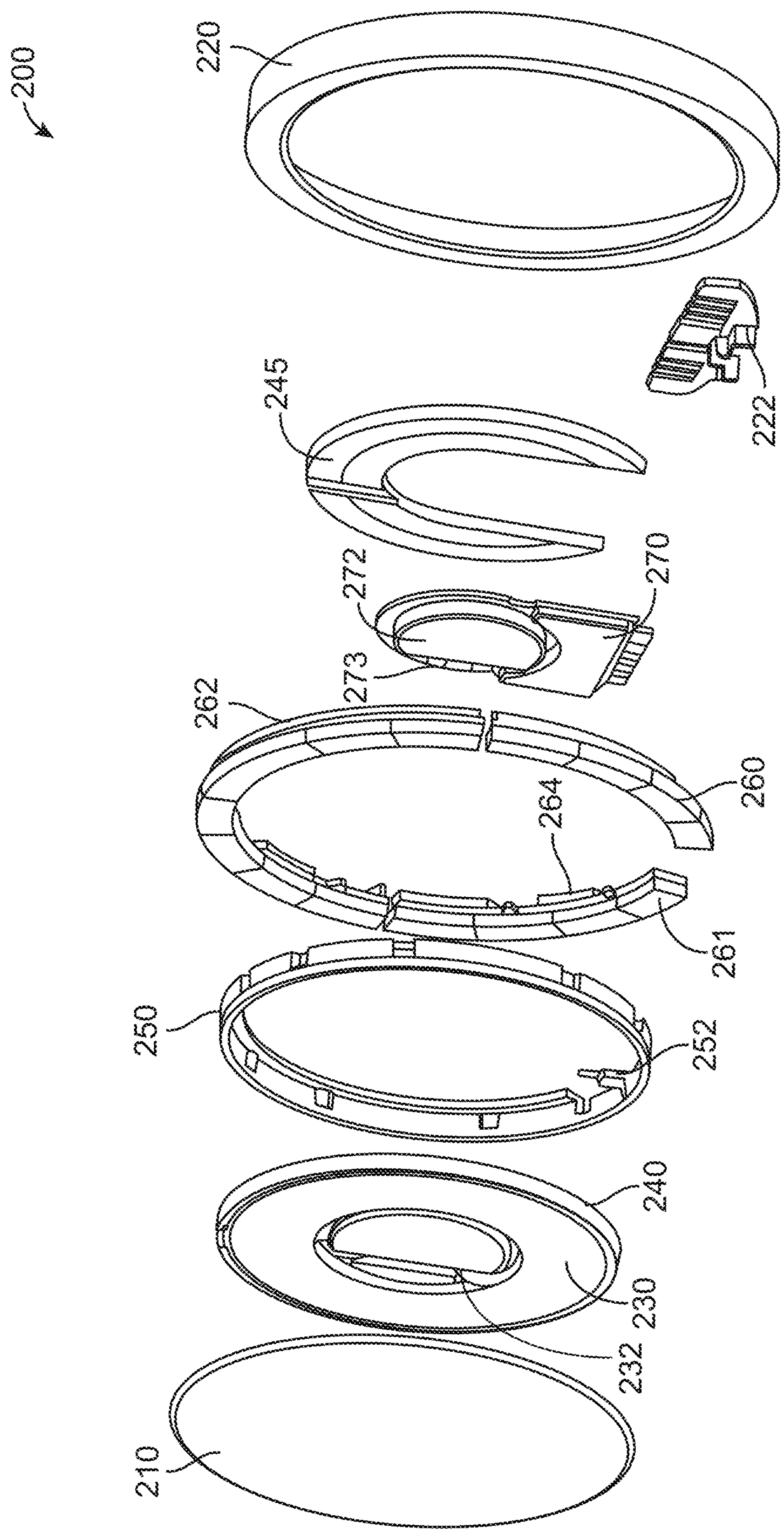
FIG. 3 is an exploded view of a wireless charging assembly according to an embodiment of the present invention.

FIG. 3 is an exploded view of a wireless charging assembly according to an embodiment of the present invention. Wireless charging assembly 200 can include cap 210 and enclosure 220. In some circumstances it can be desirable for wireless charger 100 to simply hold an electronic device (not shown) securely in place. This can be true for example if a wired charging port on the electronic device is to be used in place of wireless charging by wireless charger 100. Such a device, which can be referred to as a stand instead of or as well as a wireless charger, can include magnet array 260. Magnet array 260 can include a number of arcuate magnets 261, examples of which are shown beginning in FIG. 36 below. Magnet array 260 can be supported by shield 262. Shield 262 can act as a backplate to direct magnetic field lines of the arcuate magnets 261. One or more shims 264 can be used to improve the alignment of the arcuate magnets 261 and magnet array 260.

In other circumstances, it can be desirable for wireless charger 100 to provide charging for the electronic device while holding the electronic device in place. Accordingly, wireless charging assembly 200 can further include coil 230 and board 270. Board 270 can include contacts 273, which can connect to leads 232 on coil 230. Coil 230 can be driven by currents generated by control circuitry 272 on board 270. That is, control circuitry 272 can receive power and generate modulated currents in coil 230. The modulated currents in coil 230 can create a magnetic field that can be directed by shield 240. Shield 240 can improve coupling of the magnetic field to a corresponding coil (not shown) in the electronic device. The coupled magnetic field can be a time-varying magnetic field that can generate currents in the corresponding coil that can be used to charge a battery in or associated with the electronic device.

Control circuitry 272 can modulate currents provided to coil 230 in order to transmit data from wireless charger 100. The modulation can be in phase, amplitude, frequency, or other parameter combination of parameters. The data can be generated by wireless charger 100 itself, or it can be dated received over cable 600 (shown in FIG. 2) from an external device. Data can similarly be provided from the electronic device to wireless charger 100. Control circuitry 272 can further include circuitry to read data coupled onto coil 230 by the electronic device. This received data can be used by wireless charger 100 itself, or the data can be provided to an external device over cable 600.

In still other circumstances, it can be desirable for the electronic device to be able to determine that it is attached to wireless charger 100. Accordingly, wireless charging assembly 200 can further include near-field circuitry (NFC) coil 250. NFC coil 250 can include one or more components 252, such as a radio-frequency (RF) tag, capacitors, or other circuits or components. The electronic device can provide a magnetic field that is modulated by NFC coil 250. This modulation can be used by the electronic device to identify wireless charger 100. The identity of wireless charger 100 can inform the electronic device as to power level and other capabilities of wireless charger 100.

Additional ferritic shielding 245 can be placed around board 270 to further improve the shielding of coil 230. Ferritic shielding 245 can also shield control circuitry 272 on board 270.

Wireless charging assembly 200 can include some of all of these components. Wireless charging assembly can include additional components. For example, an e-shield (not shown) can be placed over coil 230, between coil 230 and cap 210 of wireless charging assembly 200. The e-shield can be formed of a layer of copper or other conductive material to intercept electric fields between coil 230 in wireless charging assembly 200 and a corresponding coil in the electronic device. The e-shield can have a low magnetic permeability to pass magnetic fields between coil 230 and the corresponding coil. The e-shield can include breaks to prevent the formation of eddy currents.

Attachment portion 222 can be soldered or spot or laser welded to enclosure 220 and first end 422 of stem 420 (shown in FIG. 2) to secure wireless charging assembly 200 to hinge 400. Further details of hinge 400 are shown in the following figures.

Figures 4A, 4B:
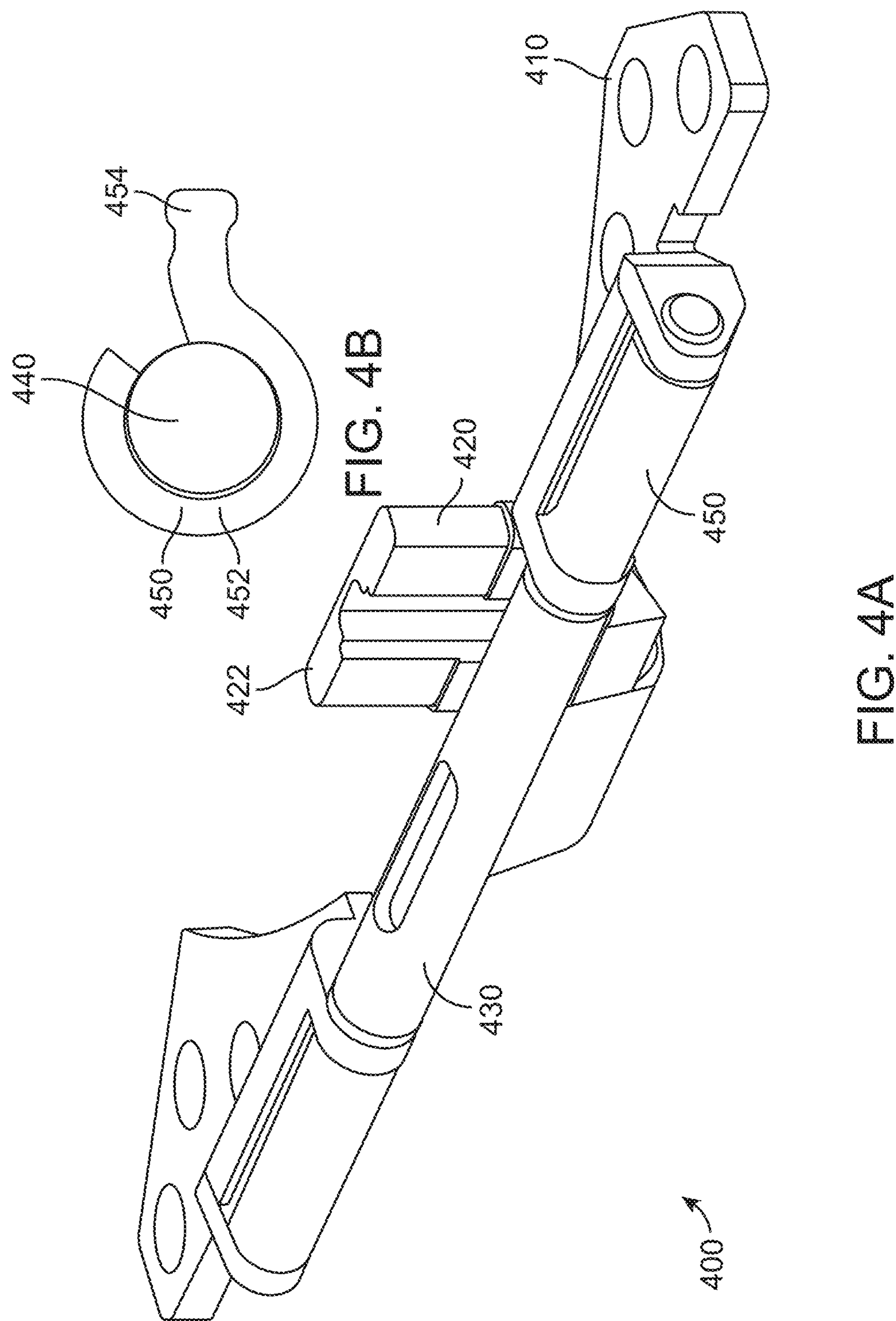
FIG. 4A and FIG. 4B illustrate a hinge according to an embodiment the present invention.

FIG. 4A and FIG. 4B illustrate a hinge according to an embodiment the present invention. Hinge 400 can allow wireless charging assembly 200 (shown in FIG. 2) to move between an up position, where wireless charging assembly 200 is outside of base 300 (shown in FIG. 2), and a down position, where wireless charging assembly 200 is housed in base 300. To more securely hold an electronic device (not shown) in place, it can be desirable that hinge 400 provide friction or resistance to wireless charging assembly 200 moving to the down position. This can prevent the weight of the electronic device from inadvertently closing wireless charger 100. It can also be desirable to allow a user to readily move wireless charging assembly 200 to the up position where it can be mated with the electronic device. Accordingly, embodiments of the present invention can provide a hinge 400 having an asymmetric friction ratio, where the friction incurred in moving wireless charging assembly 200 to the down position is higher than the friction incurred in moving wireless charging assembly 200 to the up position.

Hinge 400 can include support blocks 410 supporting stem 420. Support blocks 410 can be fastened to base 300 as shown in FIG. 2. Stem 420 can terminate at first end 422 and can include sleeve 430. Sleeve 430 can support shafts 440 (shown in FIG. 5.) Shafts 440 can support friction clips, such as friction clips 450.

FIG. 4B illustrates a side view of a friction clip 450. Friction clips 450 can be formed of one clip, or several clips placed in parallel. For example, 15, 10, 20, or other numbers of clips can be placed in parallel. Friction clip 450 can include a loop portion 452 placed around shaft 440, where loop portion 452 includes an end terminating in tab 454. Tab 454 can be fit into a slot 414 (shown in FIG. 5) of support blocks 410. As wireless charging assembly 200 moves to the up position, shaft 440 can rotate in a counterclockwise direction as shown. This action can act to loosen loop portion 452 from shaft 440, thereby allowing wireless charging assembly 200 to readily move to the up position. When wireless charging assembly 200 is moved to the down position, shaft 440 can rotate in a clockwise direction as drawn. This can act to tighten loop portion 452 around shaft 440, thereby increasing a resistance to the downward motion of wireless charging assembly 200. Further details of hinge 400 are shown in the following figure.

Figure 5:
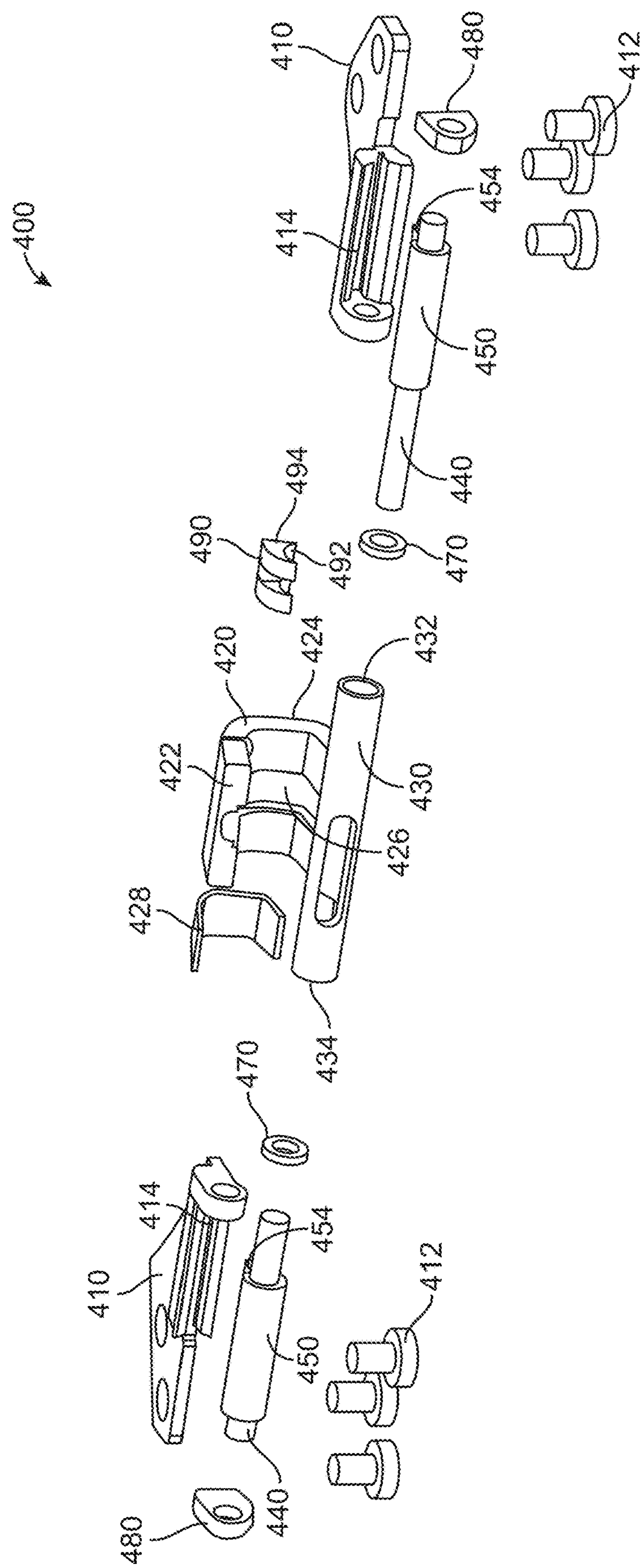
FIG. 5 is an exploded diagram of a hinge according to an embodiment of the present invention.

FIG. 5 is an exploded diagram of a hinge according to an embodiment of the present invention. Hinge 400 can include support blocks 410. Support blocks 410 can be attached to base 300 (shown in FIG. 2) using fasteners 412. Support blocks 410 can include slots 414 for accepting tabs 454 on friction clips 450. Stem 420 can include a U-shaped portion 424 terminating in first end 422, where first end 422 can be soldered or otherwise attached to wireless charging assembly 200 (shown in FIG. 2.) Stem 420 can further include sleeve 430 having a cylindrical opening 432 at a first end and a cylindrical opening 434 at a second end. Shafts 440 can be inserted into cylindrical opening 432 and cylindrical opening 434. Shafts 440 can be fixed to sleeve 430 by welding, soldering, or other step. Washers 470 and end caps 480 can also be inserted on shafts 440. Wire 500 (shown in FIG. 3) can be routed through sleeve 430 and channel 426 in stem 420 to wireless charging assembly 200 (shown in FIG. 2.) Wire 500 can be protected and hidden from view by cover 428.

It can be desirable for wireless charging assembly 200 to have a top surface that is level with a top surface of base 300 when wireless charging assembly 200 is in the down position. That is, it can be desirable for wireless charging assembly 200 to properly align with base 300 when wireless charger 100 is closed. Accordingly, stop 490 can be used. Stop 490 can be soldered or spot or laser welded to sleeve 430. For example, during assembly, wireless charging assembly 200 can be properly aligned with base 300. Stop 490 can be positioned such that surface 492 of stop 490 is on sleeve 430 and surface 494 of stop 490 is flush against an inside surface of base 300. Once positioned in this way, stop 490 can be attached to sleeve 430 by soldering, spot or laser welding, or other technique. In this configuration, stop 490 can consistently position wireless charging assembly 200 properly in base 300 when wireless charging assembly 200 is in the down position and wireless charger 100 is closed.

Figure 6:
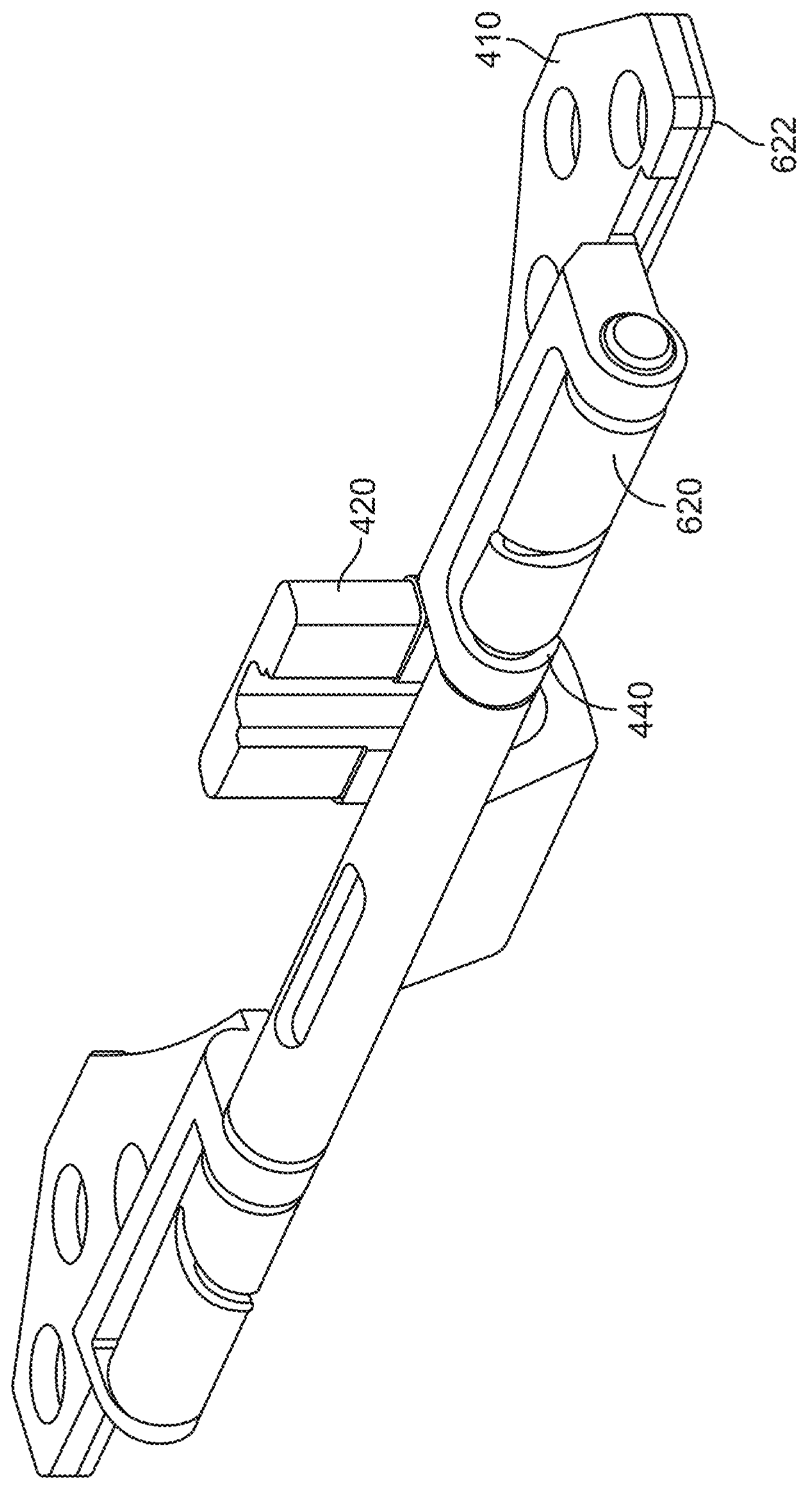
FIG. 6 illustrates another hinge according to an embodiment of the present invention.

FIG. 6 illustrates another hinge according to an embodiment of the present invention. In this example, wrapped spring 620 can be wrapped around a portion of shaft 440. Wrapped spring 460 can include a first end 622 attached to support block 410. As before, when wireless charging assembly 200 is moved to the up position, stem 420 can rotate upwards. This can act to loosen wrapped spring 620 from around shaft 440, thereby making it easier to move wireless charging assembly 200 to the up position. As wireless charging assembly 200 is moved to the down position, stem 420 can rotate downwards, which can act to tighten wrapped spring 620 around shaft 440, thereby increasing a resistance to this movement. Wrapped spring 620 can encircle shaft 440 various numbers of times in various embodiments of the present invention. Wrapped spring 620 can taper towards a second end away from first end 622.

Figures 7A, 7B:
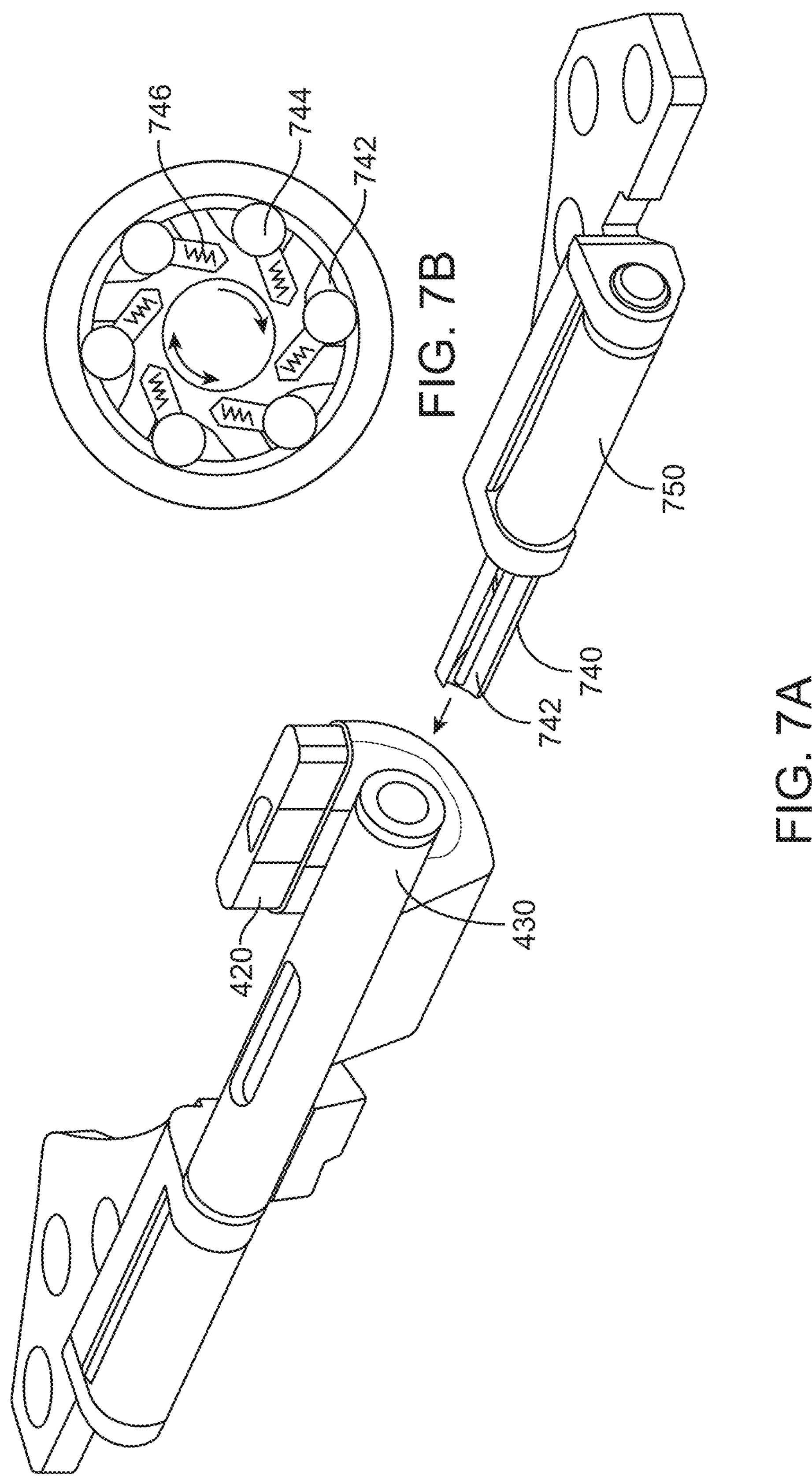
FIG. 7A and FIG. 7B illustrate another hinge according to an embodiment of the present invention.

FIG. 7A and FIG. 7B illustrate another hinge according to an embodiment of the present invention. In this example, shaft 740 can include a number of slots 742. Bearings 744 can be placed in slots 742. Bearings 744 can be spherical, cylindrical, or they can have another shape. Bearings 744 can be biased. For example, they can be biased by springs 746. A first end of shaft 740, bearings 744, and springs 746 can be inserted in boot 750, while a second end of shaft 740 can be inserted into and attached to sleeve 430, for example by soldering, laser or spot welding, or other technique. As wireless charging assembly 200 is moved to the up position, stem 420 can rotate upward and shaft 740 can rotate counter-clockwise as shown in FIG. 7B. This rotation can drive bearings 744 further back in their slots 742 against springs 746, thereby allowing wireless charging assembly 200 to move with only limited resistance. As wireless charging assembly 200 is moved to the down position, stem 420 can rotate downward and shaft 740 can rotate clockwise as shown in FIG. 7B. This rotation can push bearings into the inside surface of boot 750, thereby increasing the resistance of the downward motion of wireless charging assembly 200.

The hinges shown in FIG. 6 and FIG. 7 can include structures such as stop 490 for hinge 400, as shown in FIG. 5. Again, stop 490 can help to ensure that wireless charging assembly 200 is aligned with base 300 when wireless charging assembly 200 is in the down position. These and other embodiments of the present invention can provide other alignment features to ensure that wireless charging assembly 200 is properly aligned with base 300 when wireless charging assembly 200 is in the down position and wireless charger 100 is closed. Examples are shown in the following figures.

Figure 8:
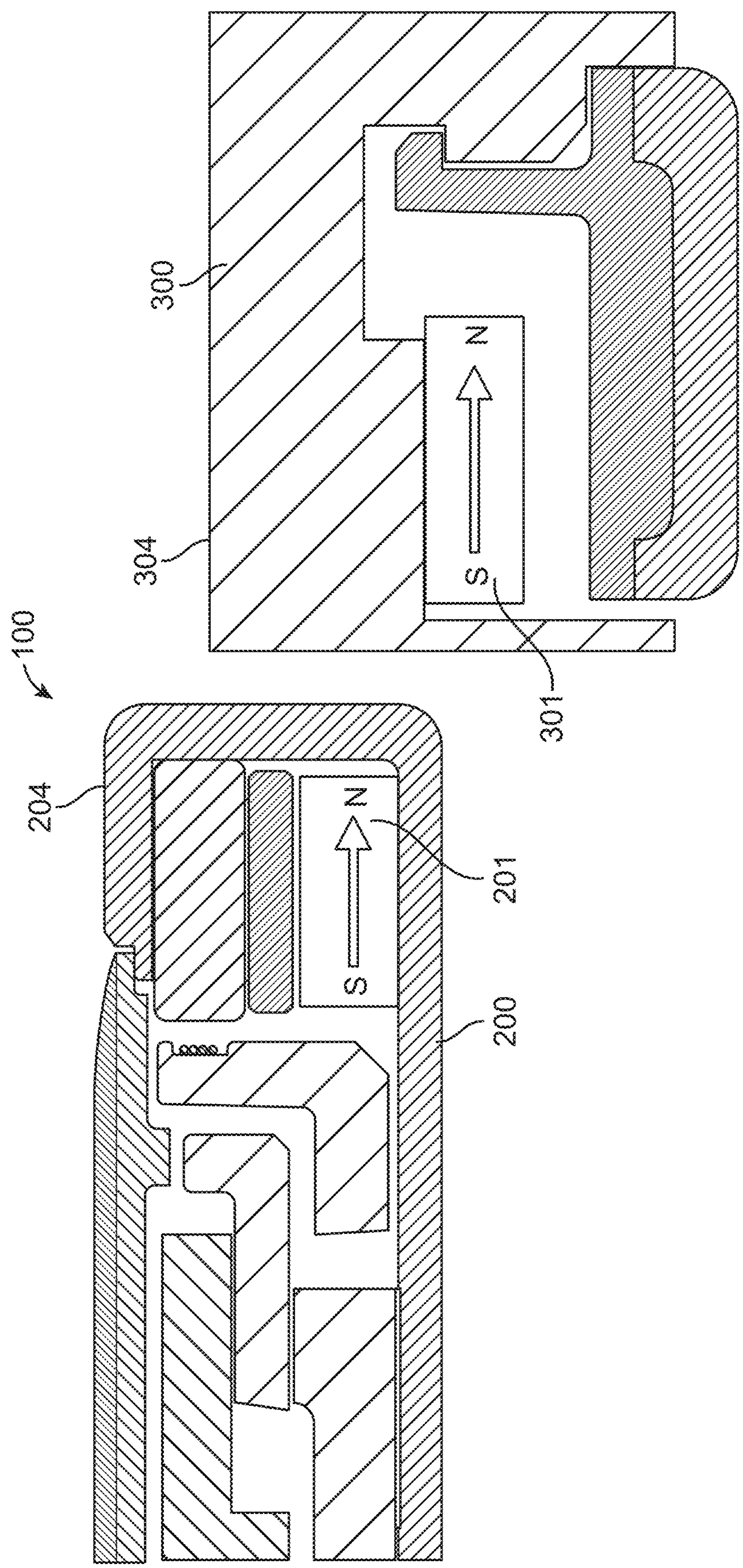
FIG. 8 illustrates a side view of a portion of a wireless charger according to an embodiment of the present invention.

FIG. 8 illustrates a side view of a portion of a wireless charger according to an embodiment of the present invention. Wireless charger 100 can include wireless charging assembly 200 and base 300. Magnet 201 can be located in wireless charging assembly 200, while magnet 301 can be located in base 300. As shown, the north end of magnet 201 can be attracted to the south end of magnet 301. In this way, the magnetic fields generated by magnet 201 and magnet 301 can help to ensure that wireless charging assembly 200 is properly aligned with base 300 when wireless charging assembly 200 is in the down position. That is, the magnet attraction between magnet 201 and magnet 301 can help to align top surface 204 of wireless charging assembly 200 to top surface 304 of base 300 such that top surface 204 is parallel to top surface 304 when wireless charging assembly 200 is in the down position and wireless charger 100 is closed.

Figure 9:
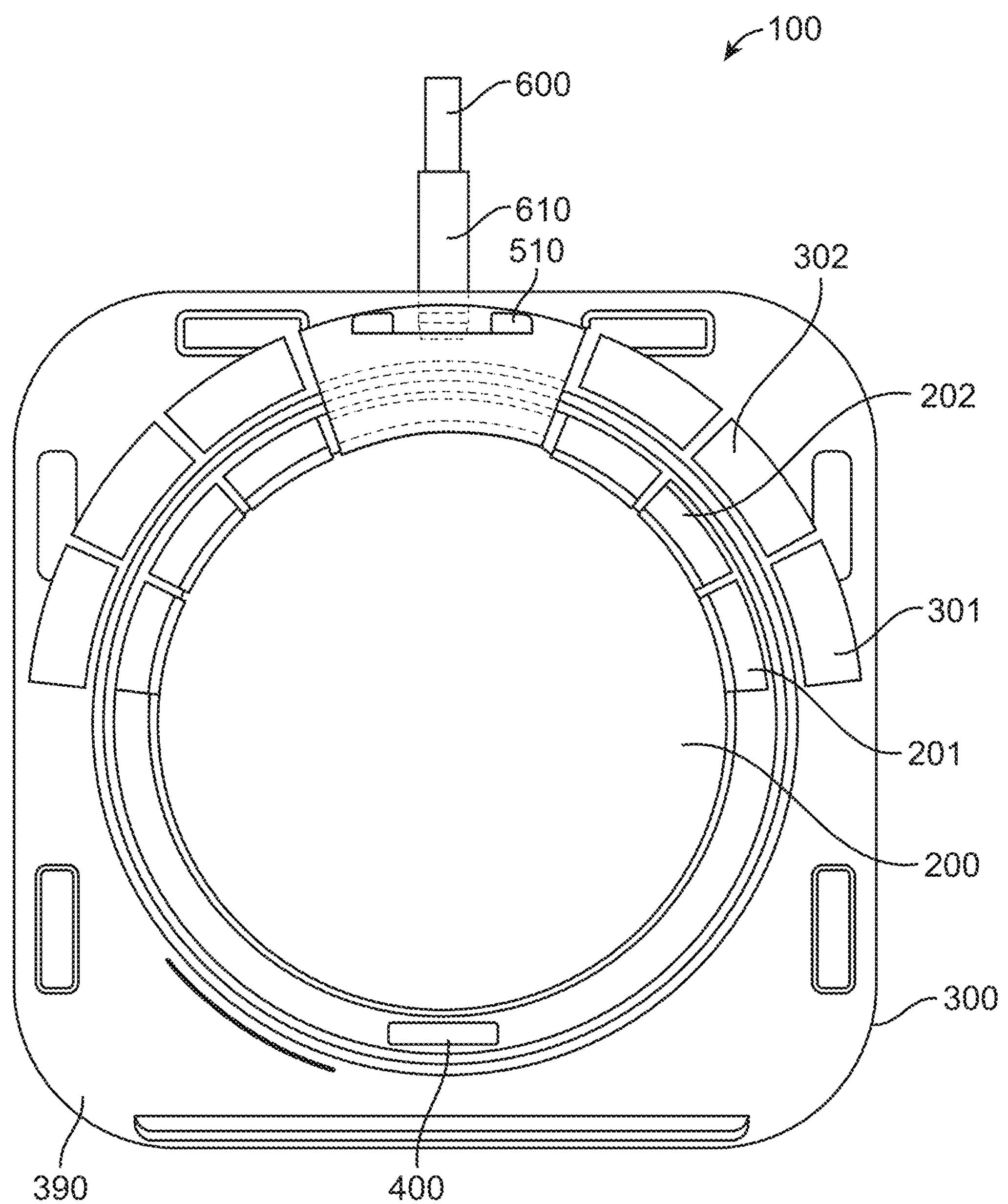
FIG. 9 illustrates an underside view of a wireless charger according to an embodiment of the present invention.

FIG. 9 illustrates an underside view of a wireless charger according to an embodiment of the present invention. Wireless charging assembly 200 can be attached to base 300 by hinge 400 to form wireless charger 100. Wireless charging assembly 200 can include magnets 201 that can align with magnets 301 in base 300. Magnets 301 can be covered by foot 390. The polarities of each of the magnets 201 and each of the magnets 301 can alternate to increase magnetic fields. For example, magnet 201 in wireless charging assembly 200 can have an opposite polarity as adjacent magnet 202 in wireless charging assembly 200. Similarly, magnet 301 in base 300 can have an opposite polarity as adjacent magnet 302 in base 300. Magnet 201 and magnet 202, and the other corresponding magnets, can be positioned away from hinge 400. Magnets can also be omitted to provide space for connector receptacle 510. Cable 600 can include connector insert 610, which can be inserted into connector receptacle 510.

Figure 10:
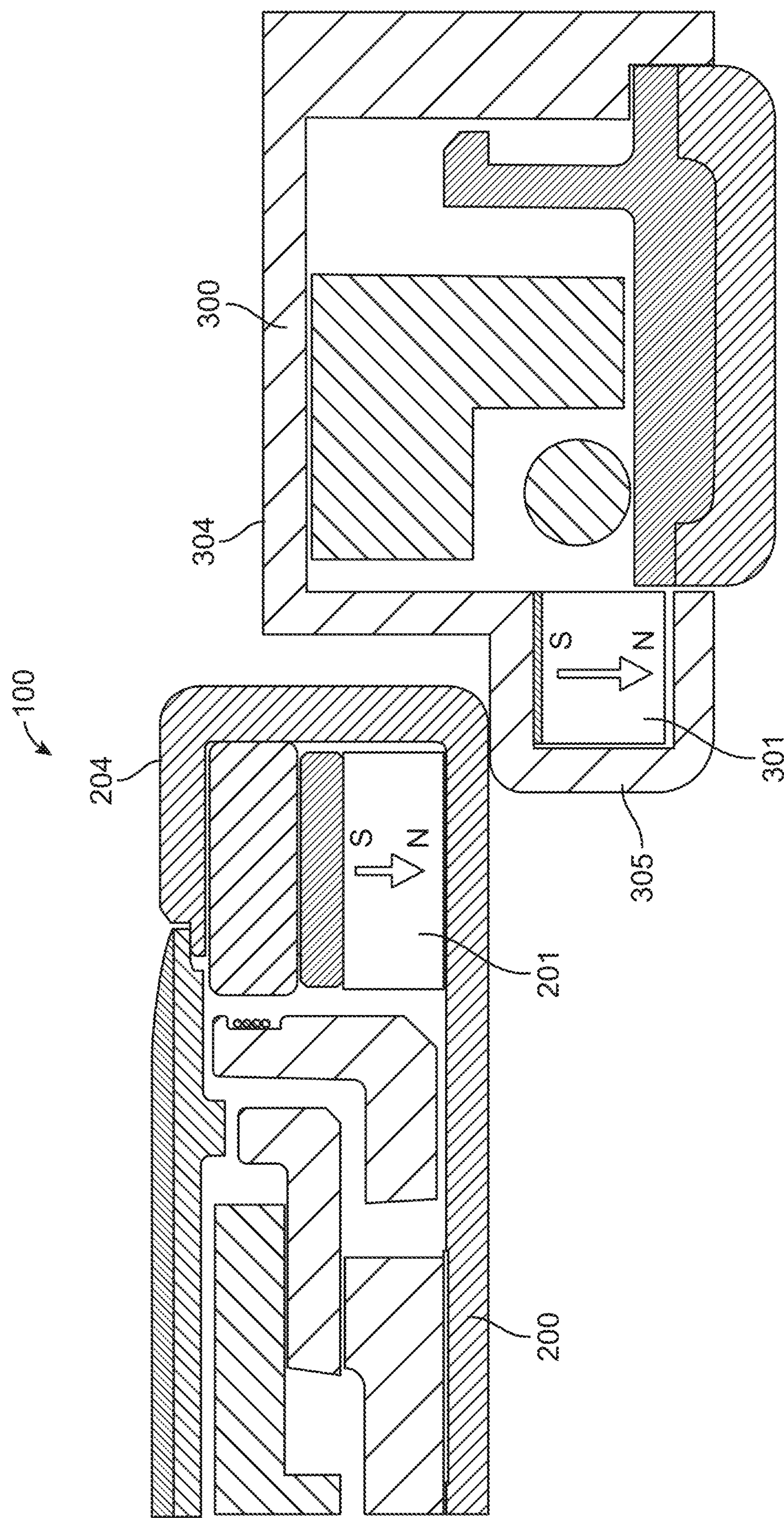
FIG. 10 illustrates a side view of a portion of a wireless charger according to an embodiment of the present invention.

FIG. 10 illustrates a portion of a wireless charger according to an embodiment of the present invention. Wireless charger 100 can include wireless charging assembly 200 and base 300. Base 300 can include step 305. Step 305 can house magnet 301. The south pole of magnet 301 can be attracted to the north pole of magnet 201 in wireless charging assembly 200, thereby helping to keep wireless charging assembly 200 properly closed when wireless charging assembly 200 is in the down position. That is, the magnet attraction between magnet 201 and magnet 301 can help to align top surface 204 of wireless charging assembly 200 to top surface 304 of base 300 such that top surface 304 is parallel to top surface 304 when wireless charging assembly 200 is in the down position and wireless charger 100 is closed.

Figure 11:
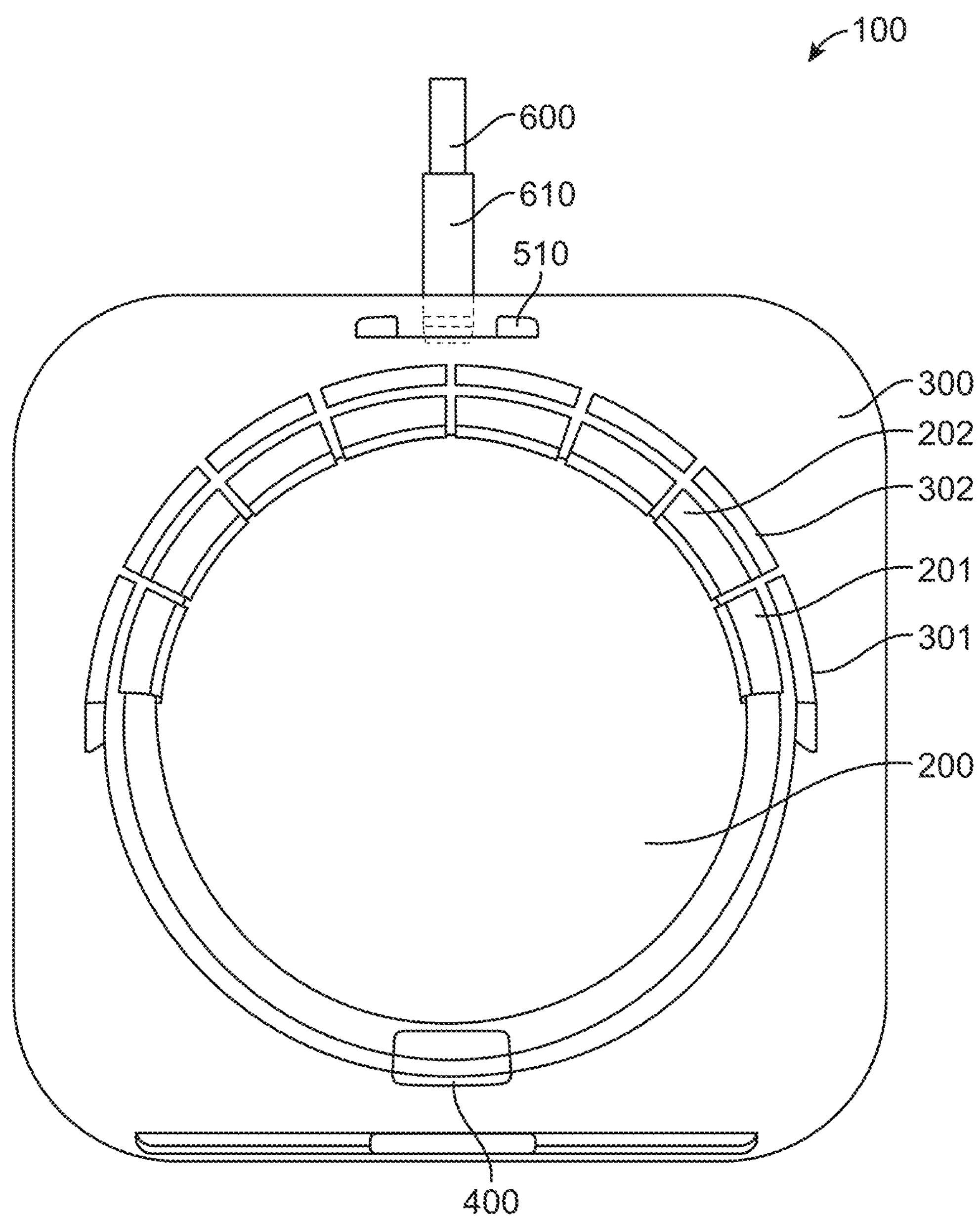
FIG. 11 illustrates an underside view of a wireless charger according to an embodiment of the present invention.

FIG. 11 illustrates a wireless charger according to an embodiment of the present invention. Wireless charger 100 can include wireless charging assembly 200 and base 300 attached by hinge 400. Magnet 201 and magnet 202 can be located in wireless charging assembly 200, while magnet 301 and magnet 302 can be housed in base 300. The polarities of magnets 201 and 301 can alternate to increase magnetic fields. For example, magnet 201 in wireless charging assembly 200 can have an opposite polarity as magnet 202 in wireless charging assembly 200. Similarly, magnet 301 in base 300 can have an opposite polarity as magnet 302 in base 300. Magnet 201 and magnet 202, and the other corresponding magnets, can be positioned away from hinge 400. Magnet 301 can be partially located under magnet 201, thereby helping to save space in base 300. This saved space can allow the use of magnets near connector receptacle 510. Cable 600 can include connector insert 610, which can be inserted into connector receptacle 510.

Figure 12:
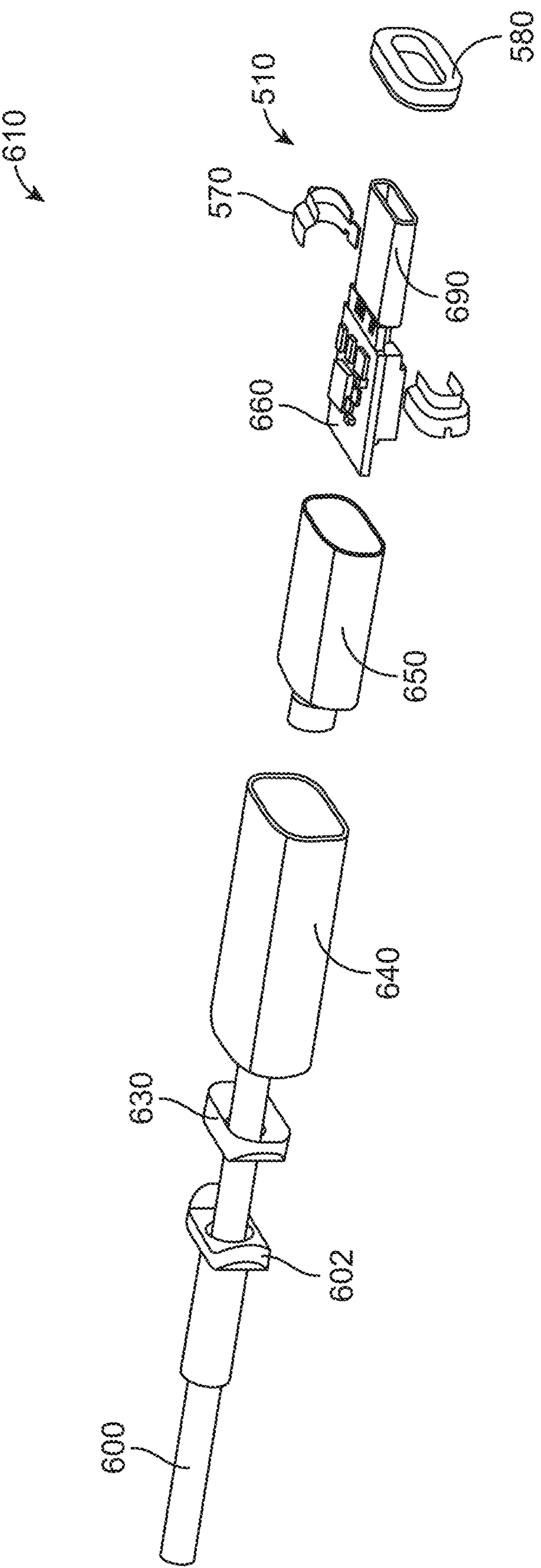
FIG. 12 illustrates a connector insert that can be inserted into a receptacle in a wireless charger according to an embodiment of the present invention.

FIG. 12 illustrates a connector insert that can be inserted into a receptacle in a wireless charger according to an embodiment of the present invention. Connector insert 610 can be formed at an end of cable 600. Connector insert 610 can include strain relief 602, molded portion 630, and boot 640. Boot 640 can house EMI shield 650. EMI shield 650 can house board 660 which can include contacts (not shown) housed in shield 690. Connector receptacle 510 can include EMI plates 570, which can further improve shielding of a connection between connector insert 610 and connector receptacle 510. Front plate 580 can be located at an opening (not shown) in base 300 (shown in FIG. 2) for connector receptacle 510.

In the above examples, hinge 400 can rotate about shaft 440. Shaft 440 can be located in base 300. As a result, wireless charging assembly 200 has limited clearance over base 300. But in some circumstances, it can be desirable to increase this clearance. Increasing this clearance can allow wireless charging assembly 200 to mate with an electronic device (not shown) while the electronic device is in a portrait orientation. Accordingly, it can be desirable for a hinge to rotate about a center that is outside of a base. An example is shown in the following figures.

Figure 13:
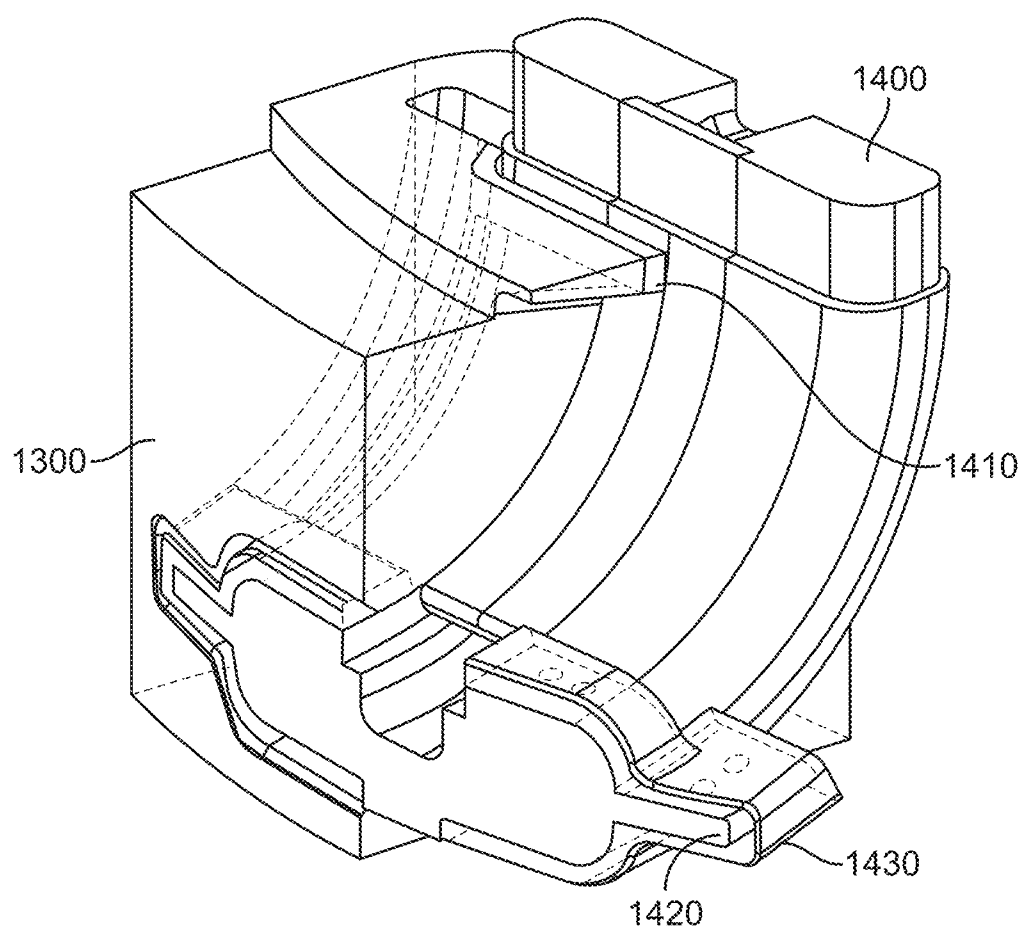
FIG. 13 illustrates a hinge according to an embodiment of the present invention.

FIG. 13 illustrates a hinge according to an embodiment of the present invention. Hinge 1400 can slide in passage 1430 in base 1300. Hinge 1400 can include two sliders. Specifically, hinge 1400 can include a fixed or static slider 1410 and a moving slider 1420. Hinge 1400 can rotate upwards until moving slider 1420 engages static slider 1410. Hinge 1400 can rotate downwards until moving slider 1420 reaches an end of passage 1430. In this example, hinge 1400 rotates about a point that is outside of base 1300. This can increase a clearance between base 1300 and a wireless charging assembly 1200 (shown in FIG. 14B) attached to hinge 1400. Increasing this clearance can allow an electronic device (not shown) to attach to wireless charging assembly 1200 in a portrait mode.

Figure 14A:
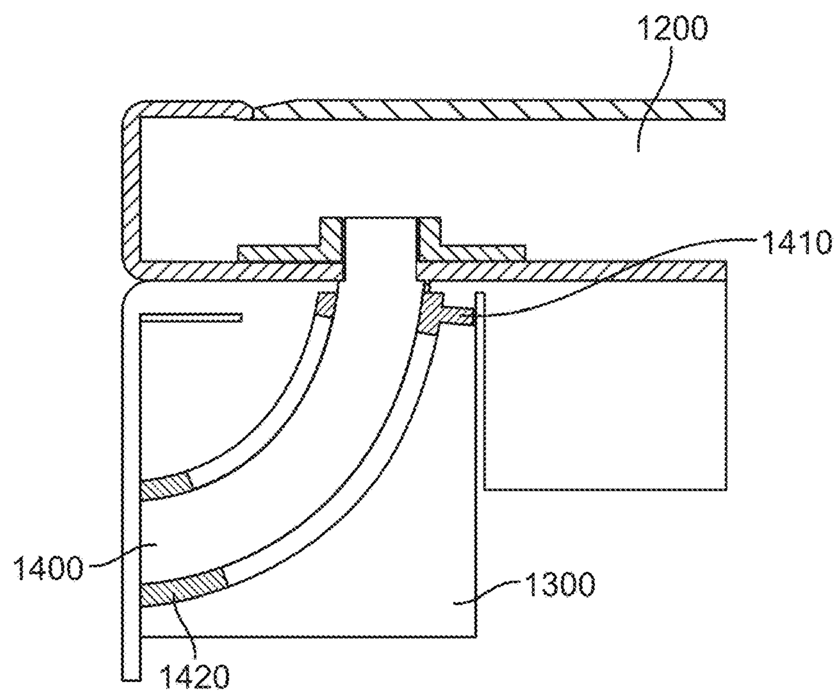
FIG. 14A and FIG. 14B illustrate the movement of the hinge of FIG. 13.
Figure 14B:
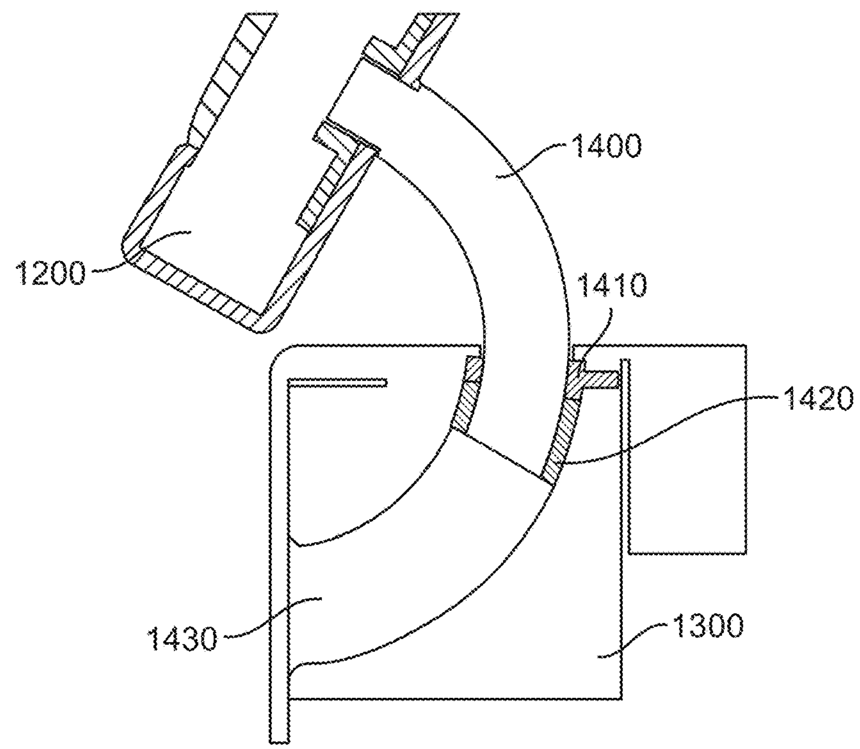

FIG. 14A and FIG. 14B illustrate the movement of the hinge of FIG. 13. In FIG. 14A, hinge 1400 can include static slider 1410 and moving slider 1420 housed in base 1300. Hinge 1400 can be attached to wireless charging assembly 1200. Wireless charging assembly 1200 can be in a down position in this configuration.

In FIG. 14B, hinge 1400 can move through passage 1430 until moving slider 1420 engages static slider 1410. This can move wireless charging assembly 1200 up and away from base 1300. This clearance can be sufficient to allow an electronic device (not shown) to attach to wireless charging assembly 1200 in a portrait mode.

In these and other embodiments of the present invention, wireless chargers having other types of wireless charging assemblies, hinges, and bases can be implemented. These various wireless chargers can have different form factors, different appearances when closed, different appearances when open, as well as different functionalities. Examples are shown in the following figures.

Figure 15:
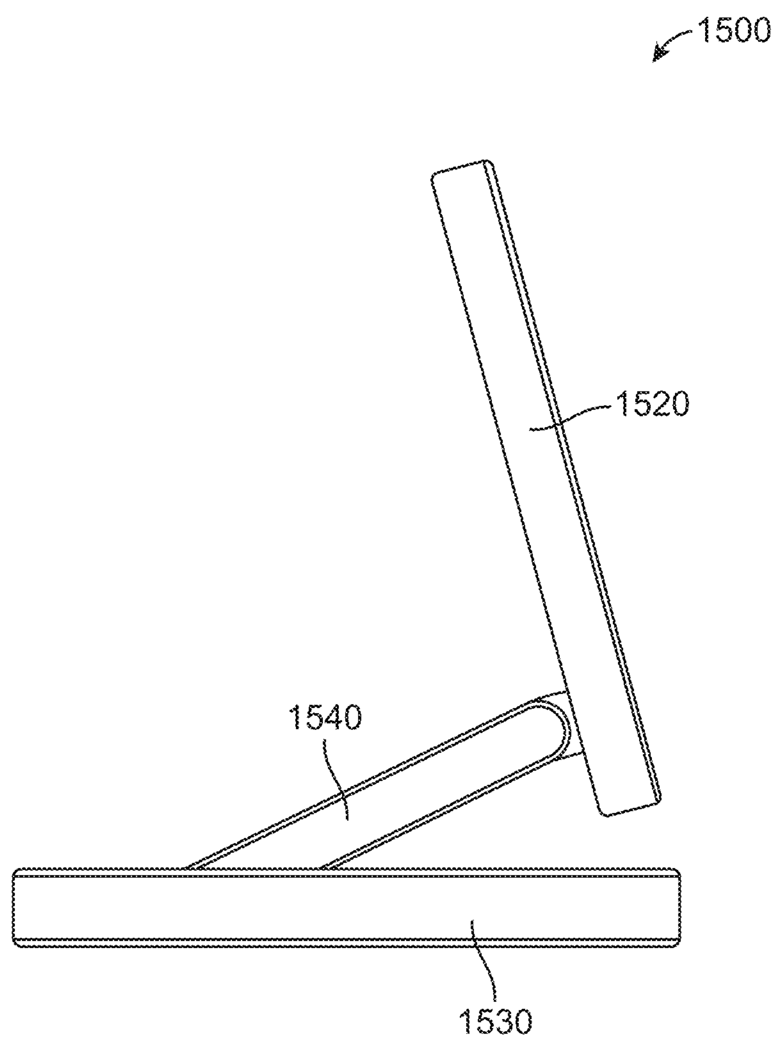
FIG. 15 illustrates a wireless charger according to an embodiment of the present invention.

FIG. 15 illustrates a wireless charger according to an embodiment of the present invention. In this example, wireless charger 1500 can include a wireless charging assembly 1520, base 1530, and hinge 1540. Hinge 1540 can fold into the base 1530 such that wireless charging assembly 1520 can reside on a top of base 1530. This can provide a compact arrangement for transport. Further details of this wireless charger are shown in the following figures. Wireless charging assembly 1520 can the same or similar to wireless charging assembly 200 (shown in FIG. 2) and the other wireless charging assemblies shown herein.

Figure 16:
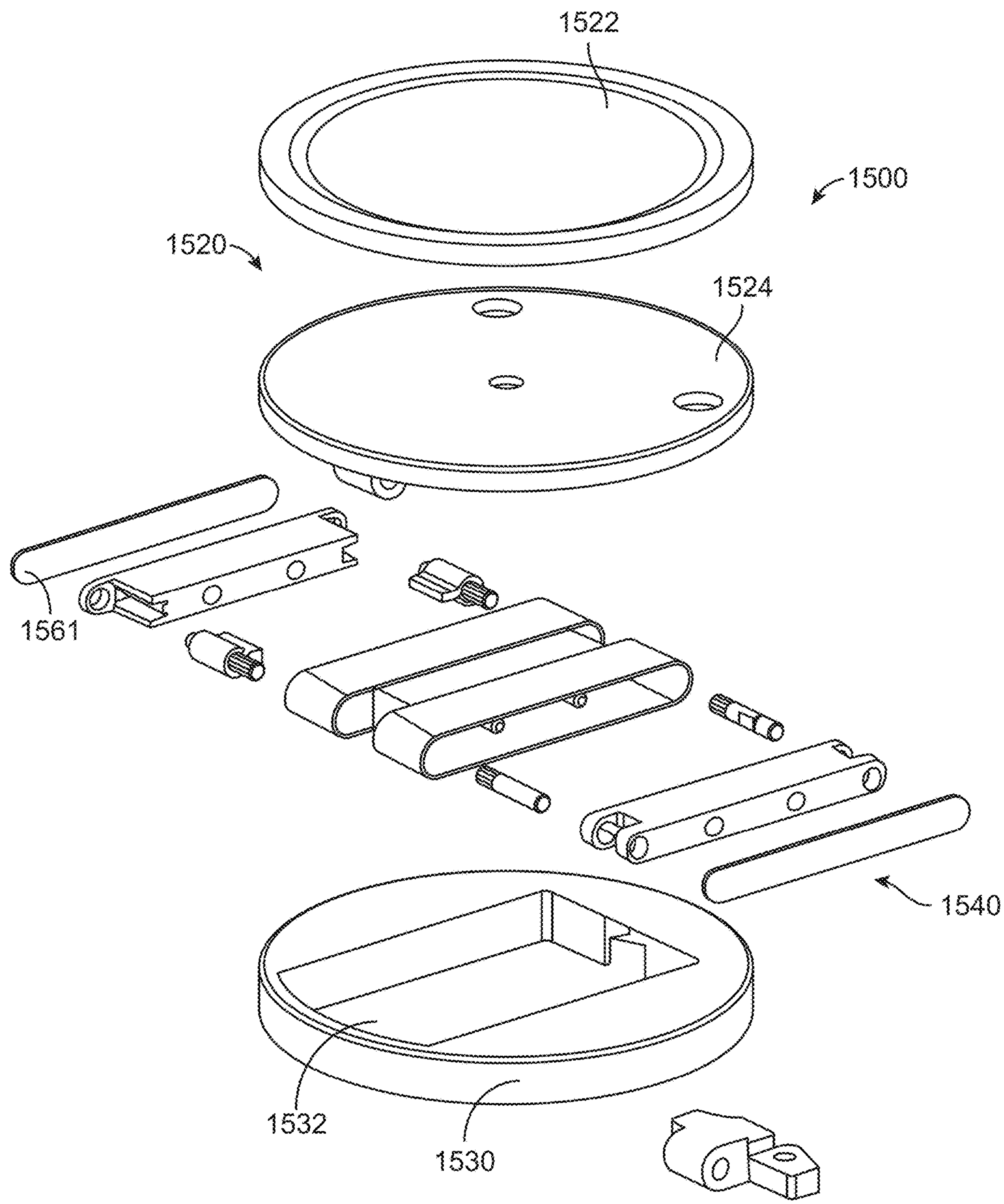
FIG. 16 is an exploded view of the wireless charger of FIG. 15.

FIG. 16 is an exploded view of the wireless charger of FIG. 15. In this example, wireless charger 1500 can include a wireless charging assembly 1520 having a top enclosure 1522 and the bottom enclosure 1524. Top enclosure 1522 and bottom enclosure 1524 can form an enclosure similar to the enclosure for wireless charger 100. Wireless charging assembly 1520 can house a magnet array, coil, ferrite, and other components as shown in the other examples herein. Hinge 1540 can connect wireless charging assembly 1520 to base 1530. Covers 1561 can cover edges of hinge 1540. Base 1530 can include recess 1532 into which hinge 1540 can be folded to provide a compact arrangement for wireless charger 1500 when it is in the closed configuration. Further details of hinge 1540 are shown in the following figure.

Figure 17:
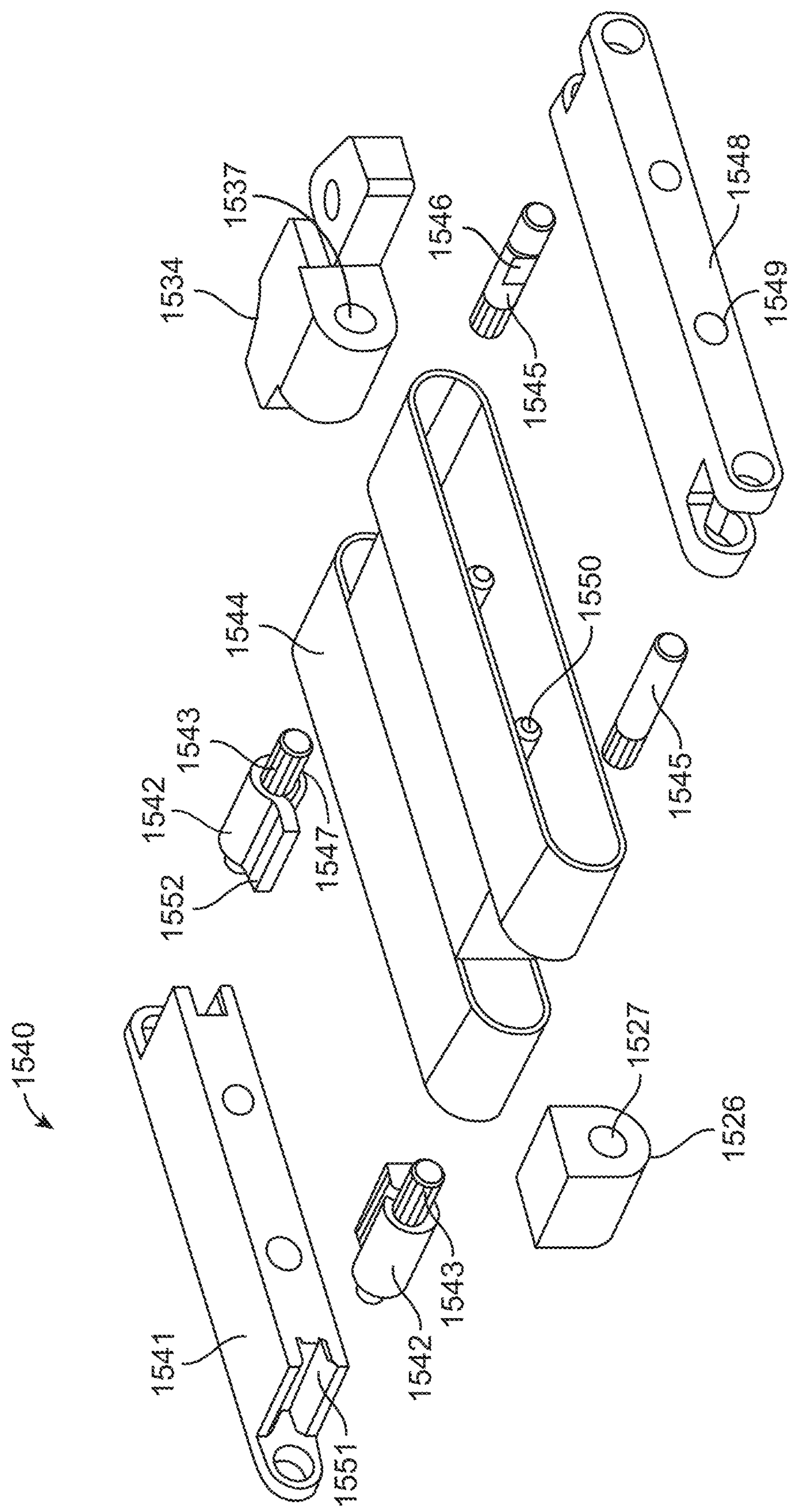
FIG. 17 illustrates a hinge for use in the wireless charger of FIG. 15.

FIG. 17 illustrates a hinge for use in the wireless charger of FIG. 15. Hinge 1540 can be attached to a bottom of recess 1532 in base 1530 (shown in FIG. 16) using bottom anchor 1534. Hinge 1540 can be attached to a back side of bottom enclosure 1524 (shown in FIG. 16 using top anchor 1526. Hinge 1540 can include mounts 1541 and 1548 as well as housing 1544. Shafts 1543 can attach mount 1541 to housing 1544 and shafts 1545 can attach mount 1548 to housing 1544. Specifically, ribbed portions 1547 of shafts 1543 and shafts 1545 can be inserted into and form an interference fit with opening 1537 in bottom anchor 1534 and opening 1527 in top anchor 1526. Pins 1550 in housing 1544 can be fit in openings 1549 in mounts 1541 and 1548. Friction clips 1542 can be placed around shafts 1543. Tabs 1552 can be fit into slots 1551 in mount 1541. Friction clips 1542 can increase a resistance to a movement of wireless charging assembly 1520 (shown in FIG. 15) to a down position relative to a resistance to a movement of wireless charging assembly 1520 to an up position. Friction clips can be the same or similar to friction clips 450 (shown in FIG. 4.) Shafts 1545 can further include stops 1546 that can limit a movement of hinge 1540. Covers 1561 (shown in FIG. 16) can cover openings 1549 in mounts 1548 and 1541.

Figure 18B:
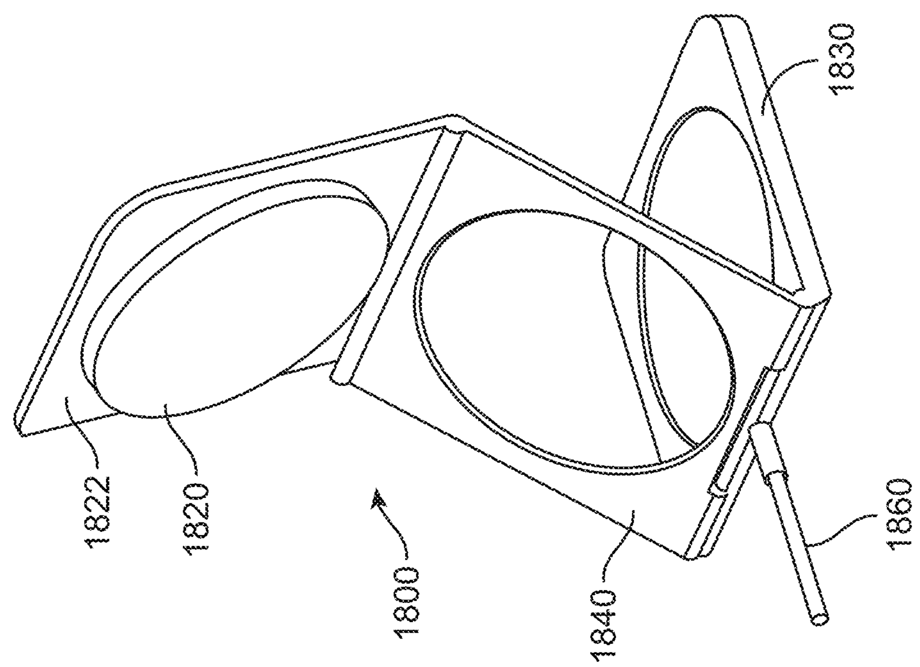
FIG. 18A and FIG. 18B illustrate another wireless charger according to an embodiment of the present invention.
Figure 18A:
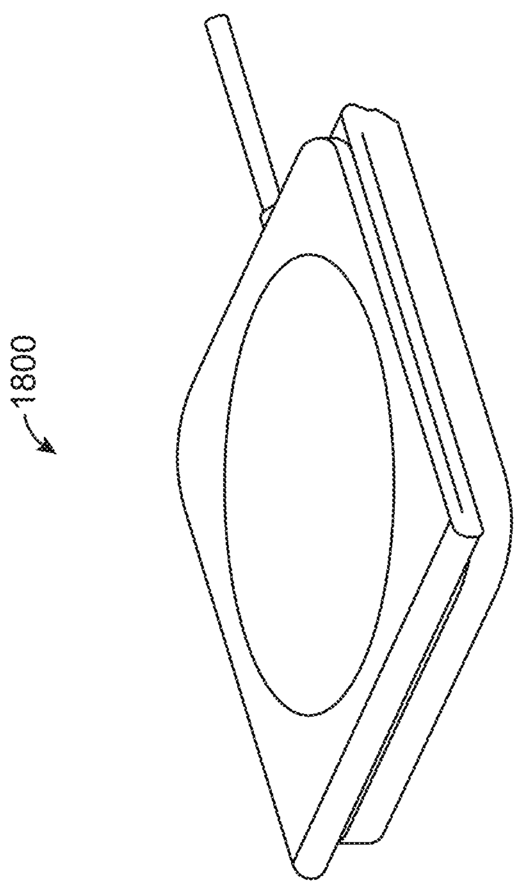

FIG. 18A and FIG. 18B illustrate another wireless charger according to an embodiment of the present invention. Wireless charger 1800 can fold to a compact shape as shown in FIG. 18A. Wireless charger 1800 can include a wireless charging assembly 1820 supported by top piece 1822. Wireless charging assembly 1820 can the same or similar to wireless charging assembly 200 (shown in FIG. 2) and the other wireless charging assemblies shown herein. Hinge 1840 can connect top piece 1822 and base 1830. Top piece 1822, hinge 1840, and base 1830 can be formed of metal plates that are forced together and have an interference fit. These plates can be covered with soft goods such as a fabric, leather, or other natural or manufactured material. Power can be provided to wireless charging assembly 1820 via cable 1860.

Figures 19A, 19B:
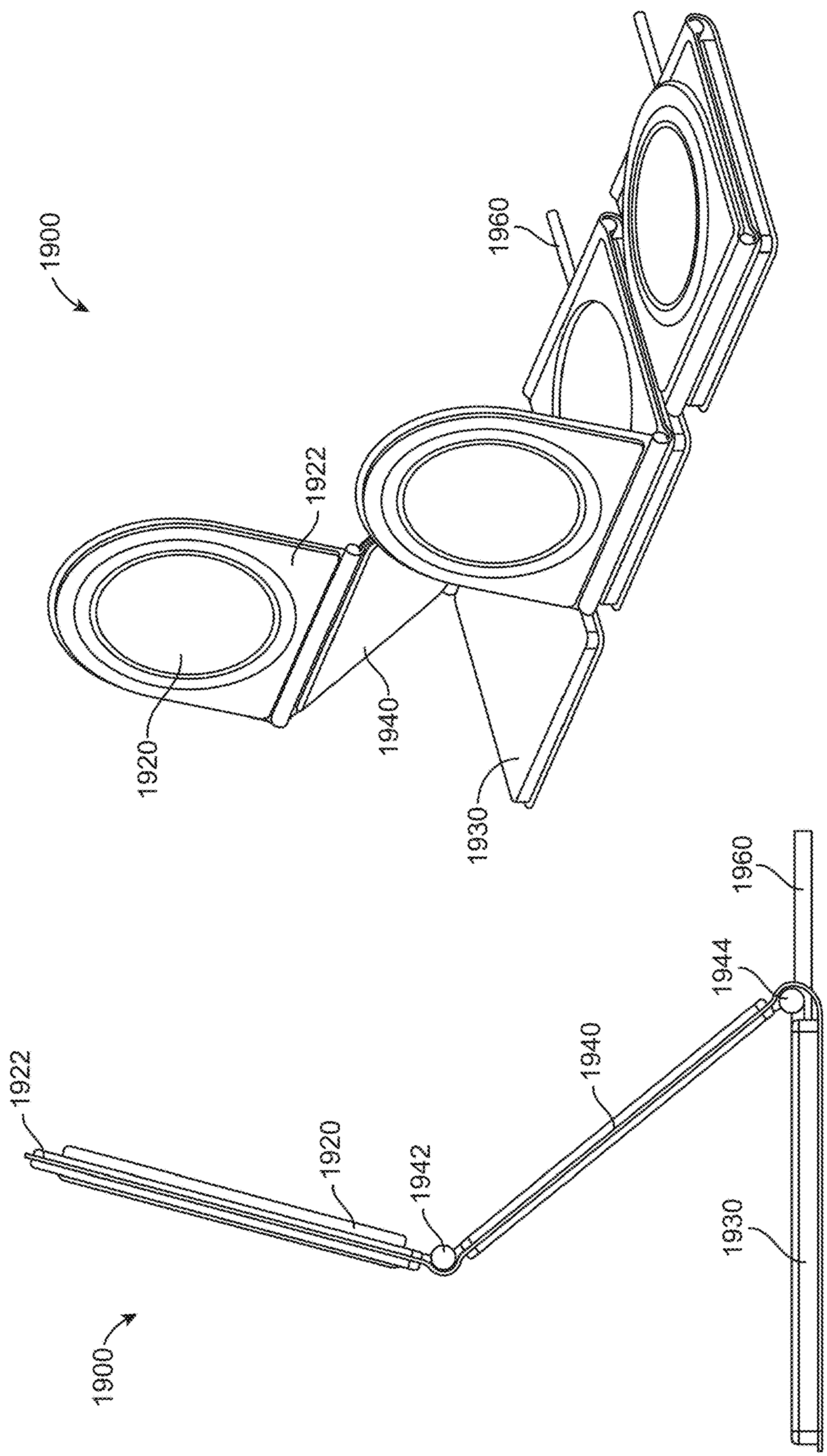
FIG. 19A and FIG. 19B illustrate another wireless charger according to an embodiment of the present invention.

FIGS. 19A and FIG. 19B illustrate another wireless charger according to an embodiment of the present invention. Wireless charger 1900 can again fold into a very compact shape. Wireless charger 1900 can include base 1930 and wireless charging assembly 1920 supported by top piece 1922. Top piece 1922 and base 1930 can be joined by hinge 1940. Hinge 1940 can be joined to top piece 1922 through rod 1942 and to base 1930 through rod 1944. Power can be provided to wireless charging assembly 1920 via cable 1960. Wireless charging assembly 1920 can the same or similar to wireless charging assembly 200 (shown in FIG. 2) and the other wireless charging assemblies shown herein.

Figure 20:
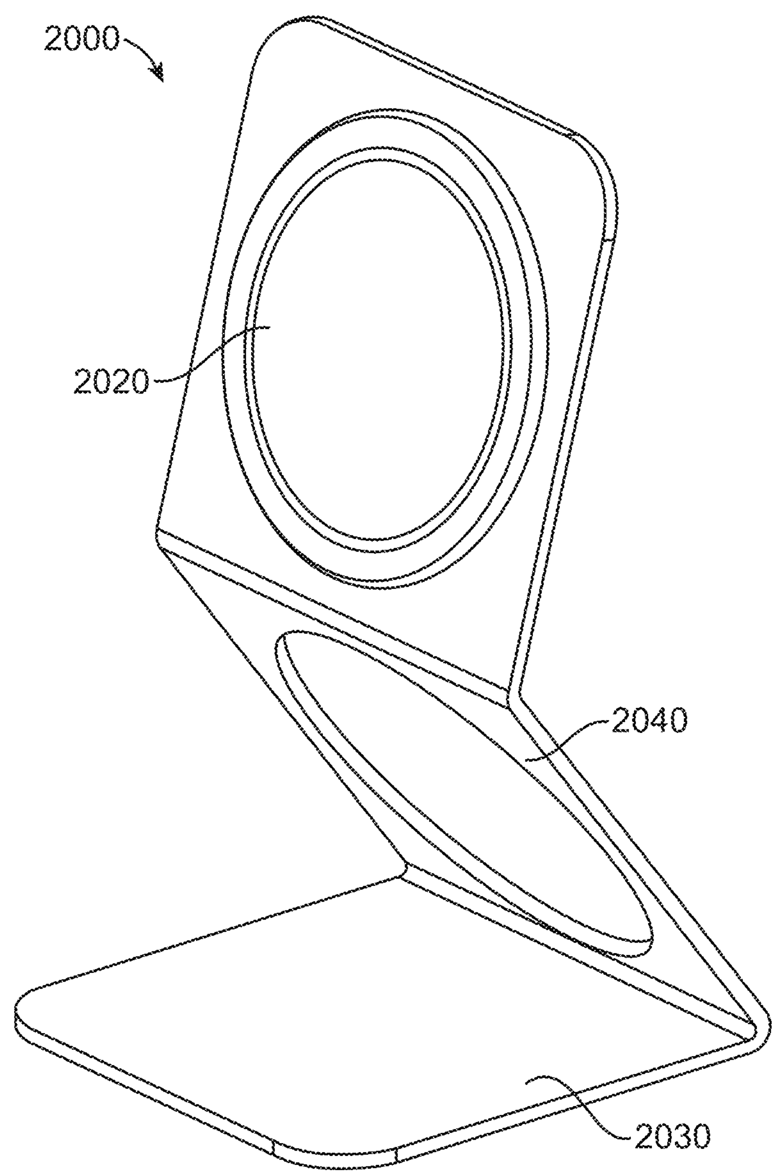
FIG. 20 illustrates another wireless charger according to an embodiment of the present invention.

FIG. 20 illustrates another wireless charger according to an embodiment of the present invention. In this example, wireless charger 2000 can be put on be formed from stamped and bent stainless steel or other material. Wireless charger 2000 can include wireless charging assembly 2020 and base 2030 joined by hinge portion 2040. Wireless charging assembly 2020 can the same or similar to wireless charging assembly 200 (shown in FIG. 2) and the other wireless charging assemblies shown herein.

In these examples, wireless chargers tend to have a squared off base and a linear hinge. It can also be desirable to have different shaped bases for various functional and aesthetic reasons. For example, it can be desirable to have a thin circular base. However, it can be difficult to implement a hinge on such a base. An example is shown in the following figures.

Figure 21:
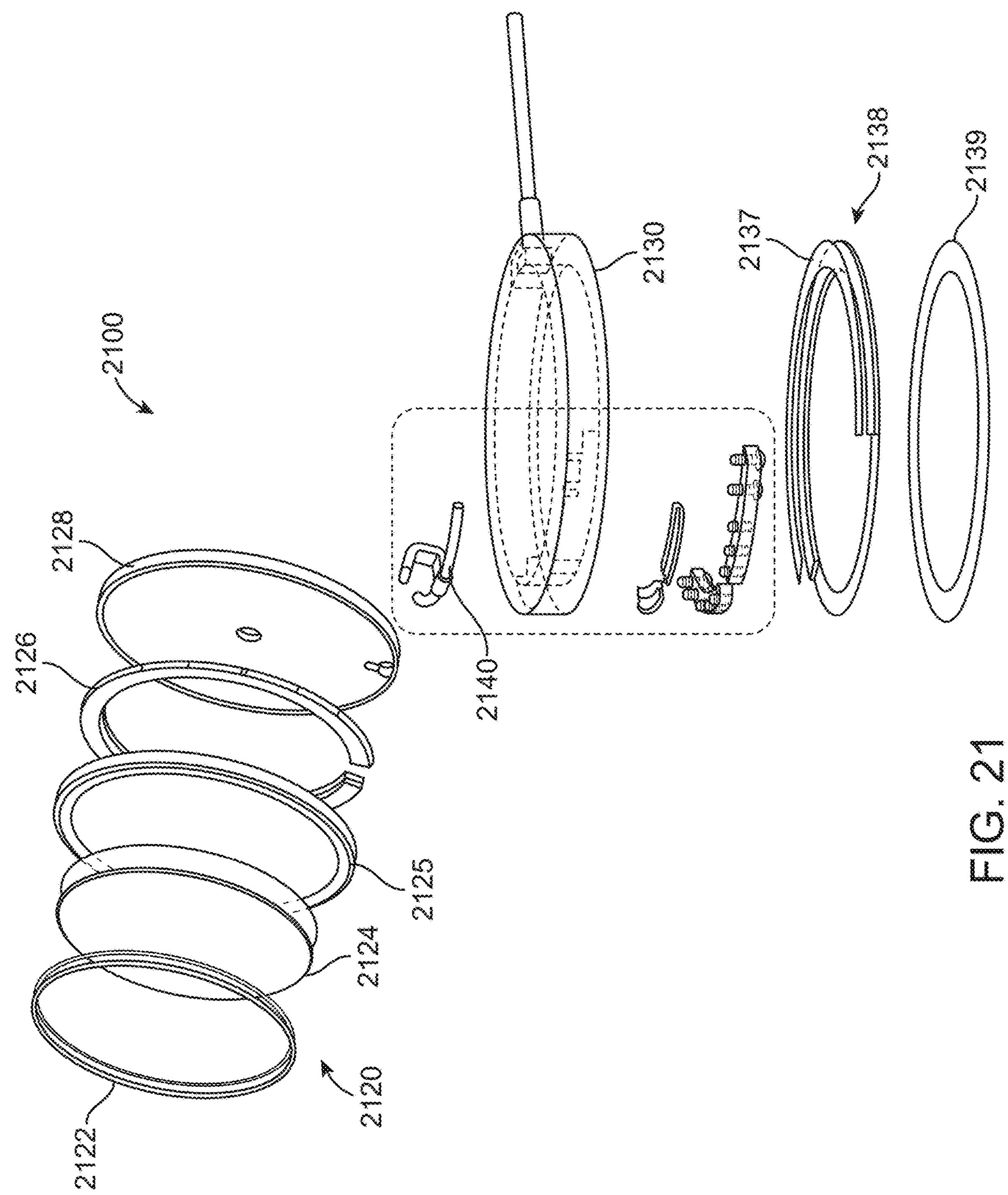
FIG. 21 is an exploded view of a wireless charger according to an embodiment of the present invention.

FIG. 21 is an exploded view of a wireless charger according to an embodiment of the present invention. Wireless charger 2100 can include wireless charging assembly 2120, base 2130 supported by foot 2138, and hinge 2140 joining base 2130 to wireless charging assembly 2120.

Wireless charging assembly 2120 can be the same or similar to wireless charging assembly 200 (shown in FIG. 2) and the other wireless charging assemblies shown herein. In this example, wireless charging assembly 2120 can include an elastomer ring 2122, a glass or plastic center 2124, top housing 2125, magnet array 2126, and bottom housing 2128. Charging coils, and NFC circuits, and other components can be included as well and are not shown for clarity. Base 2130 can be a narrow ring supported by a foot 2138 formed by silicone layer 2139 and support layer 2137. Further details of hinge 2140 and associated structures are shown in the following figure.

Figure 22:
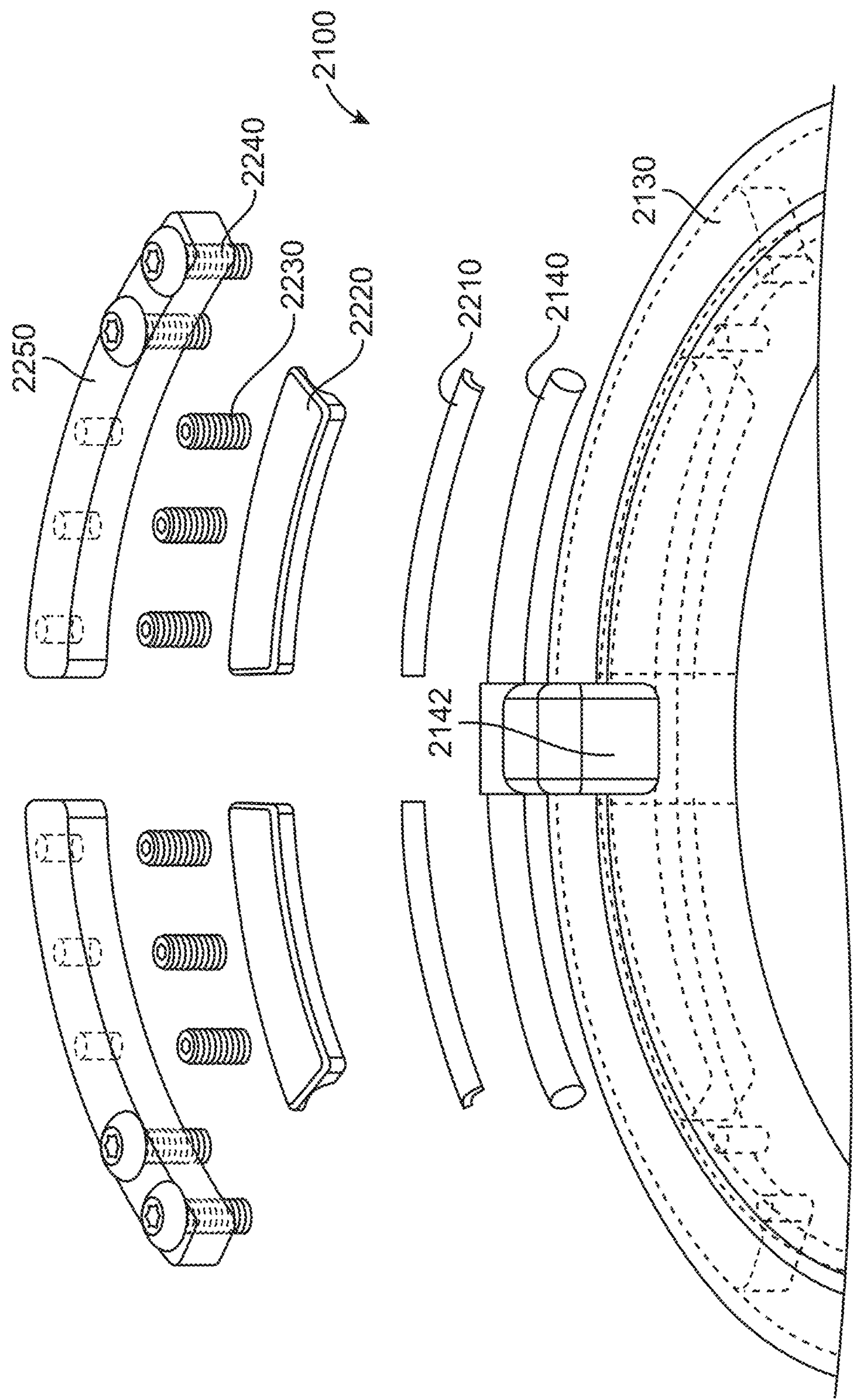
FIG. 22 illustrates a hinge for the wireless charger of FIG. 21.

FIG. 22 illustrates a hinge for the wireless charger of FIG. 21. Hinge 2140 can be a rod formed of nitinol (an alloy of nickel and titanium.) Nitinol has the property that it can bend while being able to return to its original shape. This can allow stem 2142 to be attached to hinge 2140 and move relative to base 2130, even though hinge 2140 is curved to match a portion of the circumference of base 2130. Hinge 2140 can be protected by silicone pad 2210 and held in place by compression block 2220 and support block 2250. Silicone pad 2210 can allow hinge 2140 to rotate with limited wear from compression block 2220. Fasteners 2230 and fasteners 2240 can hold compression block 2220 and support block 2250 in place.

Figure 23:
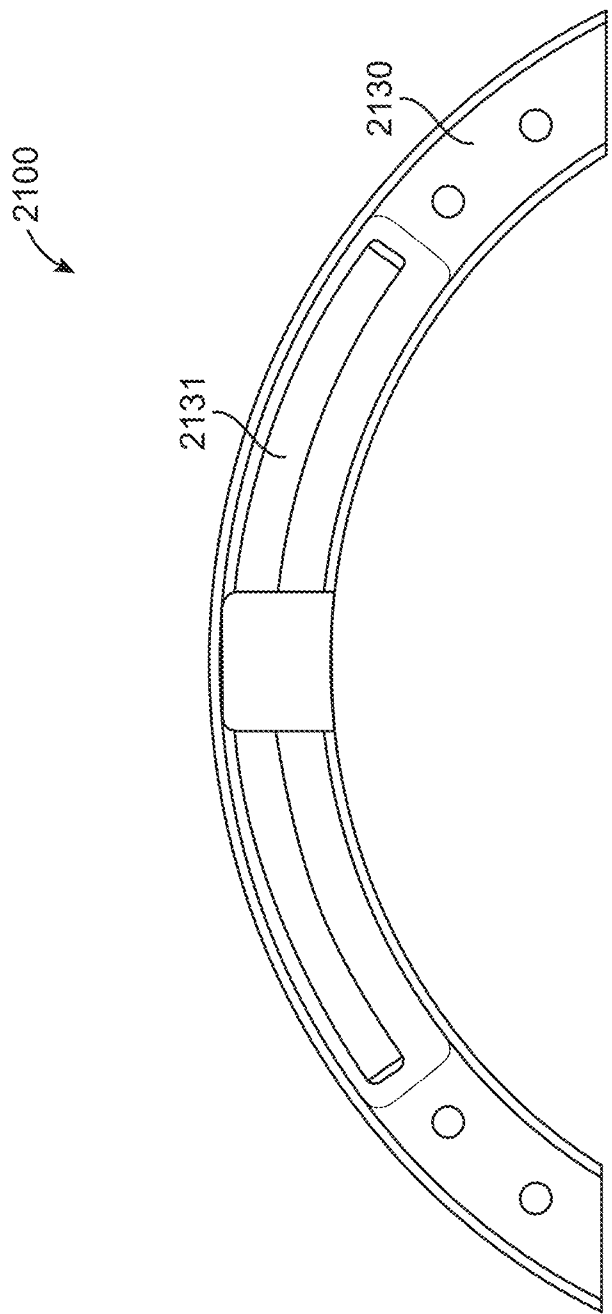
FIG. 23 illustrates a portion of the wireless charger of FIG. 21.

FIG. 23 illustrates a portion of the wireless charger of FIG. 21. In this example, a portion of base 2130 can include a groove 2131. Groove 2131 can be used to house a nitinol shaft utilized as hinge 2140 as shown in FIG. 22.

Again, in some circumstances it can be desirable to increase a clearance between a wireless charging assembly and a base of a wireless charger. This can allow the wireless charger to hold an electronic device in the portrait position, amongst other possible benefits. Examples are shown in the following figures.

Figure 24:
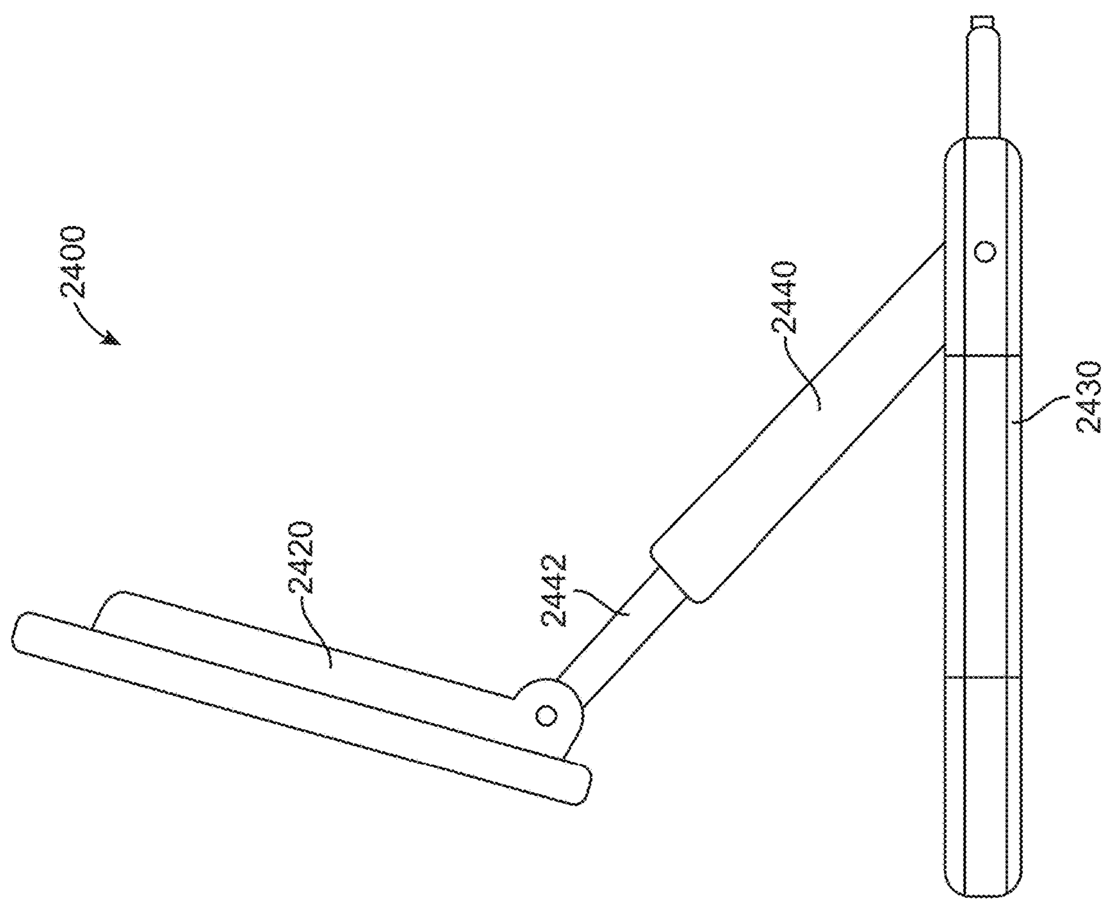
FIG. 24 illustrates a wireless charger according to an embodiment of the present invention.

FIG. 24 illustrates a wireless charger according to an embodiment of the present invention. In this example, wireless charging assembly 2420 of wireless charger 2400 can attach to base 2430 through hinge 2440. Hinge 2440 can include a telescoping portion 2442 that can be extended to increase a height of wireless charging assembly 2420 relative to base 2430. Wireless charging assembly 2420 can the same or similar to wireless charging assembly 200 (shown in FIG. 2) and the other wireless charging assemblies shown herein.

Figure 25B:
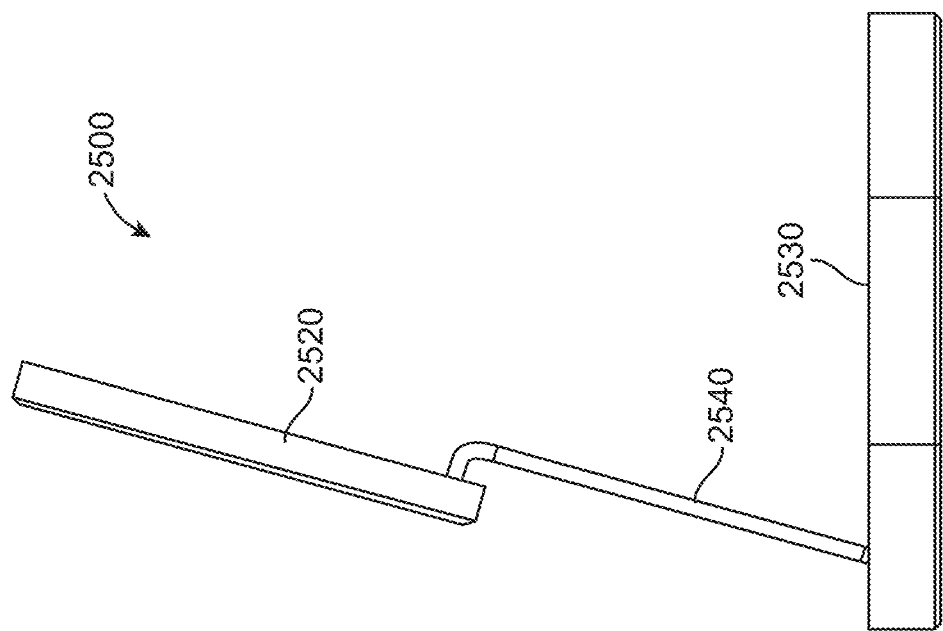
FIG. 25A and FIG. 25B illustrates another wireless charger according to an embodiment of the present invention.
Figure 25A:
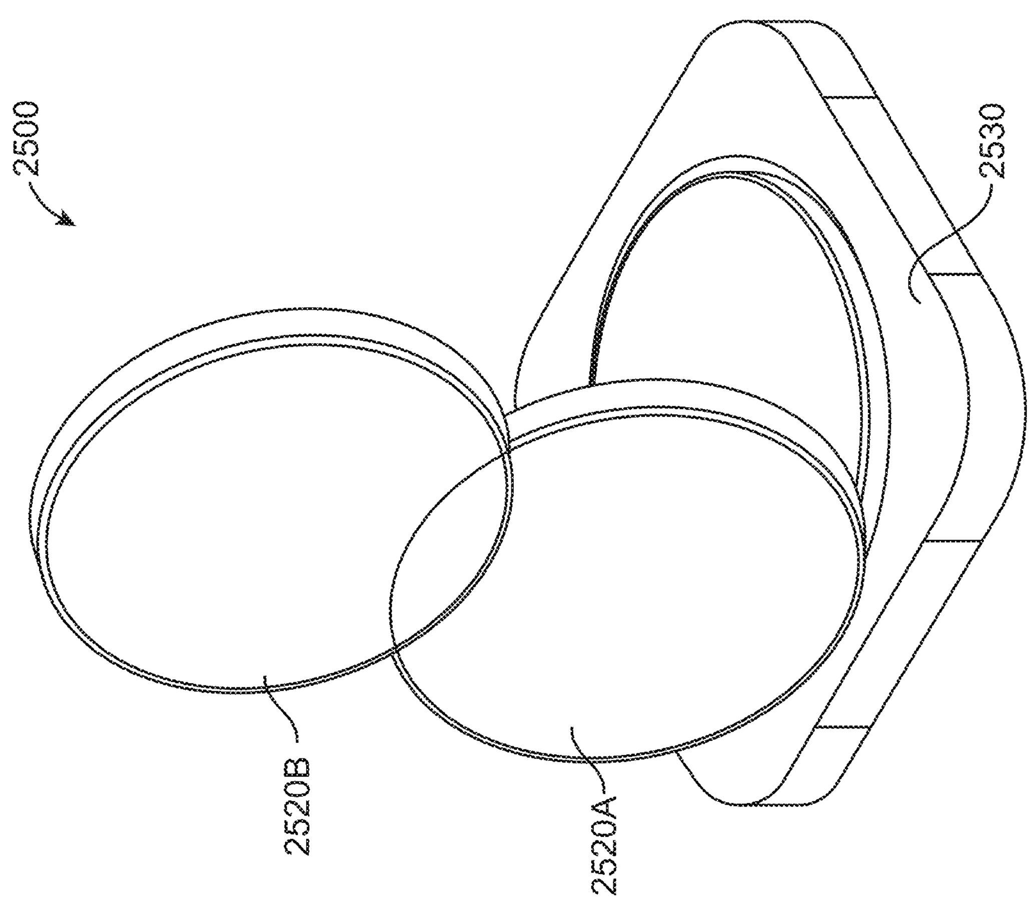

FIG. 25A and FIG. 25B illustrates another wireless charger according to an embodiment of the present invention. Wireless charger 2500 can include base 2530 and wireless charging assembly 2520. Wireless charging assembly 2520 can telescope through two positions, shown as 2520A and 2520B. Wireless charging assembly 2520 can be attached to base 2530 via hinge 2540. Examples of how this telescoping can operate are shown in the following figures.

Figure 26B:
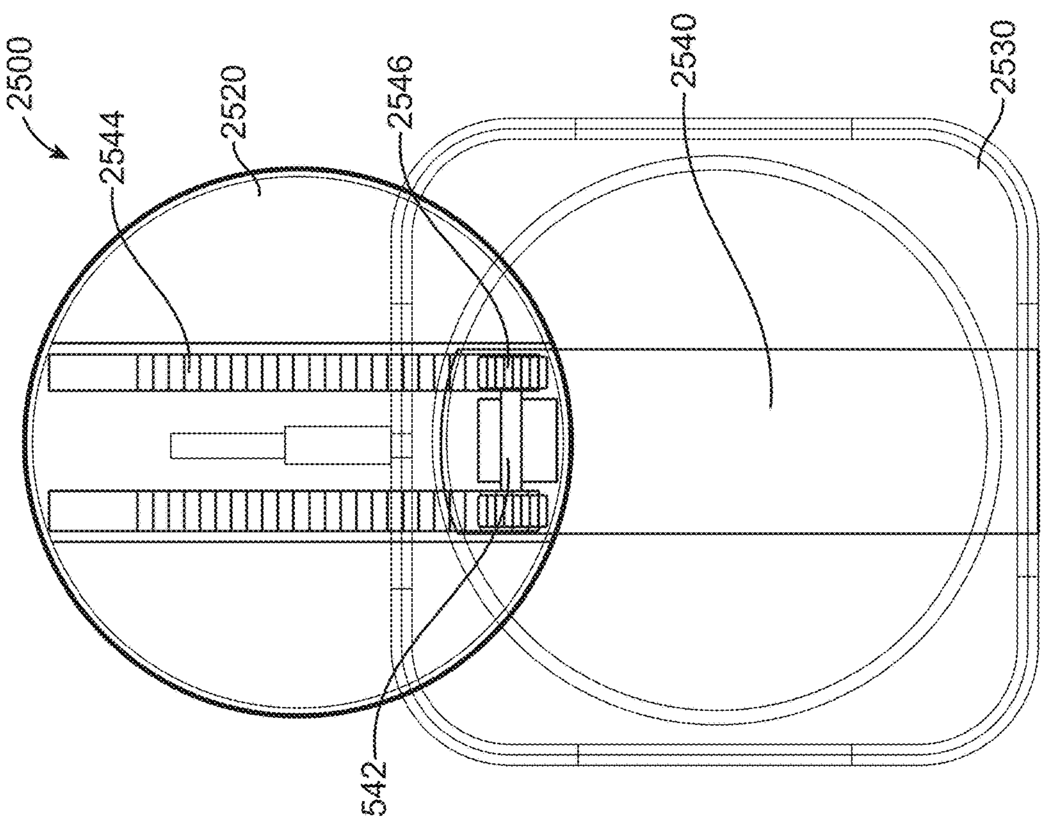
FIG. 26A and FIG. 26B illustrate a telescoping mechanism according to an embodiment of the present invention.
Figure 26A:
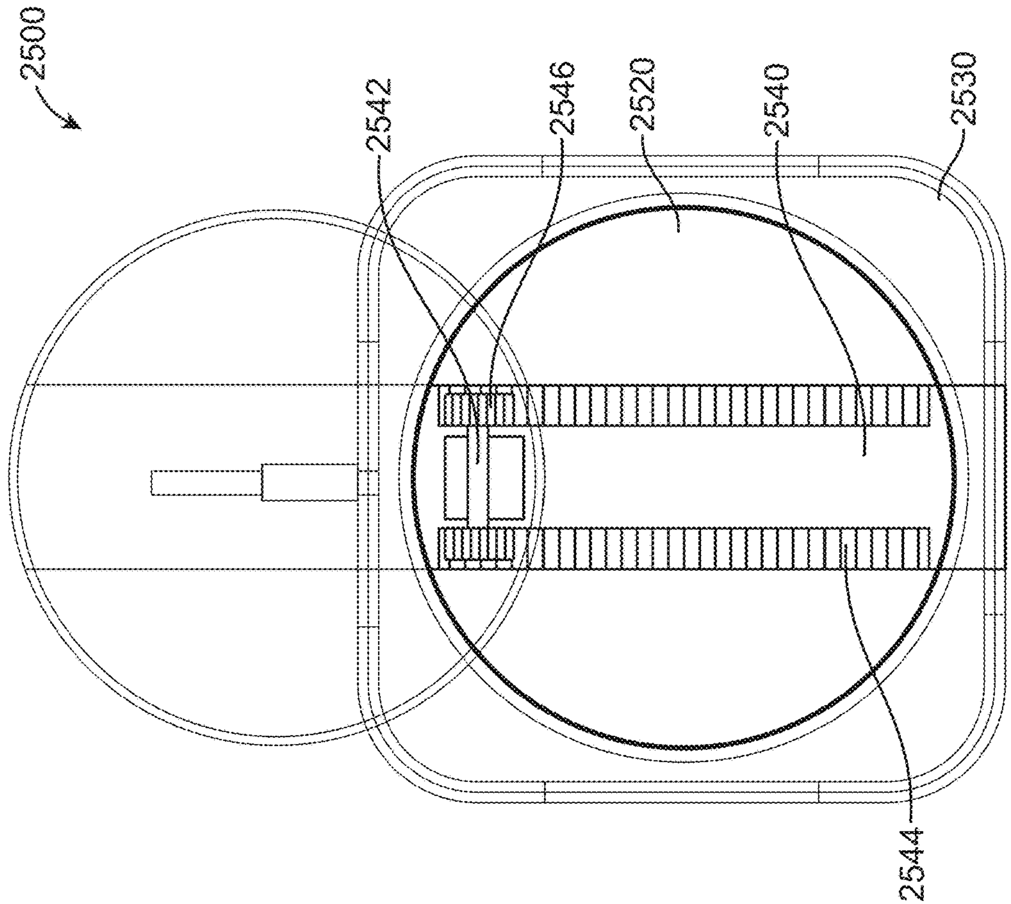

FIG. 26A and FIG. 26B illustrate a telescoping mechanism according to an embodiment of the present invention. Wireless charger 2500 can include wireless charging assembly 2520. Wireless charging assembly 2520 can the same or similar to wireless charging assembly 200 (shown in FIG. 2) and the other wireless charging assemblies shown herein. Wireless charging assembly 2520 can move along hinge 2540 from a down position showed in FIG. 26A to an up position shown in FIG. 26B. This telescoping mechanism can include a rack and pinion including rack 2544, which can be located on a backside of wireless charging assembly 2520. The telescoping mechanism can further include a pinion including axel 2542 and gears 2546. Axel 2542 and gears 2546 can be located on hinge 2540, which can join wireless charging assembly 2520 to base 2530. Rack 2544 and the pinion including axel 2542 gears 2546 can be formed by electrical discharge machining (EDM) or other procedure. As wireless charging assembly 2520 is moved, axel 2542 can rotate, and gears 2546 can mesh with gears on rack 2544.

Figure 27B:
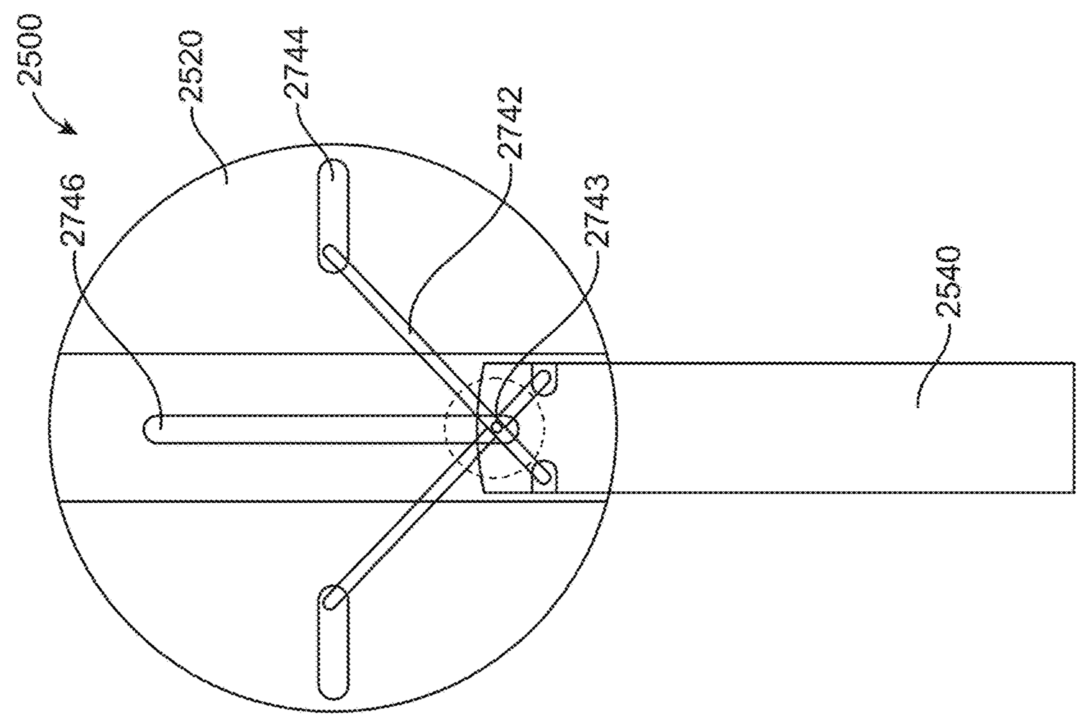
FIG. 27A and FIG. 27B illustrates another telescoping mechanism according to an embodiment of the present invention.
Figure 27A:
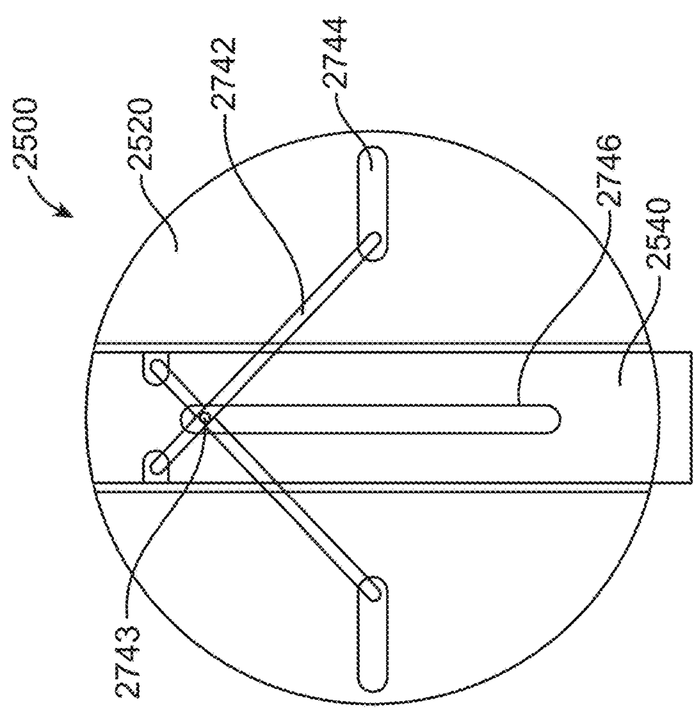

FIG. 27A and FIG. 27B illustrates another telescoping mechanism according to an embodiment of the present invention. In this example, wireless charger 2500 can include arms 2742 that can be used to position wireless charging assembly 2520 relative to hinge 2540. Wireless charging assembly 2520 can move from a down position as shown in FIG. 27A to an up position as shown in FIG. 27B. As this movement occurs, intersection 2743 of arms 2742 can travel in slot 2746. Slot 2746 can keep wireless charging assembly 2520 aligned with hinge 2540 through its travel. Slots 2744 can allow arms 2742 to flatten and reverse direction throughout the movement of wireless charging assembly 2520.

In these and other embodiments of the present invention, it can be desirable to raise and lower a wireless charging assembly of a wireless charger relative to its base. It may also be desirable to be able to the tilt a wireless charging assembly. It can also be desirable that the wireless charger fold to a compact shape for transport. Examples are shown in the following figures.

Figure 28B:
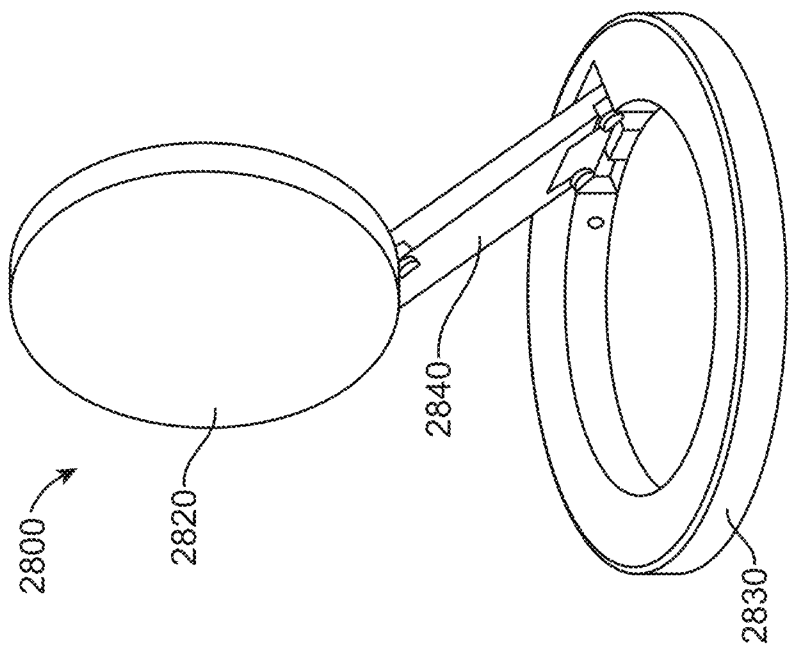
FIG. 28A and FIG. 28B illustrate a wireless charger according to an embodiment of the present invention.
Figure 28A:
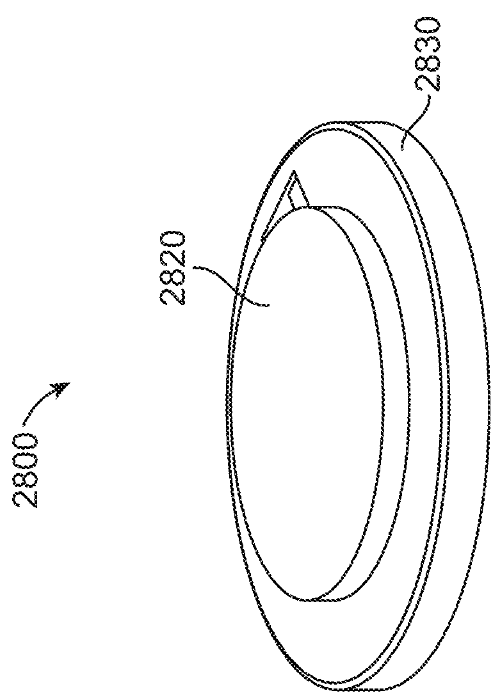

FIG. 28A and FIG. 28B illustrate a wireless charger according to an embodiment of the present invention. Wireless charger 2800 can include wireless charging assembly 2820 and base 2830. Wireless charging assembly 2820 and base and 2830 can be joined by hinge 2840. Wireless charging assembly 2820 can the same or similar to wireless charging assembly 200 (shown in FIG. 2) and the other wireless charging assemblies shown herein.

Figure 29B:
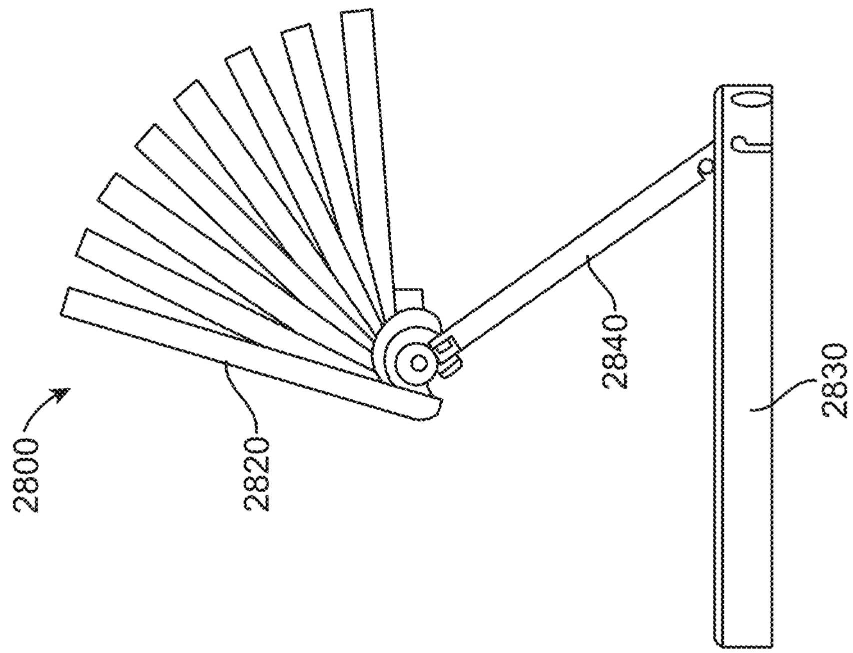
FIG. 29A and FIG. 29B illustrate movements of portions of the wireless charger of FIG. 28A and FIG. 28B.
Figure 29A:
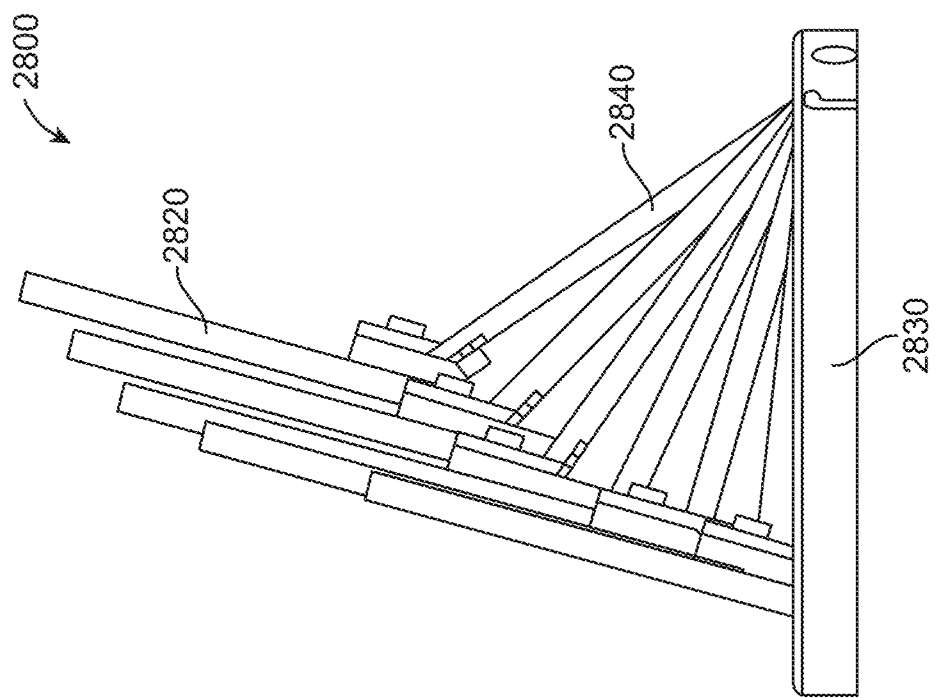

FIG. 29A and FIG. 29B illustrate movements of portions of the wireless charger of FIG. 28A and FIG. 28B. Hinge 2840 can move relative to base 2830 as shown in FIG. 29A. This can change a clearance of wireless charging assembly 2820 relative to base 2830. Wireless charging assembly 2820 can further tilt relative to hinge 2840 through a range of motion as shown in FIG. 29B.

Figure 30:
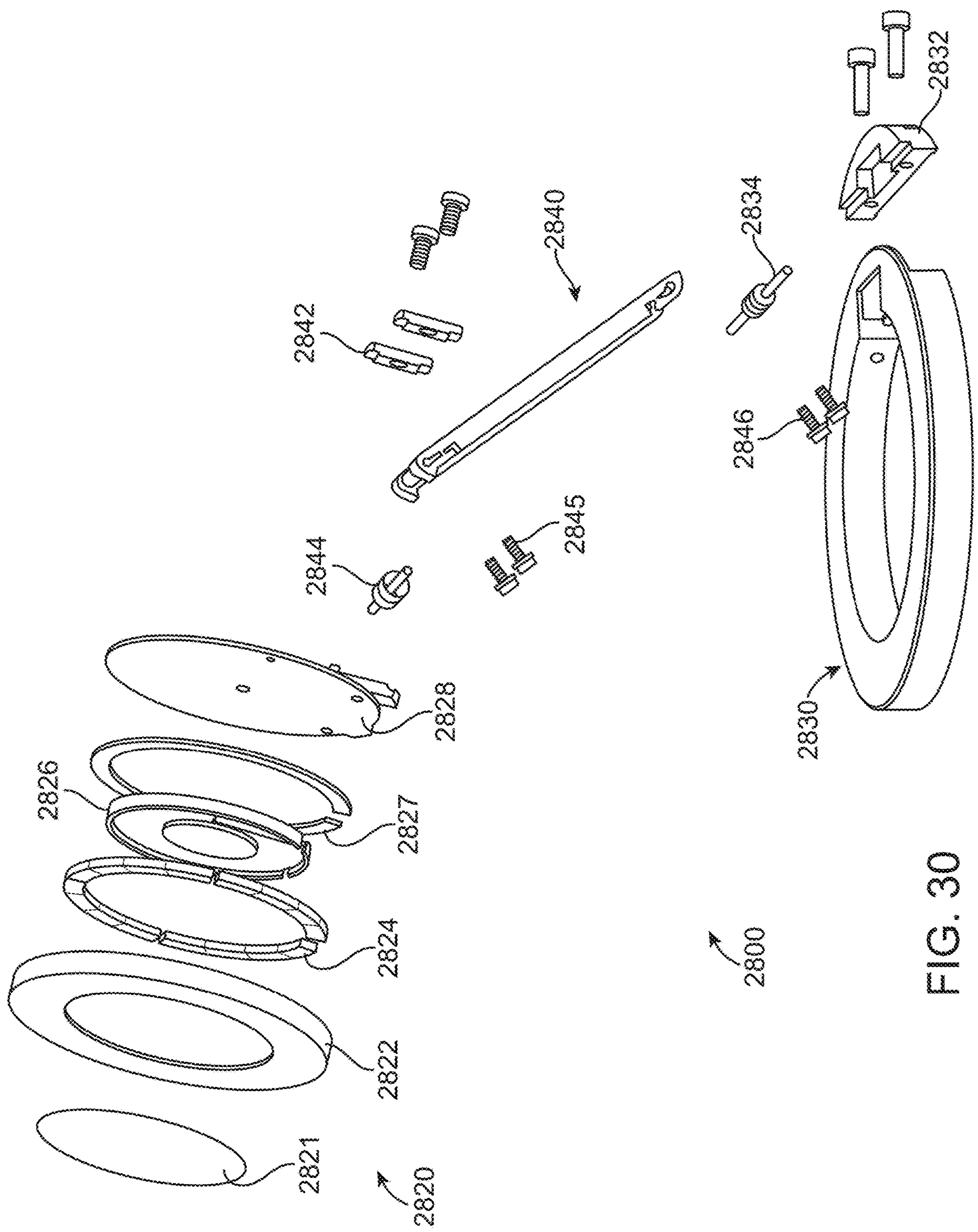
FIG. 30 is an exploded view of the wireless charger of FIG. 28A and FIG. 28B.

FIG. 30 is an exploded view of the wireless charger of FIG. 28A and FIG. 28B. Wireless charger 2800 can include wireless charging assembly 2820, which can be the same or similar to wireless charging assembly 200 (shown in FIG. 2.) Wireless charging assembly 22820 can include friction pad 2821, which may be formed of silicone or other material, attached to a front of plastic cap 2822. Plastic cap 2822 can be attached to support plate 2828 to form an enclosure for magnet array 2824, DC shield 2827, and coil and ferrite 2826.

Hinge 2840 can be attached to a back surface of support plate 2828 by attachment lugs and fasteners 2842. Wireless charging assembly 2820 can rotate about hinge 2840 at upper shaft 2844. Hinge 2840 can rotate about base 2830 at lower shaft 2834, which can be held in place by cowling and fasteners 2832. Friction screws 2845 can be used to adjust the resistance of movement of wireless charging assembly 2820 relative to hinge 2840. Friction screws 2846 can be used to adjust the resistance movement of hinge 2840 relative to base 2830. Pressure to upper shaft 2844 and lower shaft 2834 can be adjusted by turning friction screws 2845 and friction screws 2846 respectively.

Figure 31B:
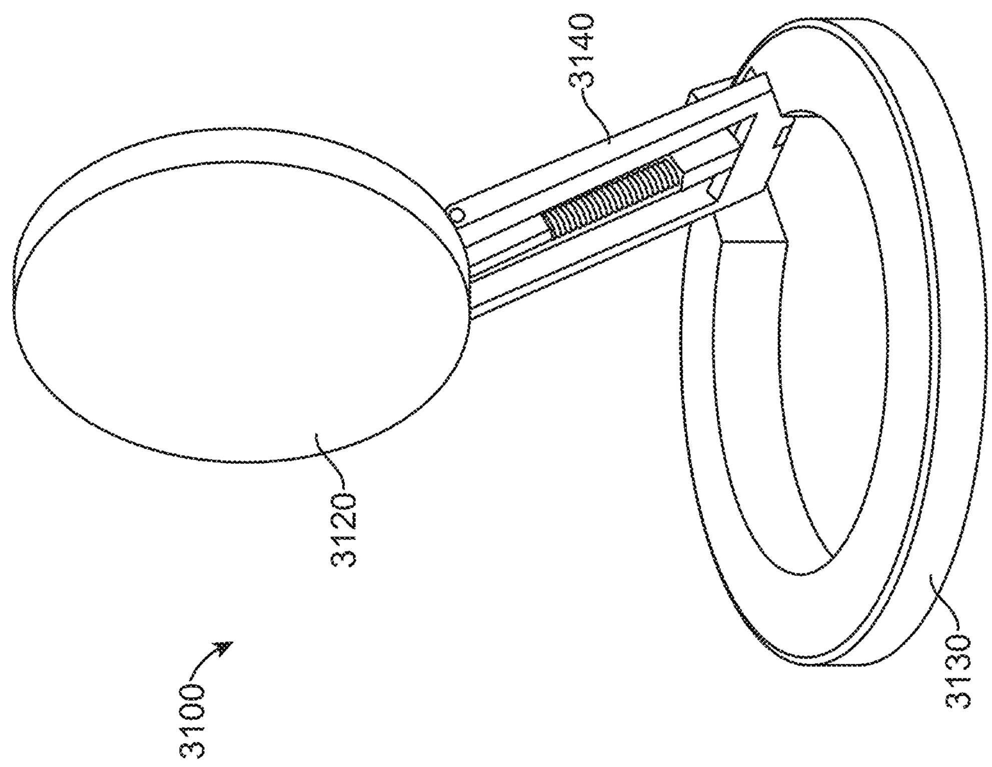
FIG. 31A and FIG. 31B illustrate a wireless charger according to an embodiment of the present invention.
Figure 31A:
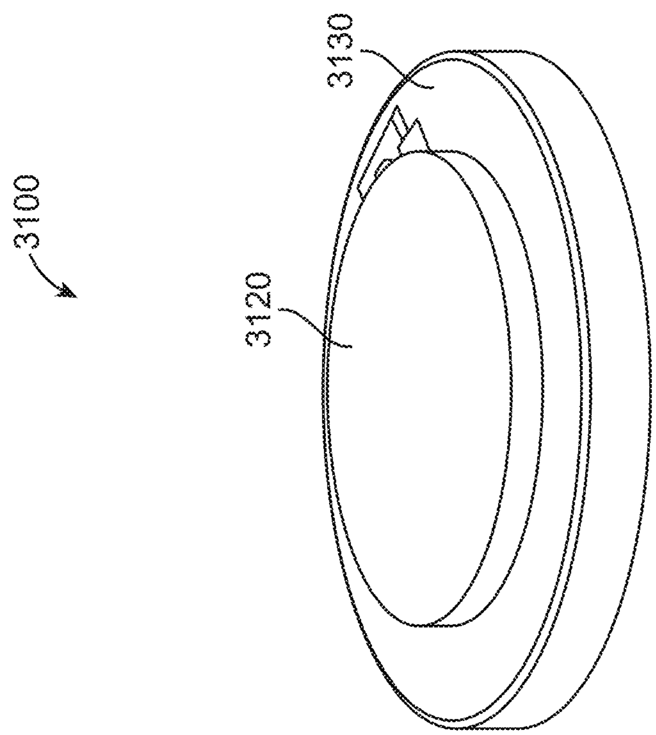

FIG. 31A and FIG. 31B illustrate a wireless charger according to an embodiment of the present invention. Wireless charger 3100 can fold into a compact shape as shown in FIG. 31A. Wireless charger 3100 can include wireless charging assembly 3120 and base 3130 joined by hinge 3140. Wireless charging assembly 3120 can the same or similar to wireless charging assembly 200 (shown in FIG. 2) and the other wireless charging assemblies shown herein.

Figure 32B:
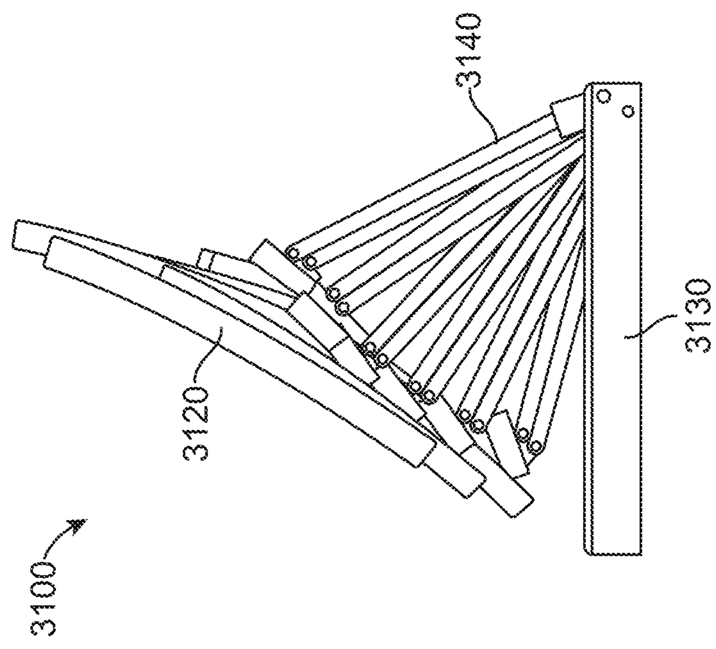
FIG. 32A and FIG. 32B illustrate movements of portions of the wireless charger of FIG. 31A and FIG. 31B.
Figure 32A:
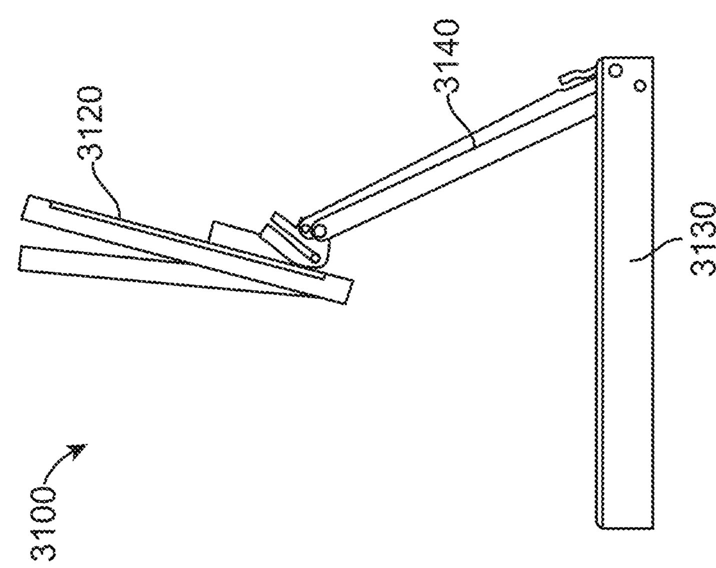

FIG. 32A and FIG. 32B illustrate movements of portions of the wireless charger of FIG. 31A and FIG. 31B. Wireless charging assembly 3120 can tilt relative to hinge 3140 through a range of motion as shown in FIG. 32A. Hinge 3140 can move relative to base 3130 as shown in FIG. 32B. This can change a clearance of wireless charging assembly 3120 relative to base 3130.

Figure 33:
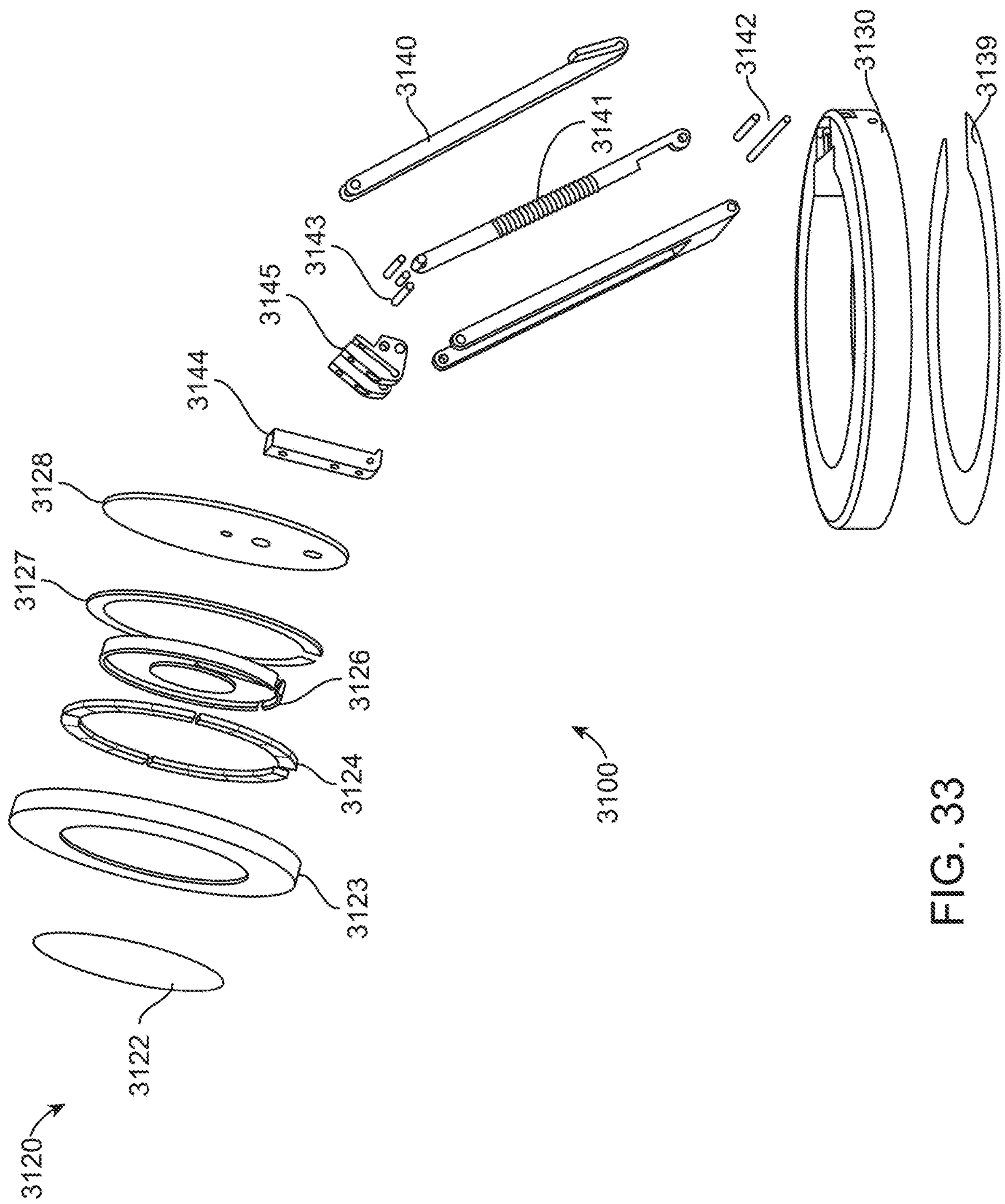
FIG. 33 is an exploded view of the wireless charger of FIG. 31A and FIG. 31B.

FIG. 33 is an exploded view of the wireless charger of FIG. 31A and FIG. 31B. Wireless charging assembly 3120 of wireless charger 3100 can include friction pad 3122, which can be formed of silicone or other material, attached to a front of plastic cap 3123. Plastic cap 3123 can be attached to support plate 3128 to form an enclosure for magnet array 3124, DC shield 3127, and coil and ferrite 3126.

Hinge 3140 can be attached to a back surface of support plate 3128 by attachment lug 3144. Wireless charging assembly 3120 and attachment lug 3144 can tilt relative to bracket 3145 as shown by the movement in FIG. 32A. Bracket 3145 can rotate about hinge 3140 at upper shafts 3143. Hinge 3140 can rotate about base 3130 at lower shafts 3142, which can be secured in base 3130. This movement can be seen in FIG. 32B. Base 3130 can reside on silicone or other pad 3139. Spring 3141 can provide tension for hinge 3140.

Figure 34B:
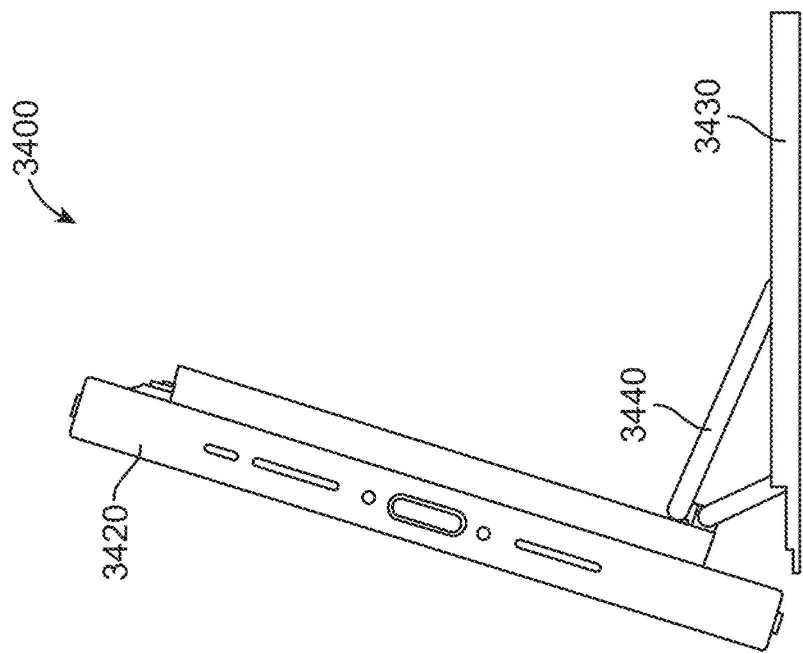
FIG. 34A and FIG. 34B illustrate a wireless charger according to an embodiment of the present invention.
Figure 34A:
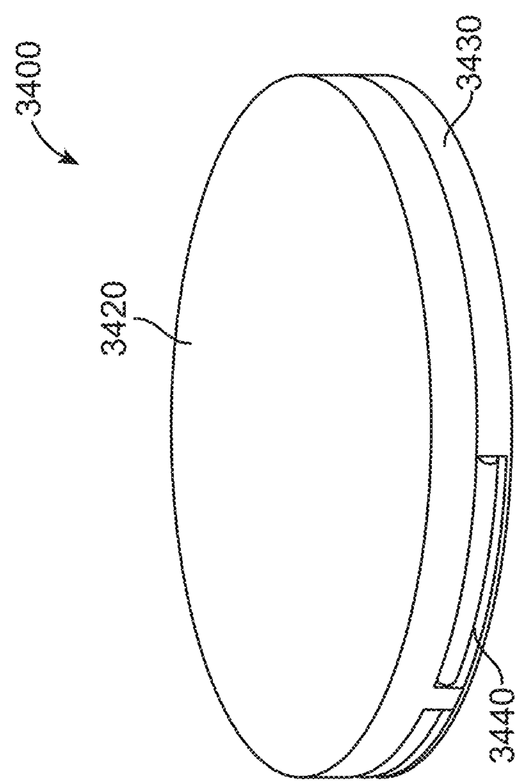

FIG. 34A and FIG. 34B illustrate a wireless charger according to an embodiment of the present invention. Wireless charger 3400 can fold into a compact shape as shown in FIG. 34A. Wireless charger 3400 can include wireless charging assembly 3420 and base 3430, which can be connected together through hinge 3440. Wireless charging assembly 3420 can the same or similar to wireless charging assembly 200 (shown in FIG. 2) and the other wireless charging assemblies shown herein.

Figure 35B:
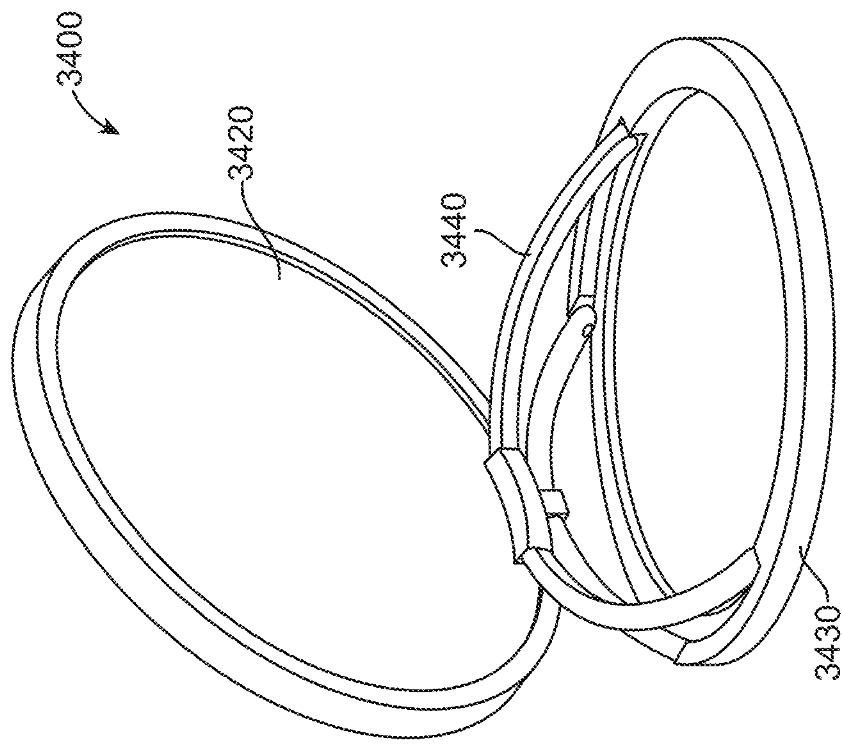
FIG. 35A and FIG. 35B further illustrate the wireless charger of FIG. 34A.
Figure 35A:
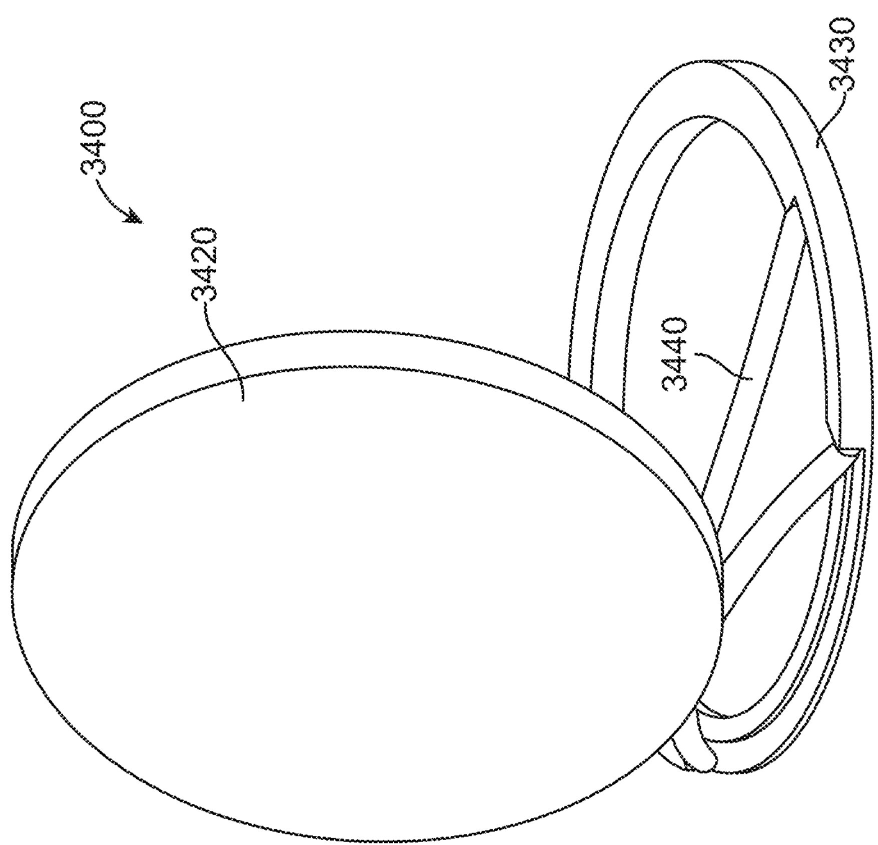

FIG. 35A and FIG. 35B illustrate the wireless charger of FIG. 34A and FIG. 34B. Wireless charger 3400 can include wireless charging assembly 3420 and base 3430, which can be connected together through hinge 3440.

Again, the various magnet arrays shown herein can be fixed in place, or they can be movable between a first position and a second position. Examples of fixed magnet arrays that can be used for these magnet arrays are shown in the following figures.

Described herein are various embodiments of magnetic alignment systems and components thereof. A magnetic alignment system can include annular alignment components comprising a ring of magnets having a particular magnetic orientation or pattern of magnetic orientations such that a "primary" annular alignment component can attract and hold a complementary "secondary" annular alignment component. In some embodiments described below, the primary annular alignment component is assumed to be in a wireless charging device, surrounding an inductive charging coil, while the secondary annular alignment component is assumed to be in a portable electronic device, surrounding a receiver coil that can receive power from the inductive charging coil of the wireless charging device. Many variations are possible; for instance, a "primary" annular alignment component can be in a portable electronic device while a "secondary" annular alignment component can be in a wireless charging device. Also described herein is an "auxiliary" annular alignment component that is complementary to the primary and secondary annular alignment components such that one surface of the auxiliary annular alignment component is attracted to the primary alignment component while the opposite surface is attracted to the secondary alignment component. An auxiliary annular alignment component can be disposed, e.g., in a case for a portable electronic device.

In some embodiments, a magnetic alignment system can also include a rotational alignment component that facilitates aligning two devices in a preferred rotational orientation. It should be understood that any device that has an annular alignment component might or might not also have a rotational alignment component.

In some embodiments, a magnetic alignment system can also include an near-field communication (NFC) coil and supporting circuitry to allow devices to identify themselves to each other using an NFC protocol. NFC coils can be disposed inboard of the annular alignment component or outboard of the annular alignment component. It should be understood that an NFC component is optional in the context of providing magnetic alignment.

Figure 36:
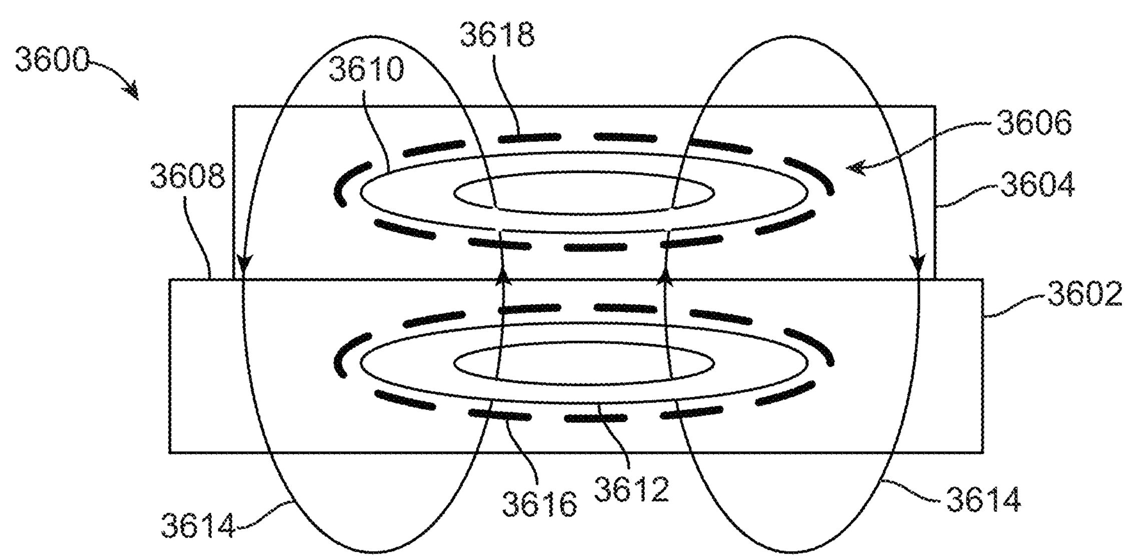
FIG. 36 shows a simplified representation of a wireless charging system incorporating a magnetic alignment system according to some embodiments.

FIG. 36 shows a simplified representation of a wireless charging system 3600 incorporating a magnetic alignment system 3606 according to some embodiments. A portable electronic device 3604 is positioned on a charging surface 3608 of a wireless charging device 3602. Portable electronic device 3604 can be a consumer electronic device, such as a smart phone, tablet, wearable device, or the like, or any other electronic device for which wireless charging is desired. Wireless charging device 3602 can be any device that is configured to generate time-varying magnetic flux to induce a current in a suitably configured receiving device. For instance, wireless charging device 3602 can be any of the wireless chargers herein, a wireless charging mat, puck, docking station, or the like. Wireless charging device 3602 can include or have access to a power source such as battery power or standard AC power.

To enable wireless power transfer, portable electronic device 3604 and wireless charging device 3602 can include inductive coils 3610 and 3612, respectively, which can operate to transfer power between them. For example, inductive coil 3612 can be a transmitter coil that generates a time-varying magnetic flux 3614, and inductive coil 3610 can be a receiver coil in which an electric current is induced in response to time-varying magnetic flux 3614. The received electric current can be used to charge a battery of portable electronic device 3604, to provide operating power to a component of portable electronic device 3604, and/or for other purposes as desired. ("Wireless power transfer" and "inductive power transfer," as used herein, refer generally to the process of generating a time-varying magnetic field in a conductive coil of a first device that induces an electric current in a conductive coil of a second device.)

To enable efficient wireless power transfer, it is desirable to align inductive coils 3612 and 3610. According to some embodiments, magnetic alignment system 3606 can provide such alignment. In the example shown in FIG. 36, magnetic alignment system 3606 includes a primary magnetic alignment component 3616 disposed within or on a surface of wireless charging device 3602 and a secondary magnetic alignment component 3618 disposed within or on a surface of portable electronic device 3604. Primary alignment components 3616 and secondary alignment components 3618 are configured to magnetically attract one another into an aligned position in which inductive coils 3610 and 3612 are aligned with one another to effectuate wireless power transfer.

Primary alignment components 3616 can be sued as magnet array 260 (shown in FIG. 2) or as any of the other magnet arrays shown herein or otherwise provided by embodiments of the present invention.

According to embodiments described herein, a magnetic alignment component (including a primary or secondary alignment component) of a magnetic alignment system can be formed of arcuate magnets arranged in an annular configuration. In some embodiments, each magnet can have its magnetic polarity oriented in a desired direction so that magnetic attraction between the primary and secondary magnetic alignment components provides a desired alignment. In some embodiments, an arcuate magnet can include a first magnetic region with magnetic polarity oriented in a first direction and a second magnetic region with magnetic polarity oriented in a second direction different from (e.g., opposite to) the first direction. As will be described, different configurations can provide different degrees of magnetic field leakage.

Figure 37A:
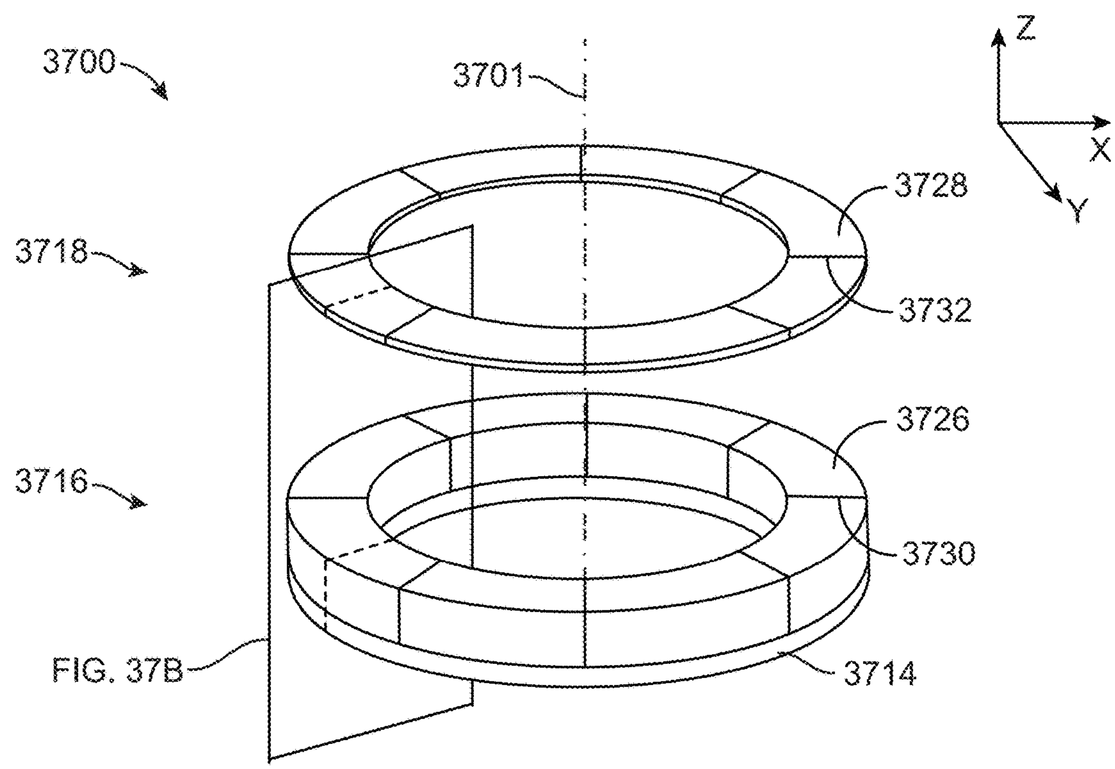
FIG. 37A shows a perspective view of a magnetic alignment system according to some embodiments.
Figure 37B:
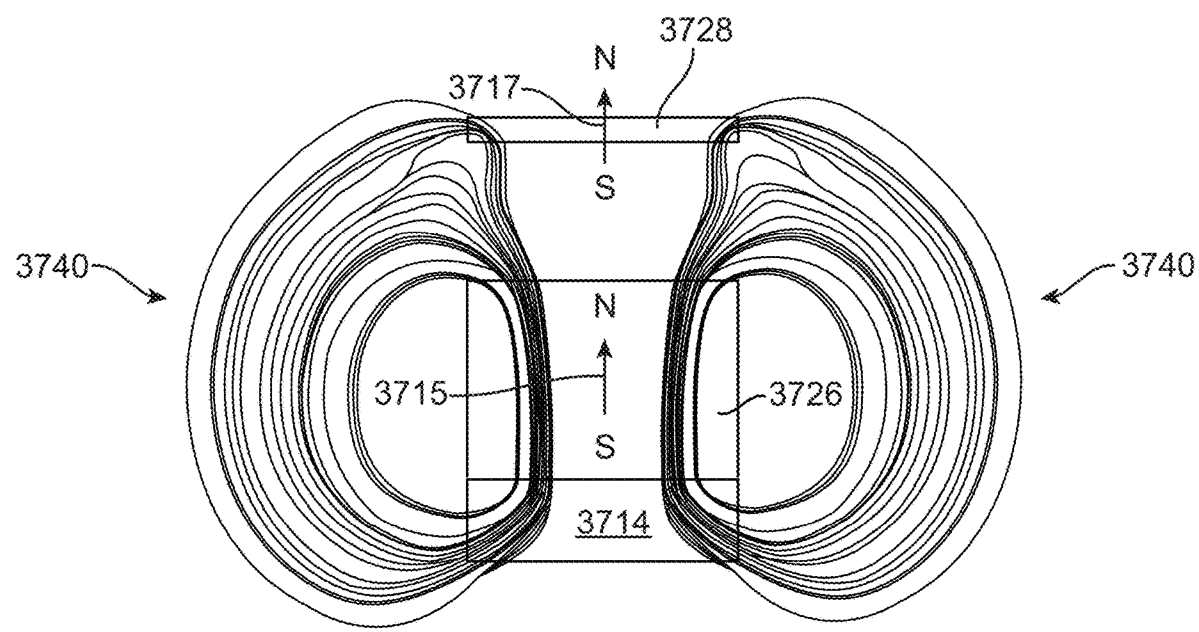
FIG. 37B shows a cross-section through the magnetic alignment system of FIG. 37A.

FIG. 37A shows a perspective view of a magnetic alignment system 3700 according to some embodiments, and FIG. 37B shows a cross-section through magnetic alignment system 3700 across the cut plane indicated in FIG. 37A. Magnetic alignment system 3700 can be an implementation of magnetic alignment system 3606 of FIG. 36. In magnetic alignment system 3700, the alignment components all have magnetic polarity oriented in the same direction (along the axis of the annular configuration). For convenience of description, an “axial” direction (also referred to as a “longitudinal” or “z” direction) is defined to be parallel to an axis of rotational symmetry 3701 of magnetic alignment system 3700, and a transverse plane (also referred to as a “lateral” or “x” or “y” direction) is defined to be normal to axis 3701. The term “proximal side” is used herein to refer to a side of one alignment component that is oriented toward the other alignment component when the magnetic alignment system is aligned, and the term “distal side” is used to refer to a side opposite the proximal side.

As shown in FIG. 37A, magnetic alignment system 3700 can include a primary alignment component 3716 (which can be an implementation of primary alignment component 3616 of FIG. 36) and a secondary alignment component 3718 (which can be an implementation of secondary alignment component 3618 of FIG. 36). Primary alignment component 3716 and secondary alignment component 3718 have annular shapes and may also be referred to as “annular” alignment components. The particular dimensions can be chosen as desired. In some embodiments, primary alignment component 3716 and secondary alignment component 3718 can each have an outer diameter of about 404 mm and a radial width of about 6 mm. The outer diameters and radial widths of primary alignment component 3716 and secondary alignment component 3718 need not be exactly equal. For instance, the radial width of secondary alignment component 3718 can be slightly less than the radial width of primary alignment component 3716 and/or the outer diameter of secondary alignment component 3718 can also be slightly less than the radial width of primary alignment component 3716 so that, when in alignment, the inner and outer sides of primary alignment component 3716 extend beyond the corresponding inner and outer sides of secondary alignment component 3718. Thicknesses (or axial dimensions) of primary alignment component 3716 and secondary alignment component 3718 can also be chosen as desired. In some embodiments, primary alignment component 3716 has a thickness of about 1.5 mm while secondary alignment component 3718 has a thickness of about 0.37 mm.

Primary alignment component 3716 can include a number of sectors, each of which can be formed of one or more primary arcuate magnets 3726, and secondary alignment component 3718 can include a number of sectors, each of which can be formed of one or more secondary arcuate magnets 3728. In the example shown, the number of primary magnets 3726 is equal to the number of secondary magnets 3728, and each sector includes exactly one magnet, but this is not required. Primary magnets 3726 and secondary magnets 3728 can have arcuate (or curved) shapes in the transverse plane such that when primary magnets 3726 (or secondary magnets 3728) are positioned adjacent to one another end-to-end, primary magnets 3726 (or secondary magnets 3728) form an annular structure as shown. In some embodiments, primary magnets 3726 can be in contact with each other at interfaces 3730, and secondary magnets 3728 can be in contact with each other at interfaces 3732. Alternatively, small gaps or spaces may separate adjacent primary magnets 3726 or secondary magnets 3728, providing a greater degree of tolerance during manufacturing.

In some embodiments, primary alignment component 3716 can also include an annular shield 3714 disposed on a distal surface of primary magnets 3726. In some embodiments, shield 3714 can be formed as a single annular piece of material and adhered to primary magnets 3726 to secure primary magnets 3726 into position. Shield 3714 can be formed of a material that has high magnetic permeability, such as stainless steel, and can redirect magnetic fields to prevent them from propagating beyond the distal side of primary alignment component 3716, thereby protecting sensitive electronic components located beyond the distal side of primary alignment component 3716 from magnetic interference.

Primary magnets 3726 and secondary magnets 3728 can be made of a magnetic material such as an NdFeB material, other rare earth magnetic materials, or other materials that can be magnetized to create a persistent magnetic field. Each primary magnet 3726 and each secondary magnet 3728 can have a monolithic structure having a single magnetic region with a magnetic polarity aligned in the axial direction as shown by magnetic polarity indicators 3715, 3717 in FIG. 37B. For example, each primary magnet 3726 and each secondary magnet 3728 can be a bar magnet that has been ground and shaped into an arcuate structure having an axial magnetic orientation. (As will be apparent, the term “magnetic orientation” refers to the direction of orientation of the magnetic polarity of a magnet.) In the example shown, primary magnet 3726 has its north pole oriented toward the proximal surface and south pole oriented toward the distal surface while secondary magnet 3728 has its south pole oriented toward the proximal surface and north pole oriented toward the distal surface. In other embodiments, the magnetic orientations can be reversed such that primary magnet 3726 has its south pole oriented toward the proximal surface and north pole oriented toward the distal surface while secondary magnet 3728 has its north pole oriented toward the proximal surface and south pole oriented toward the distal surface.

As shown in FIG. 37B, the axial magnetic orientation of primary magnet 3726 and secondary magnet 3728 can generate magnetic fields 3740 that generate an attractive force between primary magnet 3726 and secondary magnet 3728, thereby facilitating alignment between respective electronic devices in which primary alignment component 3716 and secondary alignment component 3718 are disposed (e.g., as shown in FIG. 36). While shield 3714 can redirect some of magnetic fields 3740 away from regions below primary magnet 3726, magnetic fields 3740 may still propagate to regions laterally adjacent to primary magnet 3726 and secondary magnet 3728. In some embodiments, the lateral propagation of magnetic fields 3740 may result in magnetic field leakage to other magnetically sensitive components. For instance, if an inductive coil having a ferromagnetic shield is placed in the interior region of annular primary alignment component 3716 (or secondary alignment component 3718), leakage of magnetic fields 3740 may saturate the ferrimagnetic shield, which can degrade wireless charging performance.

It will be appreciated that magnetic alignment system 3700 is illustrative and that variations and modifications are possible. For instance, while primary alignment component 3716 and secondary alignment component 3718 are each shown as being constructed of eight arcuate magnets, other embodiments may use a different number of magnets, such as sixteen magnets, thirty-six magnets, or any other number of magnets, and the number of primary magnets need not be equal to the number of secondary magnets. In other embodiments, primary alignment component 3716 and/or secondary alignment component 3718 can each be formed of a single, monolithic annular magnet; however, segmenting magnetic alignment components 3716 and 3718 into arcuate magnets may improve manufacturing because smaller arcuate segments are less brittle than a single, monolithic annular magnet and are less prone to yield loss due to physical stresses imposed on the magnetic material during manufacturing.

As noted above with reference to FIG. 37B, a magnetic alignment system with a single axial magnetic orientation may allow lateral leakage of magnetic fields, which may adversely affect performance of other components of an electronic device. Accordingly, some embodiments provide magnetic alignment systems with reduced magnetic field leakage. Examples will now be described.

Figure 38A:
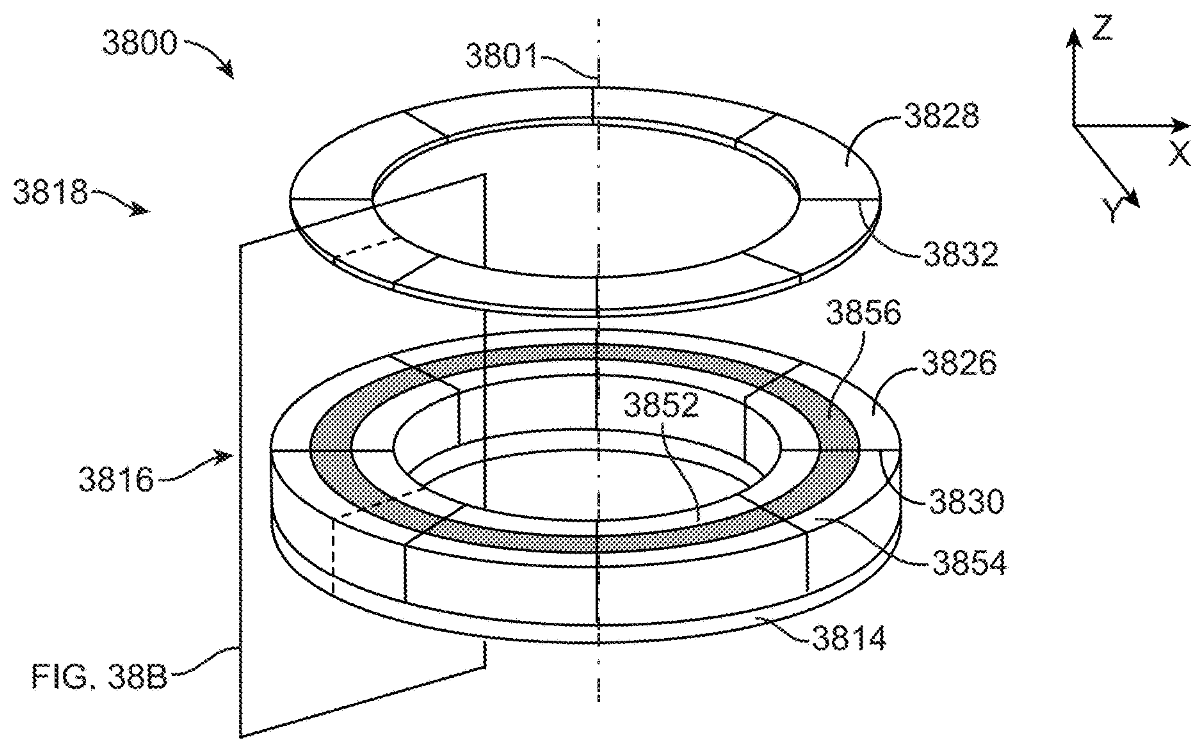
FIG. 38A shows a perspective view of a magnetic alignment system according to some embodiments.
Figure 38B:
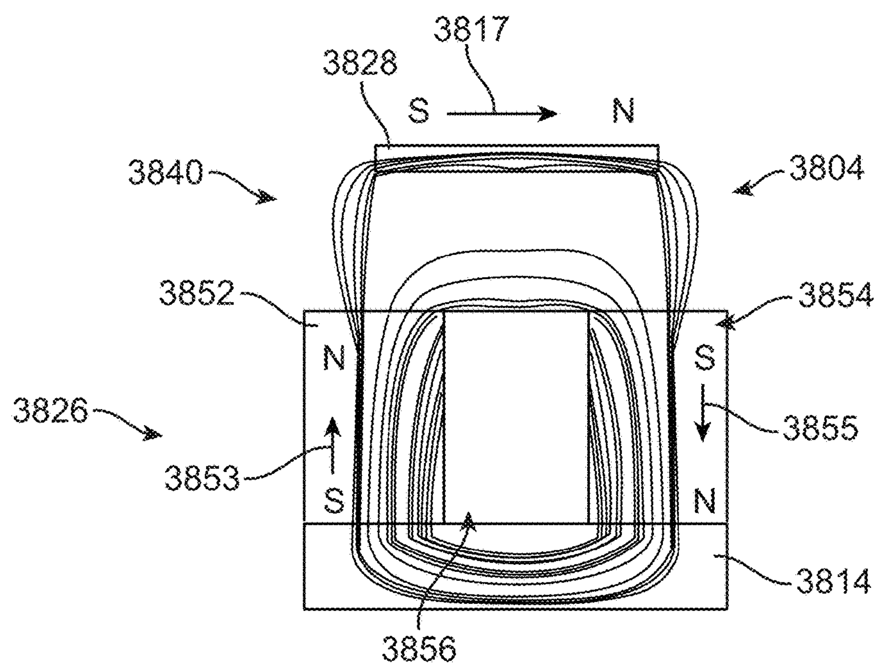
FIG. 38B shows a cross-section through the magnetic alignment system of FIG. 38A.

FIG. 38A shows a perspective view of a magnetic alignment system 3800 according to some embodiments, and FIG. 38B shows a cross-section through magnetic alignment system 3800 across the cut plane indicated in FIG. 38A. Magnetic alignment system 3800 can be an implementation of magnetic alignment system 3606 of FIG. 36. In magnetic alignment system 3800, the alignment components have magnetic components configured in a "closed loop" configuration as described below.

As shown in FIG. 38A, magnetic alignment system 3800 can include a primary alignment component 3816 (which can be an implementation of primary alignment component 3616 of FIG. 36) and a secondary alignment component 3818 (which can be an implementation of secondary alignment component 3618 of FIG. 36). Primary alignment component 3816 and secondary alignment component 3818 have annular shapes and may also be referred to as "annular" alignment components. The particular dimensions can be chosen as desired. In some embodiments, primary alignment component 3816 and secondary alignment component 3818 can each have an outer diameter of about 404 mm and a radial width of about 6 mm. The outer diameters and radial widths of primary alignment component 3816 and secondary alignment component 3818 need not be exactly equal. For instance, the radial width of secondary alignment component 3818 can be slightly less than the radial width of primary alignment component 3816 and/or the outer diameter of secondary alignment component 3818 can also be slightly less than the radial width of primary alignment component 3816 so that, when in alignment, the inner and outer sides of primary alignment component 3816 extend beyond the corresponding inner and outer sides of secondary alignment component 3818. Thicknesses (or axial dimensions) of primary alignment component 3816 and secondary alignment component 3818 can also be chosen as desired. In some embodiments, primary alignment component 3816 has a thickness of about 1.5 mm while secondary alignment component 3818 has a thickness of about 0.37 mm.

Primary alignment component 3816 can include a number of sectors, each of which can be formed of a number of primary magnets 3826, and secondary alignment component 3818 can include a number of sectors, each of which can be formed of a number of secondary magnets 3828. In the example shown, the number of primary magnets 3826 is equal to the number of secondary magnets 3828, and each sector includes exactly one magnet, but this is not required; for example, as described below a sector may include multiple magnets. Primary magnets 3826 and secondary magnets 3828 can have arcuate (or curved) shapes in the transverse plane such that when primary magnets 3826 (or secondary magnets 3828) are positioned adjacent to one another end-to-end, primary magnets 3826 (or secondary magnets 3828) form an annular structure as shown. In some embodiments, primary magnets 3826 can be in contact with each other at interfaces 3830, and secondary magnets 3828 can be in contact with each other at interfaces 3832. Alternatively, small gaps or spaces may separate adjacent primary magnets 3826 or secondary magnets 3828, providing a greater degree of tolerance during manufacturing.

In some embodiments, primary alignment component 3816 can also include an annular shield 3814 disposed on a distal surface of primary magnets 3826. In some embodiments, shield 3814 can be formed as a single annular piece of material and adhered to primary magnets 3826 to secure primary magnets 3826 into position. Shield 3814 can be formed of a material that has high magnetic permeability, such as stainless steel, and can redirect magnetic fields to prevent them from propagating beyond the distal side of primary alignment component 3816, thereby protecting sensitive electronic components located beyond the distal side of primary alignment component 3816 from magnetic interference.

Primary magnets 3826 and secondary magnets 3828 can be made of a magnetic material such as an NdFeB material, other rare earth magnetic materials, or other materials that can be magnetized to create a persistent magnetic field. Each secondary magnet 3828 can have a single magnetic region with a magnetic polarity having a component in the radial direction in the transverse plane (as shown by magnetic polarity indicator 3817 in FIG. 38B). As described below, the magnetic orientation can be in a radial direction with respect to axis 3801 or another direction having a radial component in the transverse plane. Each primary magnet 3826 can include two magnetic regions having opposite magnetic orientations. For example, each primary magnet 3826 can include an inner arcuate magnetic region 3852 having a magnetic orientation in a first axial direction (as shown by polarity indicator 3853 in FIG. 38B), an outer arcuate magnetic region 3854 having a magnetic orientation in a second axial direction opposite the first direction (as shown by polarity indicator 3855 in FIG. 38B), and a central non-magnetized region 3856 that does not have a magnetic orientation. Central non-magnetized region 3856 can magnetically separate inner arcuate region 3852 from outer arcuate region 3854 by inhibiting magnetic fields from directly crossing through central region 3856. Magnets having regions of opposite magnetic orientation separated by a non-magnetized region are sometimes referred to herein as having a "quad-pole" configuration.

In some embodiments, each secondary magnet 3828 can be made of a magnetic material that has been ground and shaped into an arcuate structure, and a magnetic orientation having a radial component in the transverse plane can be created, e.g., using a magnetizer. Similarly, each primary magnet 3826 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each primary magnet 3826 can be a compound structure with two arcuate pieces of magnetic material providing inner arcuate magnetic region 3852 and outer arcuate magnetic region 3854; in such embodiments, central non-magnetized region 3856 can be formed of an arcuate piece of nonmagnetic material or formed as an air gap defined by sidewalls of inner arcuate magnetic region 3852 and outer arcuate magnetic region 3854.

As shown in FIG. 38B, the magnetic polarity of secondary magnet 3828 (shown by indicator 3817) can be oriented such that when primary alignment component 3816 and secondary alignment component 3818 are aligned, the south pole of secondary magnet 3828 is oriented toward the north pole of inner arcuate magnetic region 3852 (shown by indicator 3853) while the north pole of secondary magnet 3828 is oriented toward the south pole of outer arcuate magnetic region 3854 (shown by indicator 3855). Accordingly, the respective magnetic orientations of inner arcuate magnetic region 3852, secondary magnet 3828 and outer arcuate magnetic region 3856 can generate magnetic fields 3840 that produce an attractive force between primary magnet 3826 and secondary magnet 3828, thereby facilitating alignment between respective electronic devices in which primary alignment component 3816 and secondary alignment component 3818 are disposed (e.g., as shown in FIG. 36). Shield 3814 can redirect some of magnetic fields 3840 away from regions below primary magnet 3826. Further, the "closed-loop" magnetic field 3840 formed around central nonmagnetic region 3856 can have tight and compact field lines that do not stray from primary magnets 3826 and secondary magnets 3828 as far as magnetic field 3740 strays from primary magnets 3726 and secondary magnets 3728 in FIG. 37B. Thus, magnetically sensitive components can be placed relatively close to primary alignment component 3816 with reduced concern for stray magnetic fields. Accordingly, as compared to magnetic alignment system 3700, magnetic alignment system 3800 can help to reduce the overall size of a device in which primary alignment component 3816 is positioned and can also help reduce noise created by magnetic field 3840 in adjacent components or devices, such as a power-receiving device in which secondary alignment component 3818 is positioned.

It will be appreciated that magnetic alignment system 3800 is illustrative and that variations and modifications are possible. For instance, while primary alignment component 3816 and secondary alignment component 3818 are each shown as being constructed of eight arcuate magnets, other embodiments may use a different number of magnets, such as sixteen magnets, thirty-six magnets, or any other number of magnets, and the number of primary magnets need not be equal to the number of secondary magnets. In other embodiments, secondary alignment component 3818 can be formed of a single, monolithic annular magnet. Similarly, primary alignment component 3816 can be formed of a single, monolithic annular piece of magnetic material with an appropriate magnetization pattern as described above, or primary alignment component 3816 can be formed of a monolithic inner annular magnet and a monolithic outer annular magnet, with an annular air gap or region of non-magnetic material disposed between the inner annular magnet and outer annular magnet. In some embodiments, a construction using multiple arcuate magnets may improve manufacturing because smaller arcuate magnets are less brittle than a single, monolithic annular magnet and are less prone to yield loss due to physical stresses imposed on the magnetic material during manufacturing. It should also be understood that the magnetic orientations of the various magnetic alignment components or individual magnets do not need to align exactly with the lateral and axial directions. The magnetic orientation can have any angle that provides a closed-loop path for a magnetic field through the primary and secondary alignment components.

Figure 39:
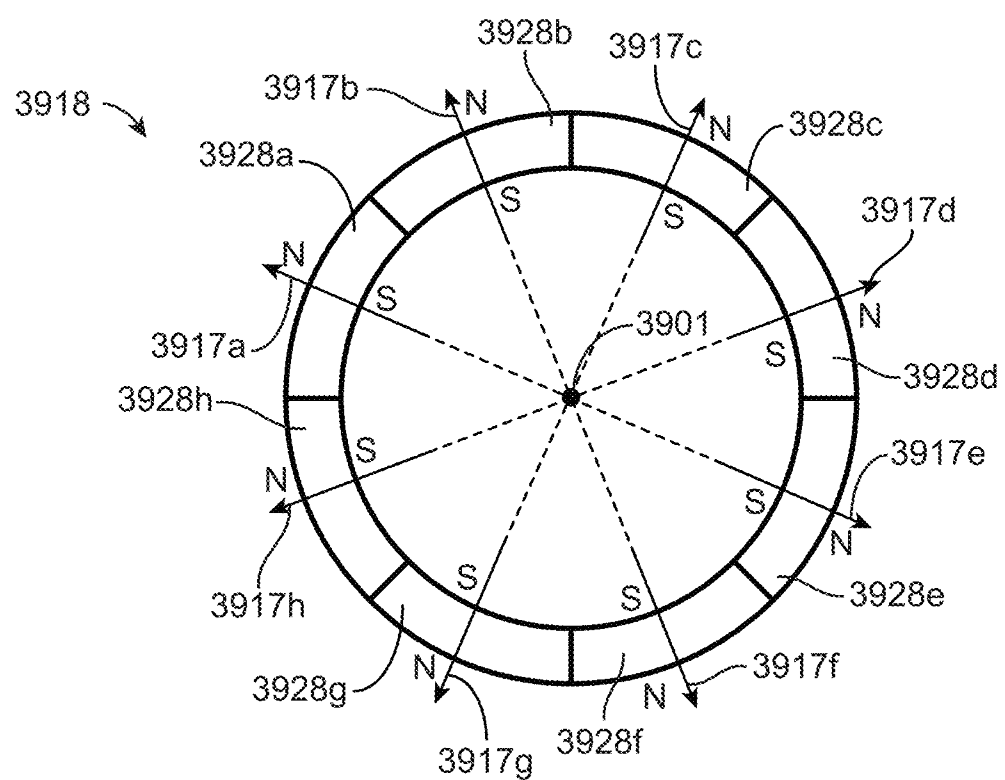
FIG. 39 shows a simplified top-down view of a secondary alignment component according to some embodiments.

As noted above, in embodiments of magnetic alignment systems having closed-loop magnetic orientations, such as magnetic alignment system 3800, secondary alignment component 3818 can have a magnetic orientation in the transverse plane. For example, in some embodiments, secondary alignment component 3818 can have a magnetic polarity in a radial orientation. FIG. 39 shows a simplified top-down view of a secondary alignment component 3918 according to some embodiments having secondary magnets 3928*a-h* with radial magnetic orientations as shown by magnetic polarity indicators 3917*a-h*. In this example, each secondary magnet 3928*a-h* has a north magnetic pole oriented toward the radially outward side and a south magnetic pole toward the radially inward side; however, this orientation can be reversed, and the north magnetic pole of each secondary magnet 3928*a-h* can be oriented toward the radially inward side while the south magnetic pole is oriented toward the radially outward side.

Figure 40A:
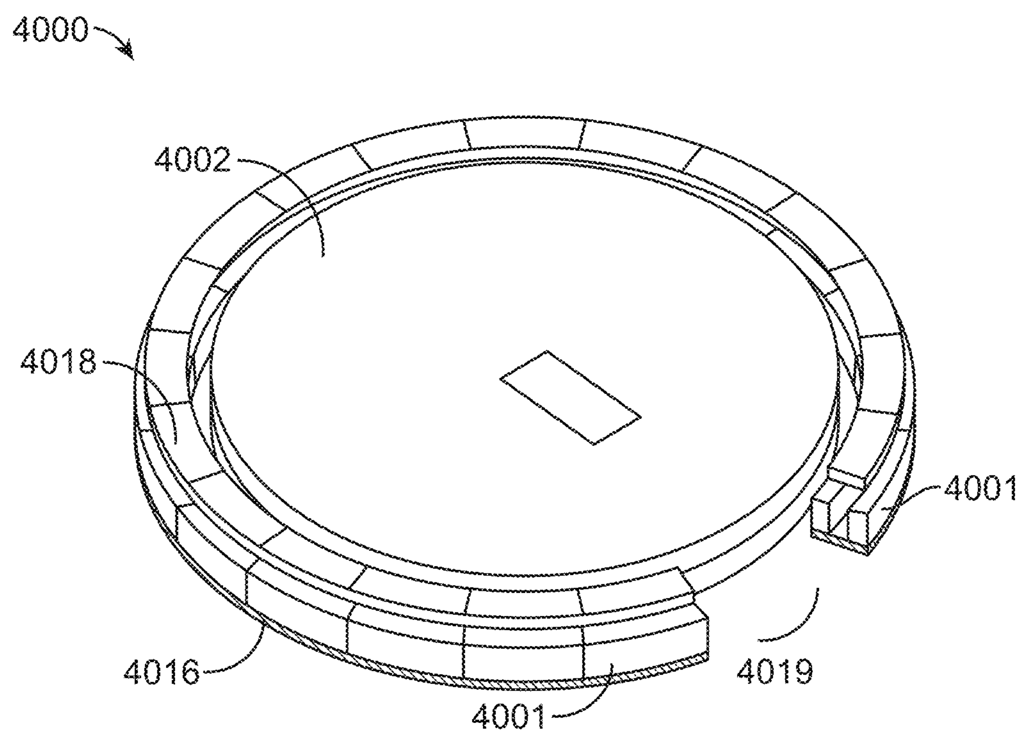
FIG. 40A shows a perspective view of a magnetic alignment system according to some embodiments.

FIG. 40A shows a perspective view of a magnetic alignment system 4000 according to some embodiments. Magnetic alignment system 4000, which can be an implementation of magnetic alignment system 3900, includes a secondary alignment component 4018 having a radially outward magnetic orientation (e.g., as shown in FIG. 39) and a complementary primary alignment component 4016. In this example, magnetic alignment system 4000 includes a gap 4019 between two of the sectors; however, gap 4019 is optional and magnetic alignment system 4000 can be a complete annular structure. Also shown are components 4002, which can include, for example an inductive coil assembly or other components located within the central region of primary magnetic alignment component 4016 or secondary magnetic alignment component 4018. Magnetic alignment system 4000 can have a closed-loop configuration similar to magnetic alignment system 3800 (as shown in FIG. 38B) and can include arcuate sectors 4001, each of which can be made of one or more arcuate magnets. In some embodiments, the closed-loop configuration of magnetic alignment system 4000 can reduce or prevent magnetic field leakage that may affect components 4002.

Figure 40B:
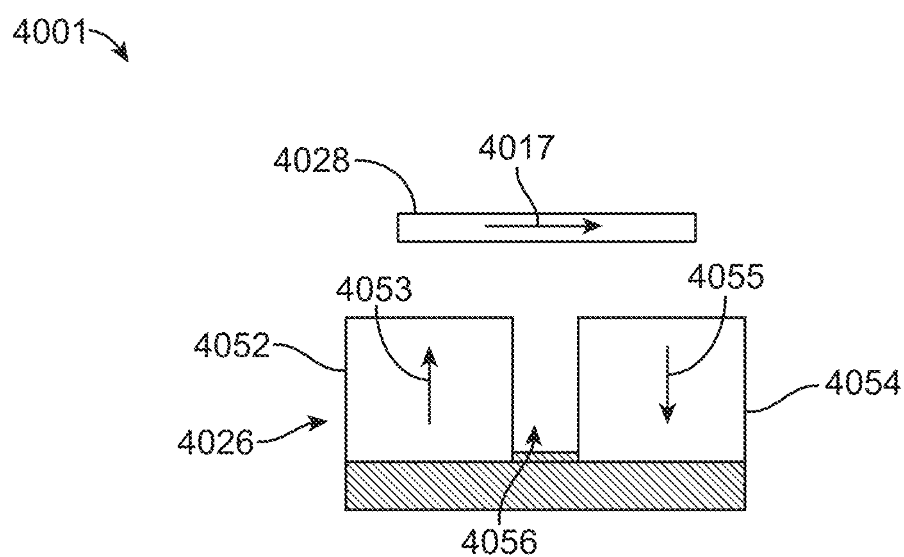

FIG. 40B shows an axial cross-section view through one of arcuate sectors 4001. Arcuate sector 4001 includes a primary magnet 4026 and a secondary magnet 4028. As shown by orientation indicator 4017, secondary magnet 4028 has a magnetic polarity oriented in a radially outward direction, i.e., the north magnetic pole is toward the radially outward side of magnetic alignment system 4000. Like primary magnets 3826 described above, primary magnet 4026 includes an inner arcuate magnetic region 4052, an outer arcuate magnetic region 4054, and a central non-magnetized region 4056 (which can include, e.g., an air gap or a region of nonmagnetic or non-magnetized material). Inner arcuate magnetic region 4052 has a magnetic polarity oriented axially such that the north magnetic pole is toward secondary magnet 4028, as shown by indicator 4053, while outer arcuate magnetic region 4054 has an opposite magnetic orientation, with the south magnetic pole oriented toward secondary magnet 4028, as shown by indicator 4055. As described above with reference to FIG. 38B, the arrangement of magnetic orientations shown in FIG. 40B results in magnetic attraction between primary magnet 4026 and secondary magnet 4028. In some embodiments, the magnetic polarities can be reversed such that the north magnetic pole of secondary magnet 4028 is oriented toward the radially inward side of magnetic alignment system 4000, the north magnetic pole of outer arcuate region 4054 of primary magnet 4026 is oriented toward secondary magnet 4028, and the north magnetic pole of inner arcuate region 4052 is oriented away from secondary magnet 4028.

When primary alignment component 4016 and secondary alignment component 4018 are aligned, the radially symmetrical arrangement and directional equivalence of magnetic polarities of primary alignment component 4016 and secondary alignment component 4018 allow secondary alignment component 4018 to rotate freely (relative to primary alignment component 4016) in the clockwise or counterclockwise direction in the lateral plane while maintaining alignment along the axis.

Figure 40C:
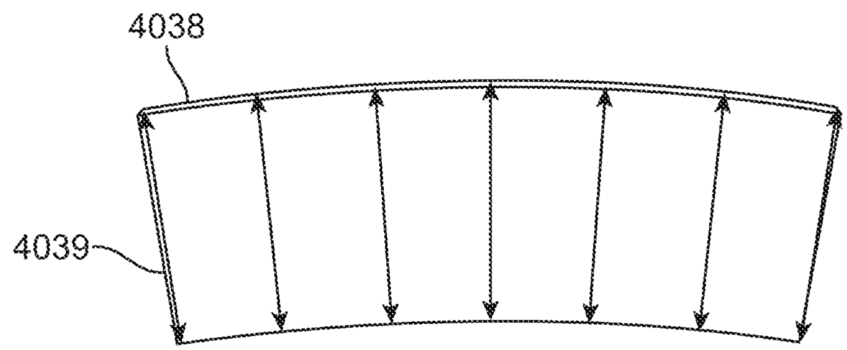
FIGS. 40C through 40E show examples of arcuate magnets with radial magnetic orientation according to some embodiments.
Figure 40D:
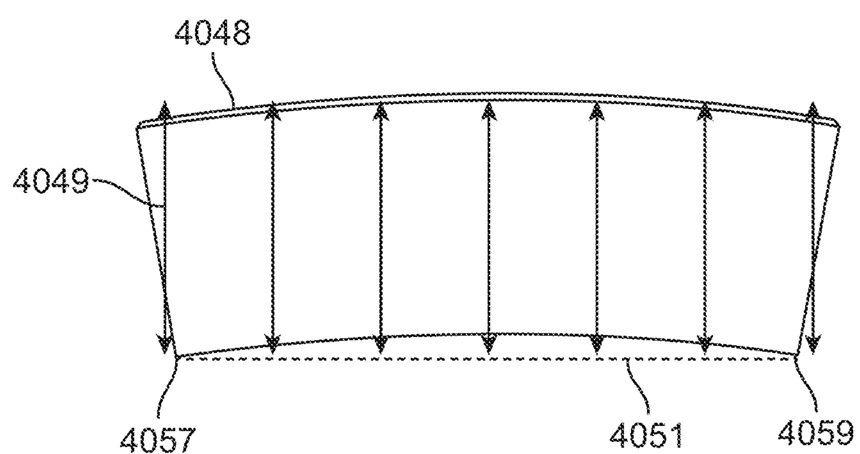
Figure 40E:
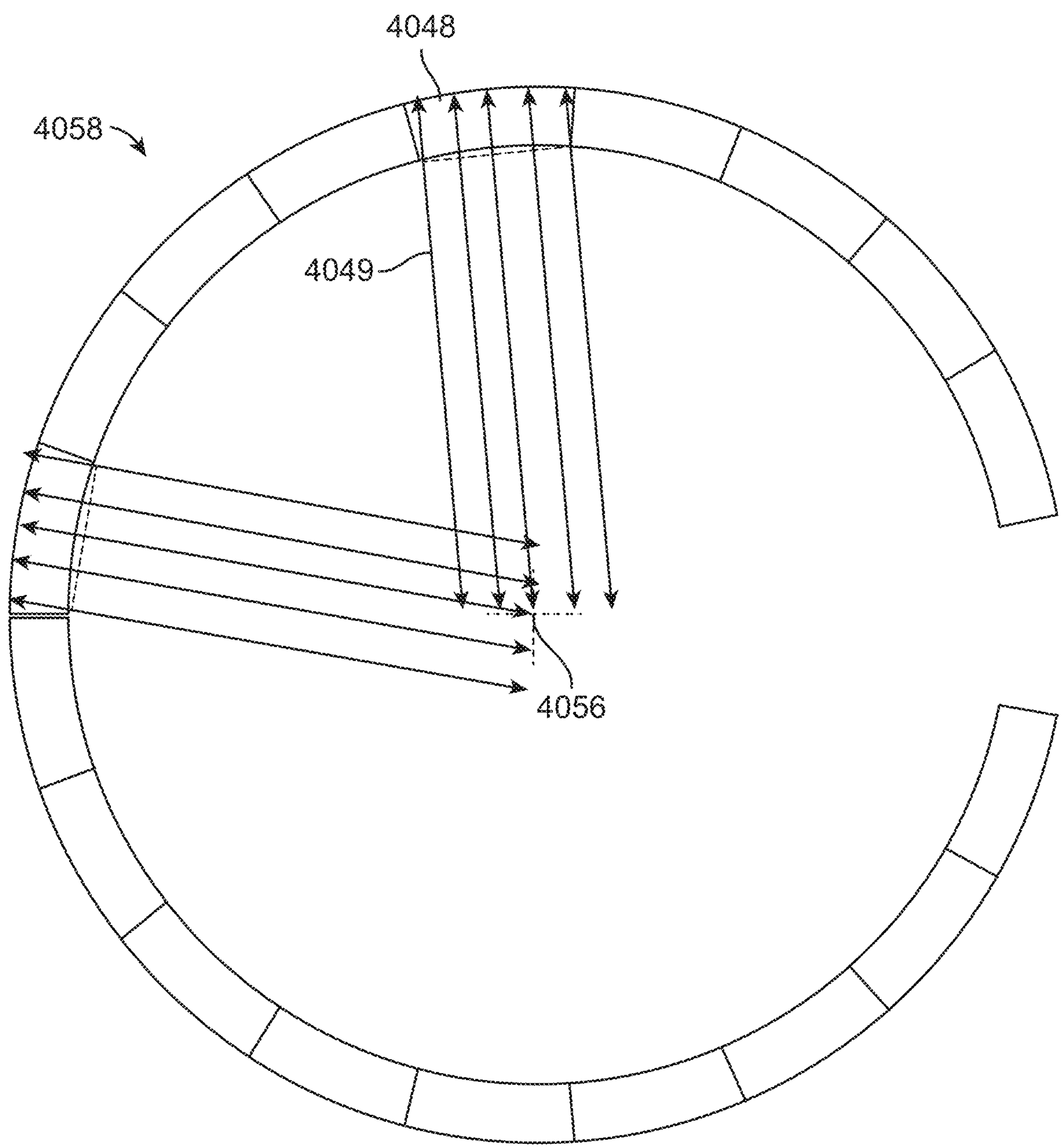

As used herein, a "radial" orientation need not be exactly or purely radial. For example, FIG. 40C shows a secondary arcuate magnet 4038 according to some embodiments. Secondary arcuate magnet 4038 has a purely radial magnetic orientation, as indicated by arrows 4039. Each arrow 4039 is directed at the center of curvature of magnet 4038; if extended inward, arrows 4039 would converge at the center of curvature. However, achieving this purely radial magnetization requires that magnetic domains within magnet 4038 be oriented obliquely to neighboring magnetic domains. For some types of magnetic materials, purely radial magnetic orientation may not be practical. Accordingly, some embodiments use a "pseudo-radial" magnetic orientation that approximates the purely radial orientation of FIG. 40C. FIG. 40D shows a secondary arcuate magnet 4048 with pseudo-radial magnetic orientation according to some embodiments. Magnet 4048 has a magnetic orientation, shown by arrows 4049, that is perpendicular to a baseline 4051 connecting the inner corners 4057, 4059 of arcuate magnet 4048. If extended inward, arrows 4049 would not converge. Thus, neighboring magnetic domains in magnet 4048 are parallel to each other, which is readily achievable in magnetic materials such as NdFeB. The overall effect in a magnetic alignment system, however, can be similar to the purely radial magnetic orientation shown FIG. 40C. FIG. 40E shows a secondary annular alignment component 4058 made up of magnets 4048 according to some embodiments. Magnetic orientation arrows 4049 have been extended to the center point 4061 of annular alignment component 4058. As shown the magnetic field direction can be approximately radial, with the closeness of the approximation depending on the number of magnets 4048 and the inner radius of annular alignment component 4058. In some embodiments, 138 magnets 4048 can provide a pseudo-radial orientation; in other embodiments, more or fewer magnets can be used. It should be understood that all references herein to magnets having a "radial" magnetic orientation include pseudo-radial magnetic orientations and other magnetic orientations that are approximately but not purely radial.

In some embodiments, a radial magnetic orientation in a secondary alignment component 4018 (e.g., as shown in FIG. 40B) provides a magnetic force profile between secondary alignment component 4018 and primary alignment component 4016 that is the same around the entire circumference of the magnetic alignment system. The radial magnetic orientation can also result in greater magnetic permeance, which allows secondary alignment component 4018 to resist demagnetization as well as enhancing the attractive force in the axial direction and improving shear force in the lateral directions when the two components are aligned.

Figure 41A:
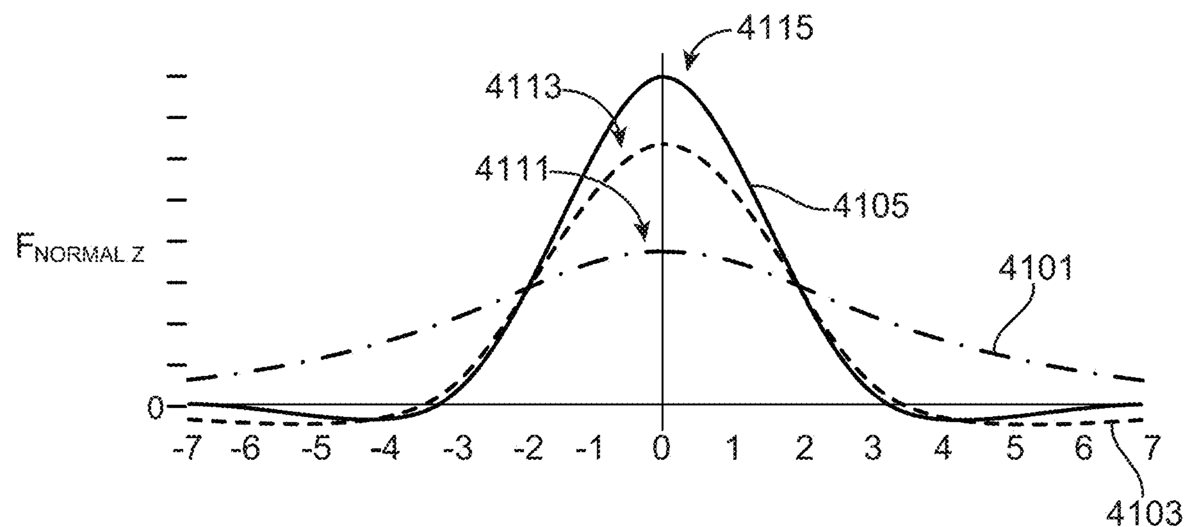
FIG. 41A and FIG. 41B show graphs of force profiles for different magnetic alignment systems, according to some embodiments.
Figure 41B:
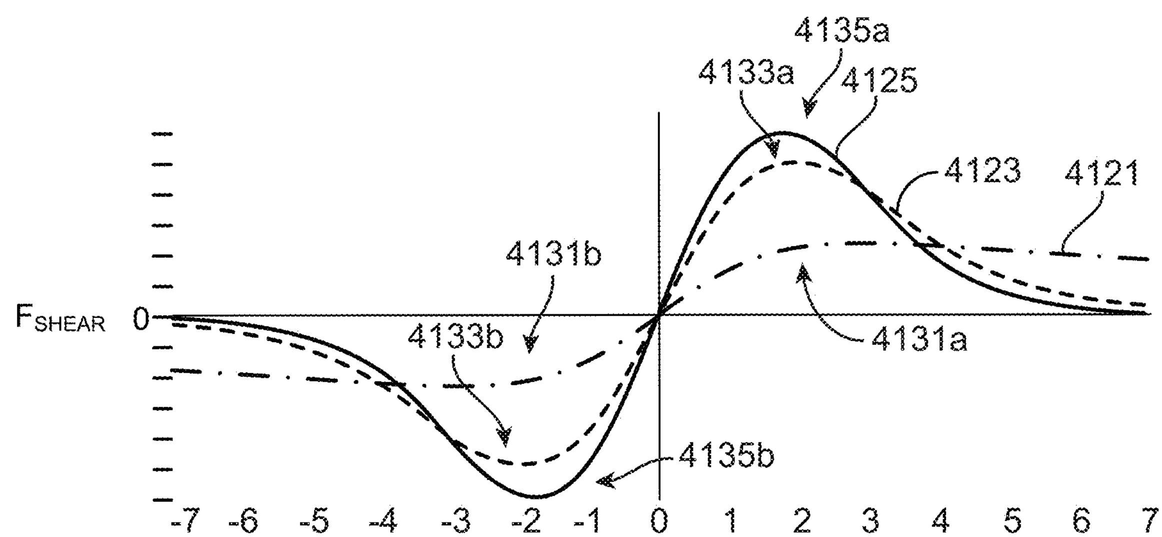

FIGS. 41A and 41B show graphs of force profiles for different magnetic alignment systems, according to some embodiments. Specifically, FIG. 41A shows a graph 4100 of vertical attractive (normal) force in the axial (z) direction for different magnetic alignment systems of comparable size and using similar types of magnets. Graph 4100 has a horizontal axis representing displacement from a center of alignment, where 0 represents the aligned position and negative and positive values represent left and right displacements from the aligned position in arbitrary units, and a vertical axis showing the normal force ($F_{NORMAL}$) as a function of displacement in arbitrary units. For purposes of this description, $F_{NORMAL}$ is defined as the magnetic force between the primary and secondary alignment components in the axial direction; $F_{NORMAL}>0$ represents attractive force while $F_{NORMAL}<0$ represents repulsive force. Graph 4100 shows normal force profiles for three different types of magnetic alignment systems. A first type of magnetic alignment system uses central alignment components, such as a pair of complementary disc-shaped magnets placed along an axis; a representative normal force profile for a "central" magnetic alignment system is shown as line 4101 (dot-dash line). A second type of magnetic alignment system uses annular alignment components with axial magnetic orientations, e.g., magnetic alignment system 3700 of FIGS. 37A and 37B; a representative normal force profile for such an annular-axial magnetic alignment system is shown as line 4103 (dashed line). A third type of magnetic alignment system uses annular alignment components with closed-loop magnetic orientations and radial symmetry (e.g., magnetic alignment system 4000 of FIG. 40); a representative normal force profile for a radially symmetric closed-loop magnetic alignment system is shown as line 4105 (solid line.)

Similarly, FIG. 41B shows a graph 4120 of lateral (shear) force in a transverse direction for different magnetic alignment systems. Graph 4120 has a horizontal axis representing displacement from a center of alignment using the same convention and units as graph 4100, and a vertical axis showing the shear force ($F_{SHEAR}$) as a function of direction in arbitrary units. For purposes of this description, $F_{SHEAR}$ is defined as the magnetic force between the primary and secondary alignment components in the lateral direction; $F_{SHEAR}>0$ represents force toward the left along the displacement axis while $F_{SHEAR}<0$ represents force toward the right along the displacement axis. Graph 4120 shows shear force profiles for the same three types of magnetic alignment systems as graph 4100: a representative shear force profile for a central magnetic alignment system is shown as line 4121 (dot-dash line); a representative shear force profile for an annular-axial magnetic alignment system is shown as line 4123 (dashed line); and a representative normal force profile for a radially symmetric closed-loop magnetic alignment system is shown as line 4125 (solid line).

As shown in FIG. 41A, each type of magnetic alignment system achieves the strongest magnetic attraction in the axial direction when the primary and secondary alignment components are in the aligned position (0 on the horizontal axis), as shown by respective peaks 4111, 4113, and 4115. While the most strongly attractive normal force is achieved in the aligned positioned for all systems, the magnitude of the peak depends on the type of magnetic alignment system. In particular, a radially-symmetric closed-loop magnetic alignment system (e.g., magnetic alignment system 4000 of FIG. 40) provides stronger magnetic attraction when in the aligned position than the other types of magnetic alignment systems. This strong attractive normal force can overcome small misalignments due to frictional force and can achieve a more accurate and robust alignment between the primary and secondary alignment components, which in turn can provide a more accurate and robust alignment between a portable electronic device and a wireless charging device within which the magnetic alignment system is implemented.

As shown in FIG. 41B, the strongest shear forces (attractive or repulsive) are obtained when the primary and secondary alignment components are laterally just outside of the aligned position, e.g., at −2 and +2 units of separation from the aligned position, as shown by respective peaks 4131*a-b*, 4133*a-b*, and 4135*a-b*. Similarly to the normal force, the magnitude of the peak strength of shear force depends on the type of magnetic alignment system. In particular, a radially-symmetric closed-loop magnetic alignment system (e.g., magnetic alignment system 4000 of FIG. 40) provides higher magnitude of shear force when just outside of the aligned position than the other types of magnetic alignment systems. This strong shear force can provide tactile feedback to help the user identify when the two components are aligned. In addition, like the strong normal force, the strong shear force can overcome small misalignments due to frictional force and can achieve a more accurate and robust alignment between the primary and secondary alignment components, which in turn can provide a more accurate and robust alignment between a portable electronic device and a wireless charging device within which the magnetic alignment system is implemented.

A radially-symmetric closed-loop magnetic alignment system (e.g., magnetic alignment system 4000 of FIG. 40) can provide accurate and robust alignment in the axial and lateral directions. Further, because of the radial symmetry, the alignment system does not have a preferred rotational orientation in the lateral plane about the axis; the shear force profile is the same regardless of relative rotational orientation of the electronic devices being aligned.

Figure 42:
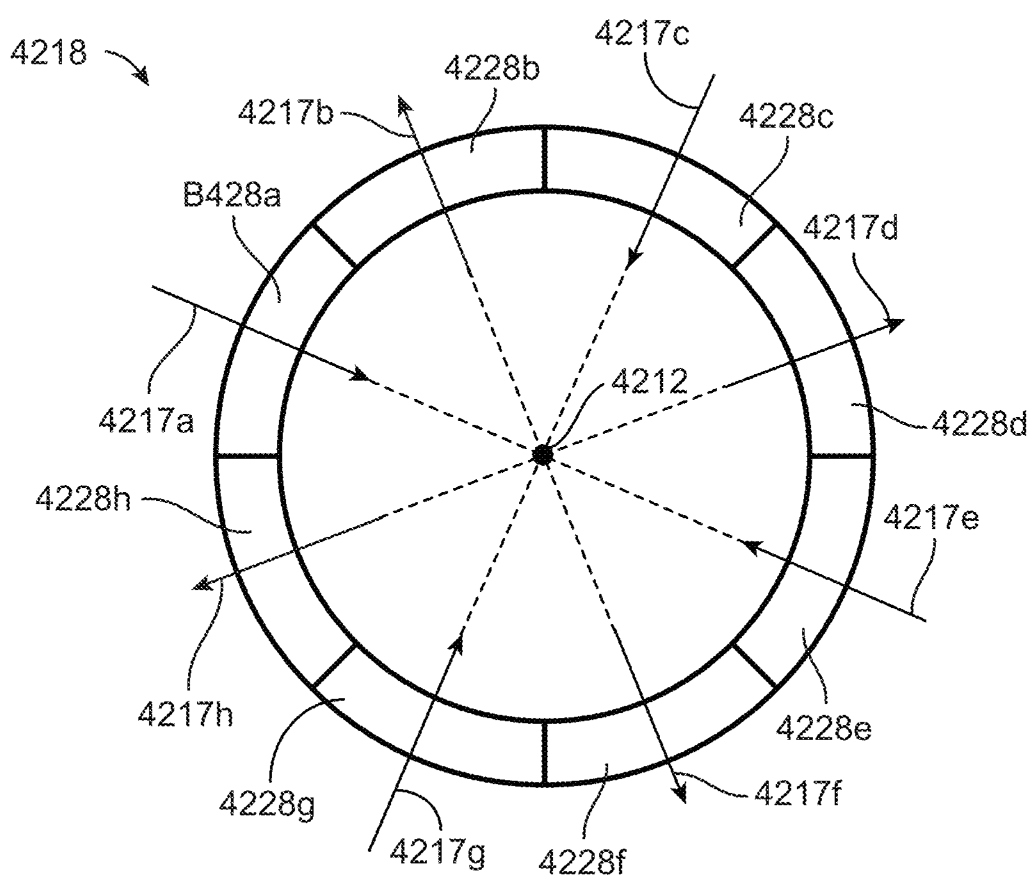
FIG. 42 shows a simplified top-down view of a secondary alignment component according to some embodiments.

In some embodiments, a closed-loop magnetic alignment system can be designed to provide one or more preferred rotational orientations. FIG. 42 shows a simplified top-down view of a secondary alignment component 4218 according to some embodiments. Secondary alignment component 4218 includes sectors 4228*a-h* with radial magnetic orientations as shown by magnetic polarity indicators 4217*a-h*. Each of sectors 4228*a-h* can include one or more secondary arcuate magnets (not shown). In this example, secondary magnets in sectors 4228*b*, 4228*d*, 4228*f*, and 4228*h* each have a north magnetic pole oriented toward the radially outward side and a south magnetic pole toward the radially inward side, while secondary magnets in sectors 4228*a*, 4228*c*, 4228*e*, and 4228*g* each have a north magnetic pole oriented toward the radially inward side and a south magnetic pole toward the radially outward side. In other words, magnets in sectors 4228*a-h* of secondary alignment component 4218 have alternating magnetic orientations. A complementary primary alignment component can have sectors with correspondingly alternating magnetic orientations.

For example, FIG. 43A shows a perspective view of a magnetic alignment system 4300 according to some embodiments. Magnetic alignment system 4300 includes a secondary alignment component 4318 having alternating radial magnetic orientations (e.g., as shown in FIG. 42) and a complementary primary alignment component 4316. Some of the arcuate sections of magnetic alignment system 4300 are not shown in order to reveal internal structure; however, it should be understood that magnetic alignment system 4300 can be a complete annular structure. Also shown are components 4302, which can include, for example, inductive coil assemblies or other components located within the central region of primary annular alignment component 4316 and/or secondary annular alignment component 4318. Magnetic alignment system 4300 can be a closed-loop magnetic alignment system similar to magnetic alignment system 3800 described above and can include arcuate sectors 4301*b*, 4301*c* of alternating magnetic orientations, with each arcuate sector 4301*b*, 4301*c* including one or more arcuate magnets in each of primary annular alignment component 4316 and secondary annular alignment component 4318. In some embodiments, the closed-loop configuration of magnetic alignment system 4300 can reduce or prevent magnetic field leakage that may affect component 4302.

FIG. 43B shows an axial cross-section view through one of arcuate sectors 4301*b*, and FIG. 43C shows an axial cross-section view through one of arcuate sectors 4301*c*. Arcuate sector 4301*b* includes a primary magnet 4326*b* and a secondary magnet 4328*b*. As shown by orientation indicator 4317*b*, secondary magnet 4328*b* has a magnetic polarity oriented in a radially outward direction, i.e., the north magnetic pole is toward the radially outward side of magnetic alignment system 4300. Like primary magnets 3826 described above, primary magnet 4326*b* includes an inner arcuate magnetic region 4352*b*, an outer arcuate magnetic region 4354*b*, and a central nonmagnetic region 4356*b* (which can include, e.g., an air gap or a region of nonmagnetic material). Inner arcuate magnetic region 4352*b* has a magnetic polarity oriented axially such that the north magnetic pole is toward secondary magnet 4328*b*, as shown by indicator 4353*b*, while outer arcuate magnetic region 4354*b* has an opposite magnetic orientation, with the south magnetic pole oriented toward secondary magnet 4328*b*, as shown by indicator 4355*b*. As described above with reference to FIG. 38B, the arrangement of magnetic orientations shown in FIG. 43B results in magnetic attraction between primary magnet 4326*b* and secondary magnet 4328*b*.

As shown in FIG. 43C, arcuate sector 4301*c* has a "reversed" magnetic orientation relative to arcuate sector 4301*b*. Arcuate sector 4301*c* includes a primary magnet 4326*c* and a secondary magnet 4328*c*. As shown by orientation indicator 4317*c*, secondary magnet 4328*c* has a magnetic polarity oriented in a radially inward direction, i.e., the north magnetic pole is toward the radially inward side of magnetic alignment system 4300. Like primary magnets 3826 described above, primary magnet 4326*c* includes an inner arcuate magnetic region 4352*c*, an outer arcuate magnetic region 4354*c*, and a central nonmagnetic region 4356*c* (which can include, e.g., an air gap or a region of nonmagnetic material). Inner arcuate magnetic region 4352*c* has a magnetic polarity oriented axially such that the south magnetic pole is toward secondary magnet 4328*c*, as shown by indicator 4353*c*, while outer arcuate magnetic region 4354*c* has an opposite magnetic orientation, with the north magnetic pole oriented toward secondary magnet 4328*c*, as shown by indicator 4355*c*. As described above with reference to FIG. 38B, the arrangement of magnetic orientations shown in FIG. 43C results in magnetic attraction between primary magnet 4326*c* and secondary magnet 4328*c*.

An alternating arrangement of magnetic polarities as shown in FIGS. 42 and 43A-8C can create a "ratcheting" feel when secondary alignment component 4318 is aligned with primary alignment component 4316 and one of alignment components 4316, 4318 is rotated relative to the other about the common axis. For instance, as secondary alignment component 4318 is rotated relative to primary alignment component 4316, radially-outward magnet 4328*b* alternately come into proximity with a complementary magnet 4326*b* of primary alignment component 4316, resulting in an attractive magnetic force, and with an anti-complementary magnet 4326*c* of primary alignment component 4316, resulting in a repulsive magnetic force. If primary magnets 4326*b*, 4326*c* and secondary magnets 4328*b*, 4328*c* have the same angular size and spacing, in any given orientation, each pair of magnets will experience similar net attractive or repulsive magnetic forces such that alignment is stable and robust in rotational orientations in which complementary magnet pairs 4326*b*, 4328*b* and 4326*c*, 4328*c* are in proximity. In other rotational orientations, a torque toward a stable rotational orientation can be experienced.

Figure 44A:
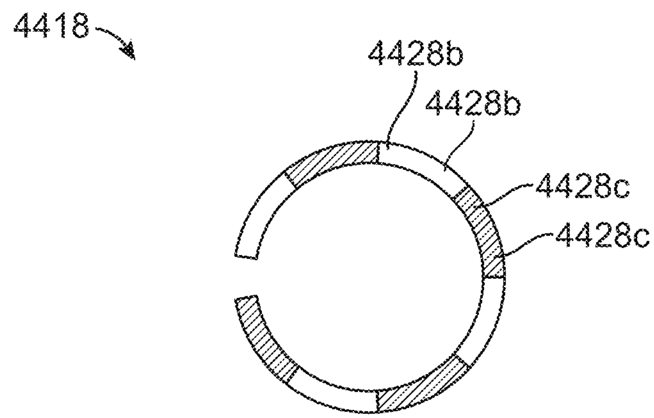
FIG. 44A and 44B show simplified top-down views of secondary alignment components according to various embodiments.
Figure 44B:
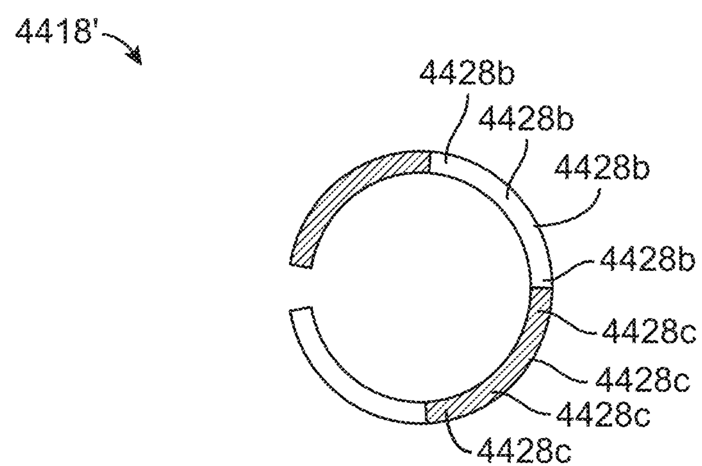

In the examples shown in FIGS. 42 and 43A-8C, each sector includes one magnet, and the direction of magnetic orientation alternates with each magnet. In some embodiments, a sector can include two or more magnets having the same direction of magnetic orientation. For example, FIG. 44A shows a simplified top-down view of a secondary alignment component 4418 according to some embodiments. Secondary alignment component 4418 includes secondary magnets 4428*b* with radially outward magnetic orientations and secondary magnets 4428*c* with radially inward orientations, similarly to secondary alignment component 4318 described above. In this example, the magnets are arranged such that a pair of outwardly-oriented magnets 4428*b* (forming a first sector) are adjacent to a pair of inwardly-oriented magnets 4428*c* (forming a second sector adjacent to the first sector). The pattern of alternating sectors (with two magnets per sector) repeats around the circumference of secondary alignment component 4418. Similarly, FIG. 44B shows a simplified top-down view of another secondary alignment component 4418' according to some embodiments. Secondary alignment component 4418' includes secondary magnets 4428*b* with radially outward magnetic orientations and secondary magnets 4428*c* with radially inward orientations. In this example, the magnets are arranged such that a group of four radially-outward magnets 4428*b* (forming a first sector) is adjacent to a group of four radially-inward magnets 4428*c* (forming a second sector adjacent to the first sector). The pattern of alternating sectors (with four magnets per sector) repeats around the circumference of secondary alignment component 4418'. Although not shown in FIGS. 44A and 44B, the structure of a complementary primary alignment component for secondary alignment component 4418 or 4418' should be apparent in view of FIGS. 43A-8C. A shear force profile for the alignment components of FIGS. 44A and 44B can be similar to the ratcheting profile described above, although the number of rotational orientations that provide stable alignment will be different.

Figure 45:
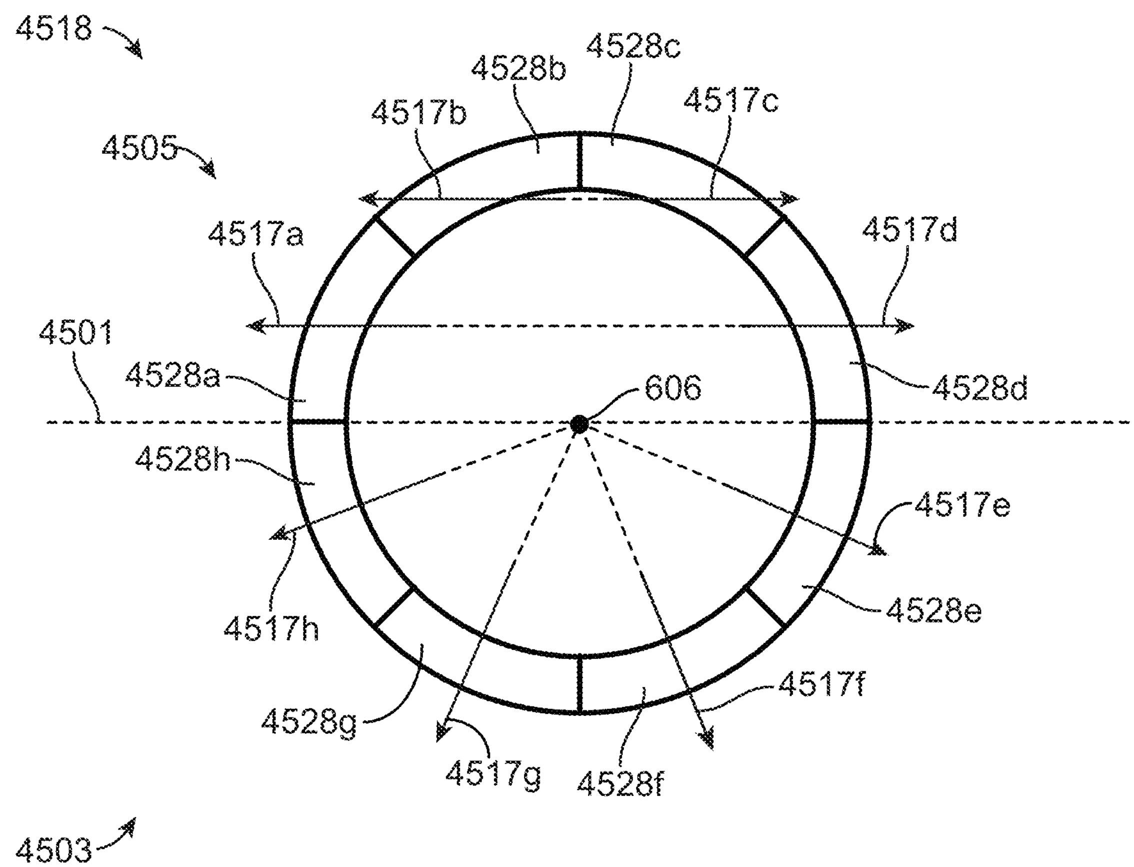
FIG. 45 shows a simplified top-down view of a secondary alignment component according to some embodiments.

In other embodiments, a variety of force profiles can be created by changing the alignment of different component magnets of the primary and/or secondary alignment components. As just one example, FIG. 45 shows a simplified top-down view of a secondary alignment component 4518 according to some embodiments having sectors 4528*a-h* with location-dependent magnetic orientations as shown by magnetic polarity indicators 4517*a-h*. In this example, secondary alignment component 4518 can be regarded as bisected by bisector line 4501, which defines two halves of secondary alignment component 4518. In a first half 4503, sectors 4528*e-h* have magnetic polarities oriented radially outward, similarly to examples described above.

In the second half 4505, sectors 4528*a-d* have magnetic polarities oriented substantially parallel to bisector line 4501 rather than radially. In particular, sectors 4528*a* and 4528*b* have magnetic polarities oriented in a first direction parallel to bisector line 4501, while sectors 4528*c* and 4528*d* have magnetic polarities oriented in the direction opposite to the direction of the magnetic polarities of sectors 4528*a* and 4528*b*. A complementary primary alignment component can have an inner annular region with magnetic north pole oriented toward secondary alignment component 4518, an outer annular region with magnetic north pole oriented away from secondary alignment component 4518, and a central non-magnetized region, providing a closed-loop magnetic orientation as described above. The asymmetric arrangement of magnetic orientations in secondary alignment component 4518 can modify the shear force profile such that secondary alignment component 4518 generates less shear force in the direction toward second half 4505 than in the direction toward first half 4503. In some embodiments, an asymmetrical arrangement of this kind can be used where the primary alignment component is mounted in a docking station and the secondary alignment component is mounted in a portable electronic device that docks with the docking station. Assuming secondary annular alignment component 4518 is oriented in the portable electronic device such that half-annulus 4505 is toward the top of the portable electronic device, the asymmetric shear force can facilitate an action of sliding the portable electronic device downward to dock with the docking station or upward to remove it from the docking station, while still providing an attractive force to draw the portable electronic device into a desired alignment with the docking station.

It will be appreciated that the foregoing examples are illustrative and not limiting. Sectors of a primary and/or secondary alignment component can include magnetic elements with the magnetic polarity oriented in any desired direction and in any combination, provided that the primary and secondary alignment components of a given magnetic alignment system have complementary magnetic orientations to provide forces toward the desired position of alignment. Different combinations of magnetic orientations may create different shear force profiles, and the selection of magnetic orientations may be made based on a desired shear force profile.

In embodiments described above, it is assumed (though not required) that the magnetic alignment components are fixed in position relative to the device enclosure and do not move in the axial or lateral direction. This provides a fixed magnetic flux. In some embodiments, it may be desirable for one or more of the magnetic alignment components to move in the axial direction. For example, in various embodiments of the present invention, it can be desirable to limit the magnetic flux provided by these magnetic structures. Limiting the magnetic flux can help to prevent the demagnetization of various charge and payment cards that a user might be carrying with an electronic device that incorporates one of these magnetic structures. But in some circumstances, it can be desirable to increase this magnetic flux in order to increase a magnetic attraction between an electronic device and an accessory or a second electronic device. Also, it can be desirable for one or more of the magnetic alignment components to move laterally. For example, an electronic device and an attachment structure or wireless device can be offset from each other in a lateral direction. The ability of a magnetic alignment component to move laterally can compensate for this offset and improve coupling between devices, particularly where a coil moves with the magnetic alignment component. Accordingly, embodiments of the present invention can provide structures where some or all of the magnets in these magnetic structures are able to change positions or otherwise move. Examples of magnetic structures having moving magnets are shown in the following figures.

Figures 46A, 46B, 46C:
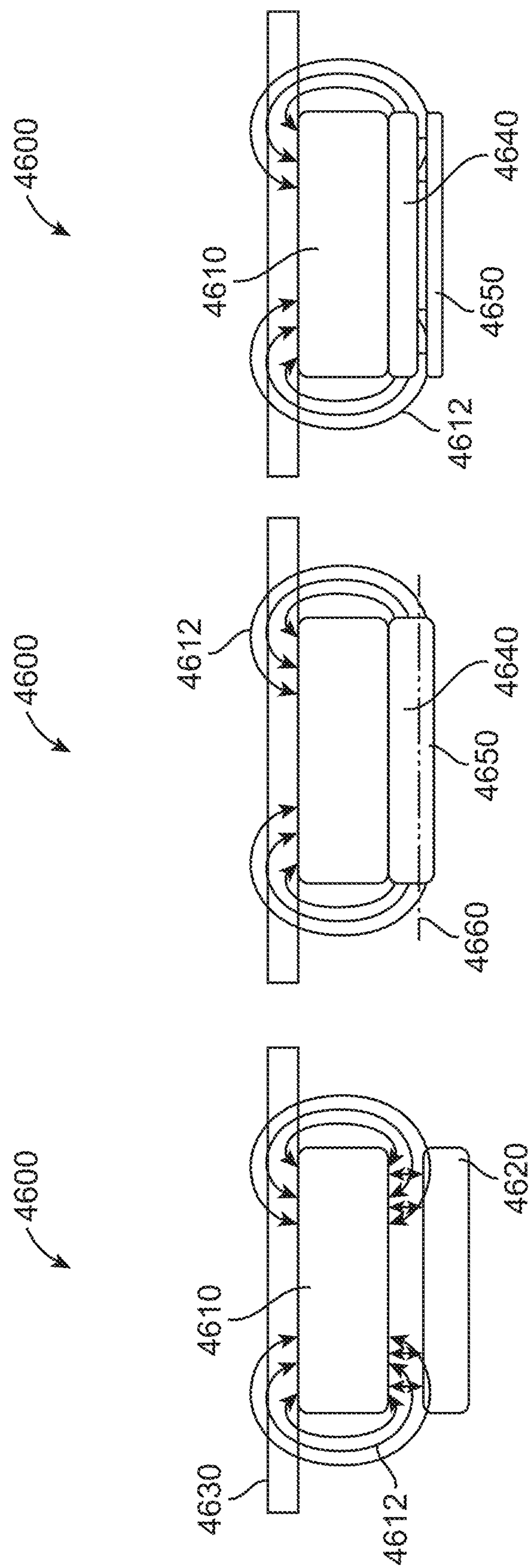
FIG. 46A through FIG. 46C illustrate moving magnets according to an embodiment of the present invention.

FIGS. 46A through 46C illustrate examples of moving magnets according to an embodiment of the present invention. In these examples, first electronic device 4600 can be a wireless charger, such as any of the wireless chargers shown herein, or other device having a magnet 4610 (which can be, e.g., any of the annular or other magnetic alignment components such as the magnet arrays and alignment magnets described above), while a second electronic device (not shown) can be a phone or other electronic device. In FIG. 46A, moving magnet 4610 can be housed in a first electronic device 4600. First electronic device 4600 can include device enclosure 4630, magnet 4610, and shield 4620. Magnet 4610 can be in a first position (not shown) adjacent to nonmoving shield 4620. In this position, magnet 4610 can be separated from device enclosure 4630. As a result, the magnetic flux 4612 at a surface of device enclosure 4630 can be relatively low, thereby protecting magnetic devices and magnetically stored information, such as information stored on payment cards. As magnet 4610 in first electronic device 4600 is attracted to a second magnet (not shown) in the second electronic device, magnet 4610 can move, for example it can move away from shield 4620 to be adjacent to device enclosure 4630, as shown. With magnet 4610 at this location, magnetic flux 4612 at surface of device enclosure 4630 can be relatively high. This increase in magnetic flux 4612 can help to attract the second electronic device to first electronic device 4600.

With this configuration, it can take a large amount of magnetic attraction for magnet 4610 to separate from shield 4620. Accordingly, these and other embodiments of the present invention can include a shield that is split into a shield portion and a return plate portion. For example, in FIG. 46B, line 4660 can be used to indicate a split of shield 4620 into a shield 4640 and return plate 4650.

In FIG. 46C, moving magnet 4610 can be housed in first electronic device 4600. First electronic device 4600 can include device enclosure 4630, magnet 4610, shield 4640, and return plate 4650. In the absence of a magnetic attraction, magnet 4610 can be in a first position (not shown) such that shield 4640 can be adjacent to return plate 4650. Again, in this configuration, magnetic flux 4612 at a surface of device enclosure 4630 can be relatively low. As magnet 4610 and first electronic device 4600 is attracted to a second magnet (not shown) in a second electronic device (not shown), magnet 4610 can move, for example it can move away from return plate 4650 to be adjacent to device enclosure 4630, as shown. In this configuration, shield 4640 can separate from return plate 4650 and the magnetic flux 4612 at a surface of device enclosure 4630 can be increased. As before, this increase in magnetic flux 4612 can help to attract the second electronic device to the first electronic device 4600.

In these and other embodiments of the present invention, various housings and structures can be used to guide a moving magnet. Also, various surfaces can be used in conjunction with these moving magnets. These surfaces can be rigid. Alternatively, these surfaces can be compliant and at least somewhat flexible. Examples are shown in the following figures.

Figure 47B:
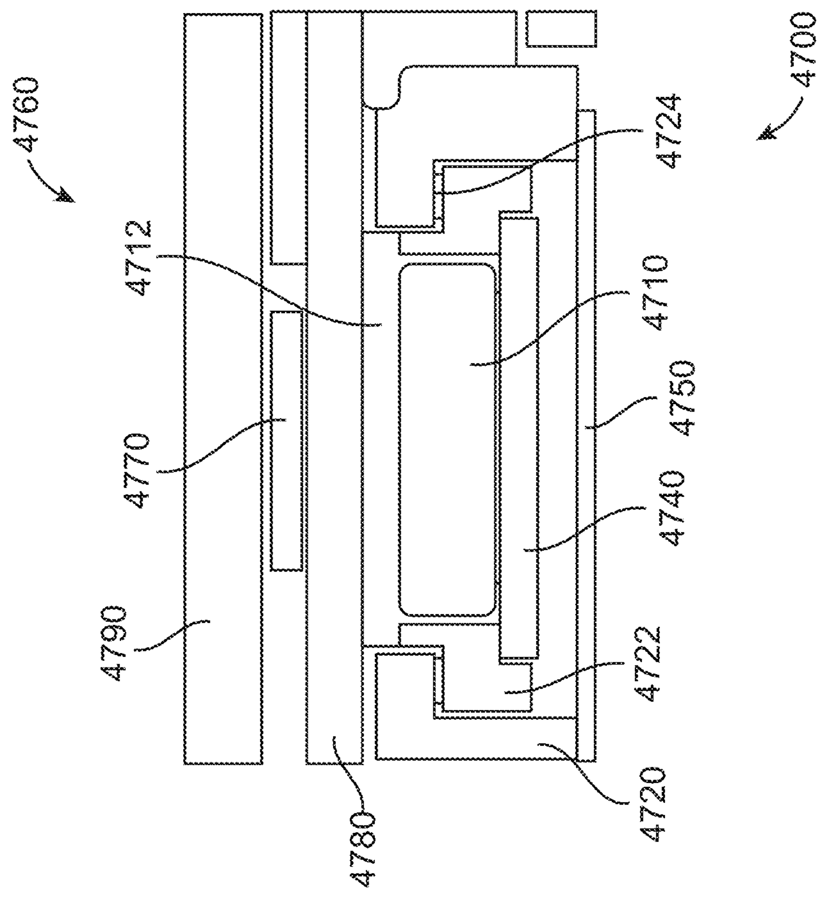
FIGS. 47A and 47B illustrate a moving magnetic structure according to an embodiment of the present invention.
Figure 47A:
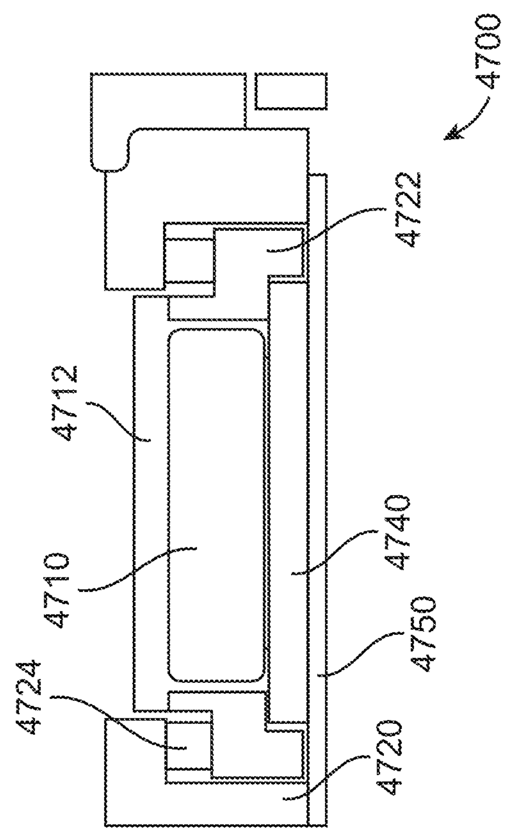

FIGS. 47A and 47B illustrate a moving magnetic structure according to an embodiment of the present invention. In this example, first electronic device 4700 can be a wireless charger, such as any of the wireless chargers shown herein, or other device having a magnet 4710 (which can be, e.g., any of the annular or other magnetic alignment components such as the magnet arrays and alignment magnets described above), while a second electronic device 4760 (shown in FIG. 47B) can be a phone or other electronic device. FIG. 47A illustrates a moving first magnet 4710 in a first electronic device 4700. First electronic device 4700 can include first magnet 4710, protective surface 4712, housings 4720 and 4722, compliant structure 4724, shield 4740, and return plate 4750. In this figure, first magnet 4710 is not attracted to a second magnet (not shown), and therefore shield 4740 is magnetically attracted to or attached to return plate 4750. In this position, compliant structure 4724 can be expanded or relaxed. Compliant structure 4724 can be formed of an elastomer, silicon rubber open cell foam, silicon rubber, polyurethane foam, or other foam or other compressible material.

In FIG. 47B, second electronic device 4760 has been brought into proximity of first electronic device 4700. Second magnet 4770 can attract first magnet 4710, thereby causing shield 4740 and return plate 4750 to separate from each other. Housings 4720 and 4722 can compress compliant structure 4724, thereby allowing protective surface 4712 of first electronic device 4700 to move towards or adjacent to housing 4780 of second electronic device 4760. Second magnet 4770 can be held in place in second electronic device 4760 by housing 4790 or other structure. As second electronic device 4760 is removed from first electronic device 4700, first magnet 4710 and shield 4740 can be magnetically attracted to return plate 4750, as shown in FIG. 47A.

Figure 48B:
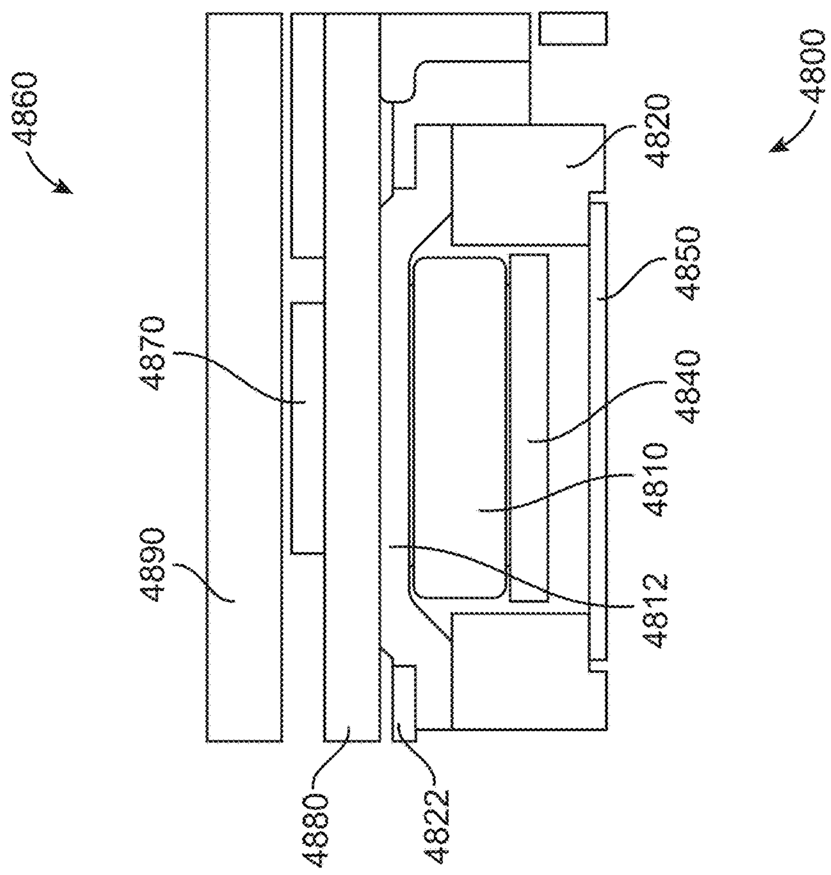
FIGS. 48A and 48B illustrate a moving magnetic structure according to an embodiment of the present invention.
Figure 48A:
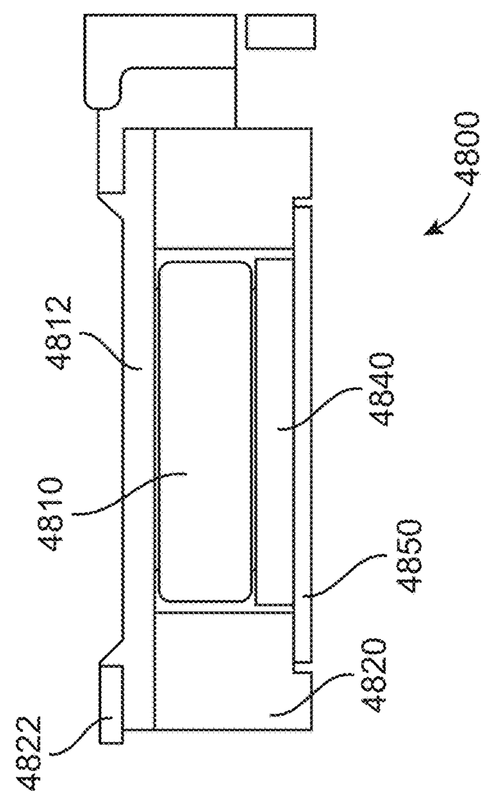

FIGS. 48A and 48B illustrate moving magnetic structures according to an embodiment of the present invention. In this example, first electronic device 4800 can be a wireless charger, such as any of the wireless chargers shown herein, or other device having a magnet 4810 (which can be, e.g., any of the annular or other magnetic alignment components such as the magnet arrays and alignment magnets described above), while second electronic device 4860 (shown in FIG. 48B) can be a phone or another electronic device. FIG. 48A illustrates a moving first magnet 4810 in a first electronic device 4800. First electronic device 4800 can include first magnet 4810, pliable surface 4812, housing portions 4820 and 4822, shield 4840, and return plate 4850. In this figure, first magnet 4810 is not attracted to a second magnet, and therefore shield 4840 is magnetically attached or attracted to return plate 4850. In this position, pliable surface 4812 can be relaxed. Pliable surface 4812 can be formed of an elastomer, silicon rubber open cell foam, silicon rubber, polyurethane foam, or other foam or other compressible material.

In FIG. 48B, second electronic device 4860 has been brought into the proximity of first electronic device 4800. Second magnet 4870 can attract first magnet 4810, thereby causing shield 4840 and return plate 4850 to separate from each other. First magnet 4810 can stretch pliable surface 4812 towards second electronic device 4860, thereby allowing first magnet 4810 of first electronic device 4800 to move towards housing 4880 of second electronic device 4860. Second magnet 4870 can be held in place in second electronic device 4860 by housing 4880 or other structure. As second electronic device 4860 is removed from first electronic device 4800, first magnet 4810 and shield 4840 can be magnetically attracted to return plate 4850 as shown in FIG. 48A.

Figure 49:
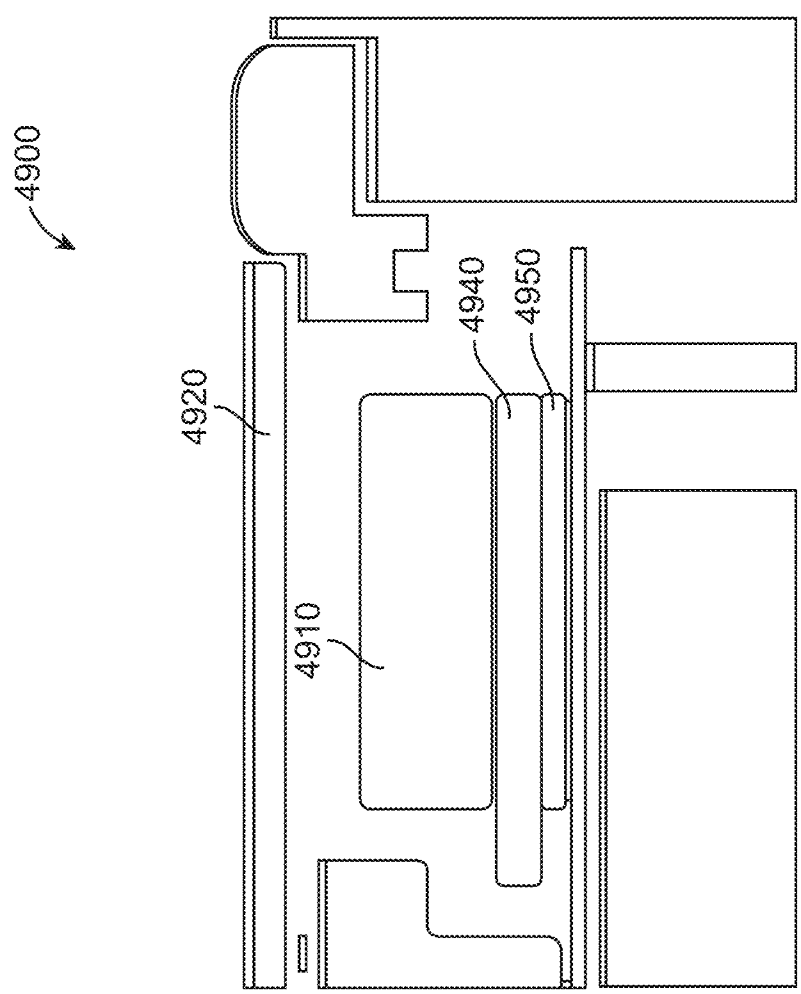
FIGS. 49 through FIG. 51 illustrate a moving magnetic structure according to an embodiment of the present invention.
Figure 50:
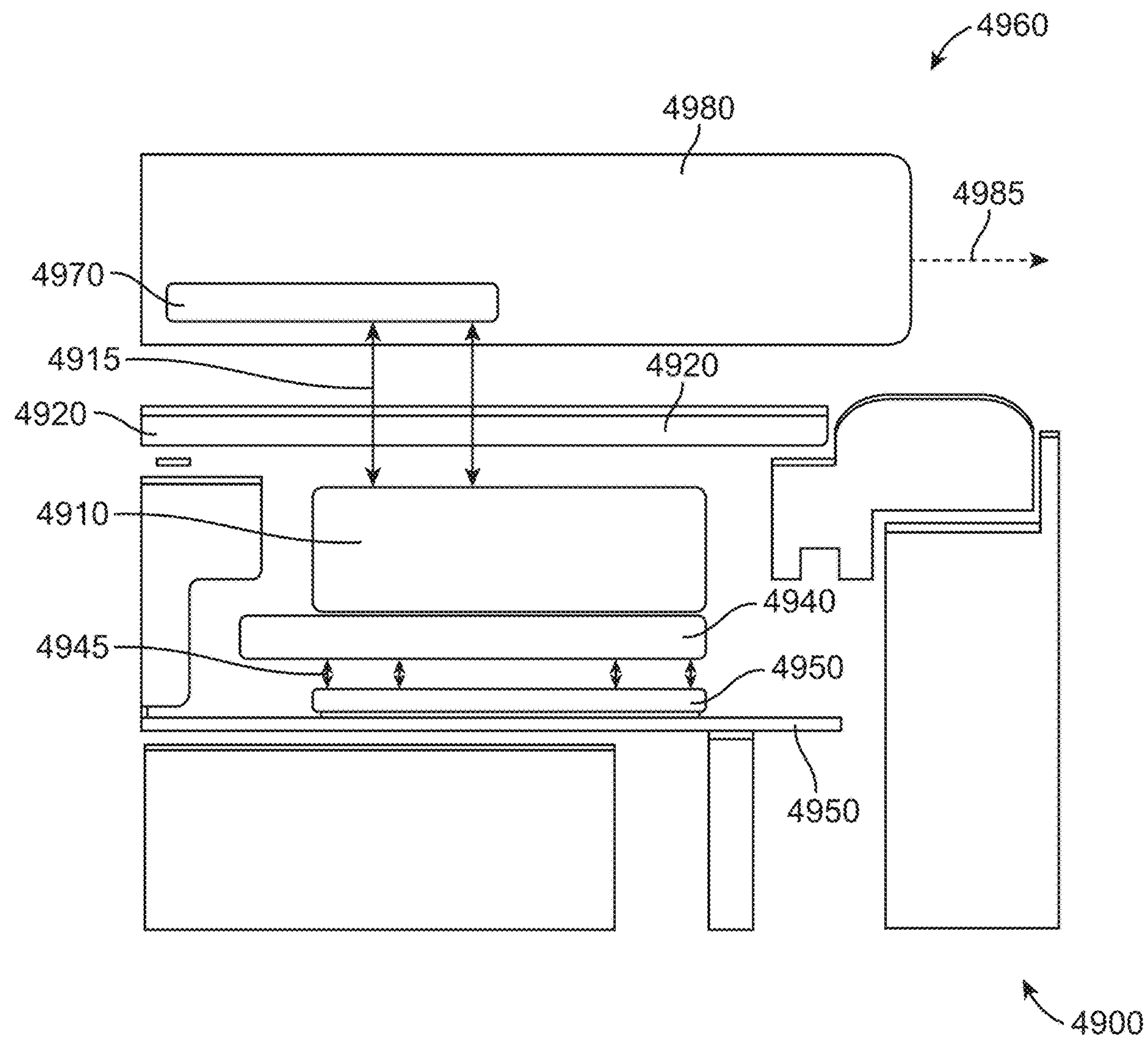
Figure 51:
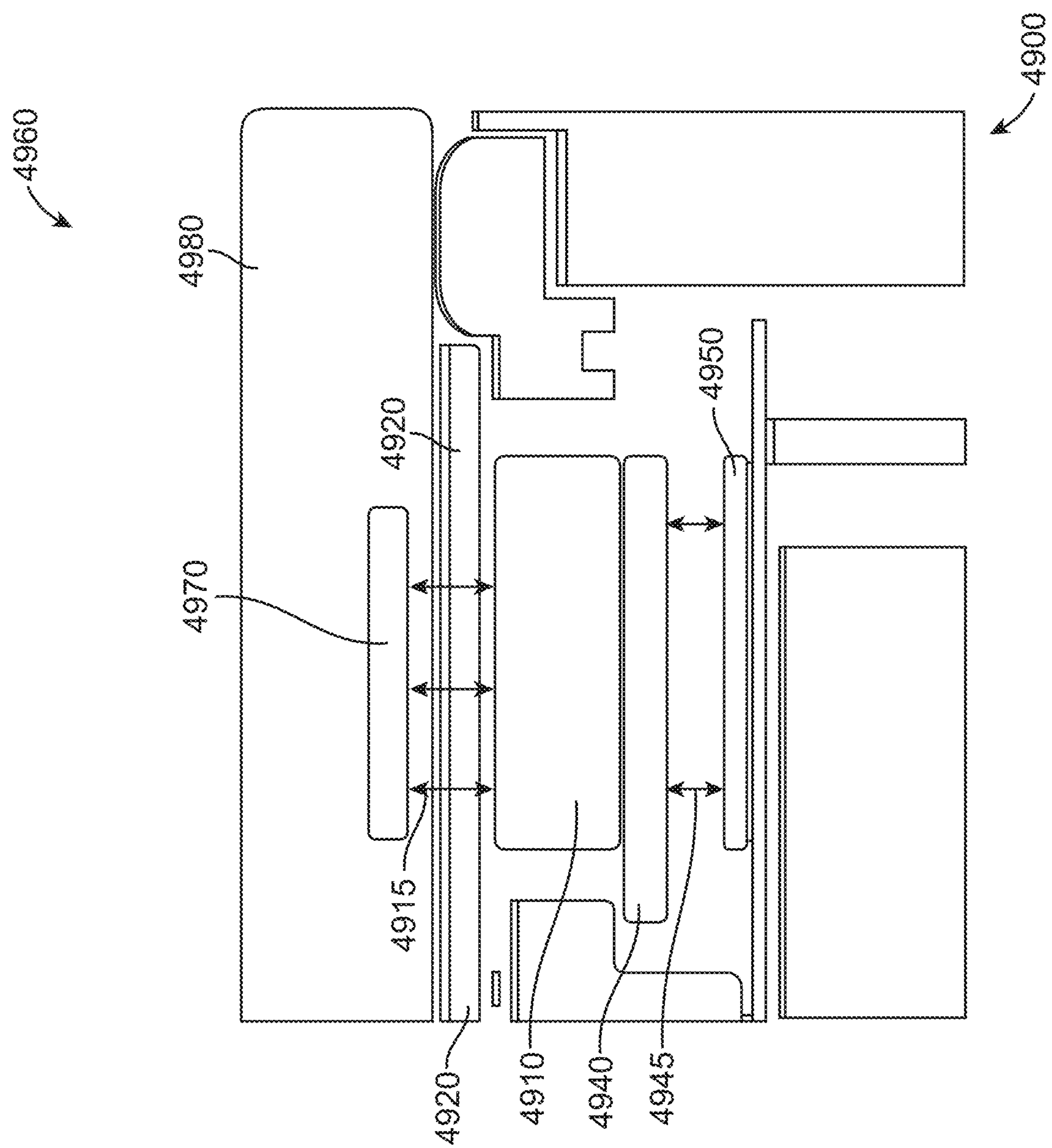

FIGS. 49 through FIG. 51 illustrate a moving magnetic structure according to an embodiment of the present invention. In this example, first electronic device 4900 can be a wireless charger, such as any of the wireless chargers shown herein, or other device having a magnet 4910 (which can be, e.g., any of the annular or other magnetic alignment components such as the magnet arrays and alignment magnets described above), while second electronic device 4890 (shown in FIG. 50) can be a phone or other electronic device. In FIG. 49, first magnet 4910 and shield 4940 can be magnetically attracted or attached to return plate 4950 in first electronic device 4900. First electronic device 4900 can be at least partially housed in device enclosure 4920. In FIG. 50, housing 4980 of second electronic device 4960 can move laterally across a surface of device enclosure 4920 of first electronic device 4900 in a direction 4985. Second magnet 4970 in second electronic device 4960 can begin to attract first magnet 4910 in first electronic device 4900. This magnetic attraction 4915 can cause first magnet 4910 and shield 4940 to pull away from return plate 4950 by overcoming the magnetic attraction 4945 between shield 4940 and return plate 4950. In FIG. 51, second magnet 4970 in second electronic device 4960 has become aligned with first magnet 4910 in first electronic device 4900. First magnet 4910 and shield 4940 have pulled away from return plate 4950 thereby reducing the magnetic attraction 4945. First magnet 4910 has moved nearby or adjacent to device enclosure 4920, thereby increasing the magnetic attraction 4915 to second magnet 4970 in second electronic device 4960.

As shown in FIG. 49 through FIG. 51, the magnetic attraction between first magnet 4910 in first electronic device 4900 and the second magnet 4970 in the second electronic device 4960 can increase when first magnet 4910 and shield 4940 pull away from return plate 4950. This is shown graphically in the following figures.

Figure 52:
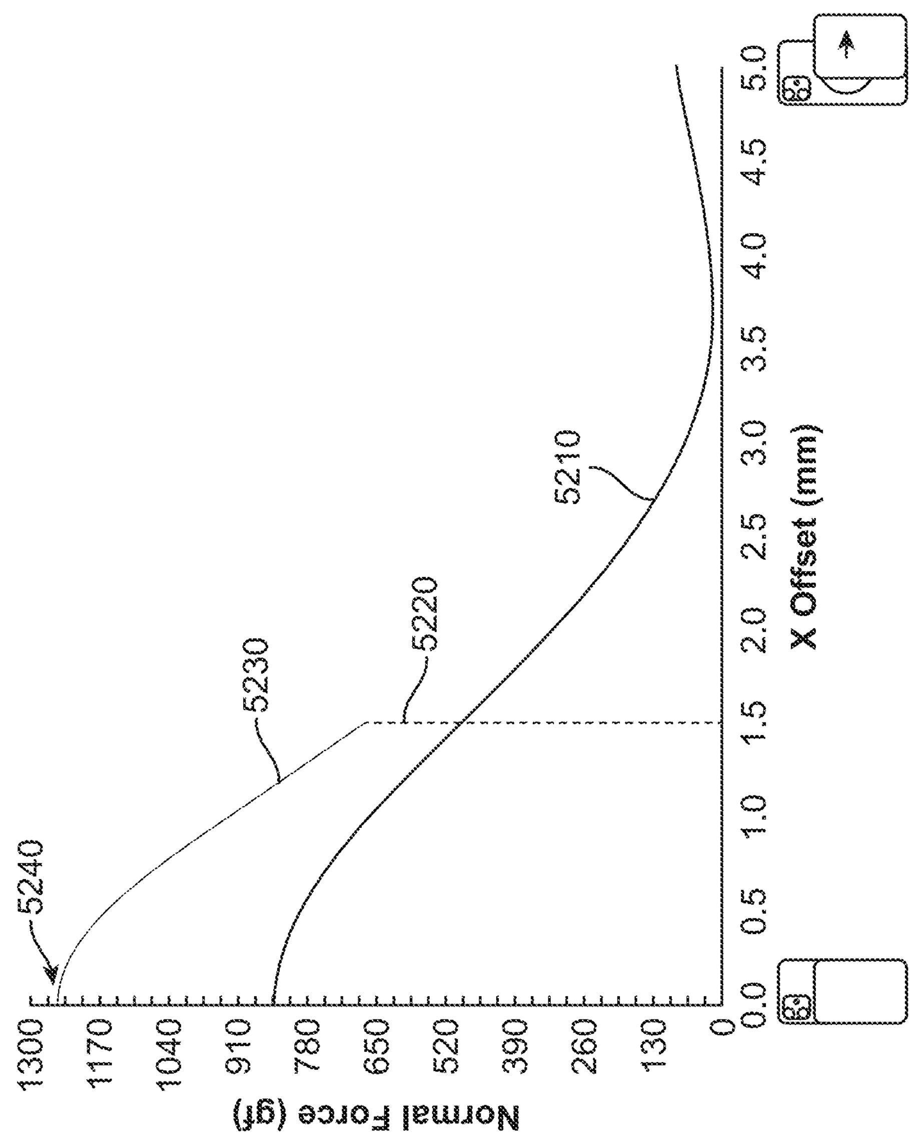
FIG. 52 illustrates a normal force between a first magnet in a first electronic device and a second magnet in a second electronic device.

FIG. 52 illustrates a normal force between a first magnet in first electronic device and a second magnet in a second electronic device as a function of a lateral offset between them. As shown in FIG. 49 through FIG. 51, with a large offset between first magnet 4910 and second magnet 4970, first magnet 4910 and shield 4940 can remain attached to return plate 4950 in first electronic device 4900 and the magnetic attraction 4915 can be minimal. The shear force necessary to overcome this magnetic attraction is illustrated here as curve 5210. As shown in FIG. 50, as the offset or lateral distance between first magnet 4910 and second magnet 4970 decreases, first magnet 4910 and shield 4940 can pull away or separate from return plate 4950, thereby increasing the magnetic attraction 4915 between first magnet 4910 and second magnet 4970. This is illustrated here as discontinuity 5220. As shown in FIG. 51, as first magnet 4910 and second magnet 4970 come into alignment, the magnetic attraction 4915 increases along curve 5230 to a maximum 5240. The difference between curve 5210 and curve 5230 can show the increase in magnetic attraction between a phone or other electronic device, such as second electronic device 4960 and a wireless charger, such as first electronic device 4900, that results from first magnet 4910 being able to move axially. It should also be noted that in this example first magnet 4910 does not move in a lateral direction, though in other embodiments of the present invention, it is capable of such movement. Where first magnet 4910 is capable of moving in a lateral direction, curve 5230 can have a flattened peak from an offset of zero to an offset that can be overcome by a range of possible lateral movement of first magnet 4910.

Figure 53:
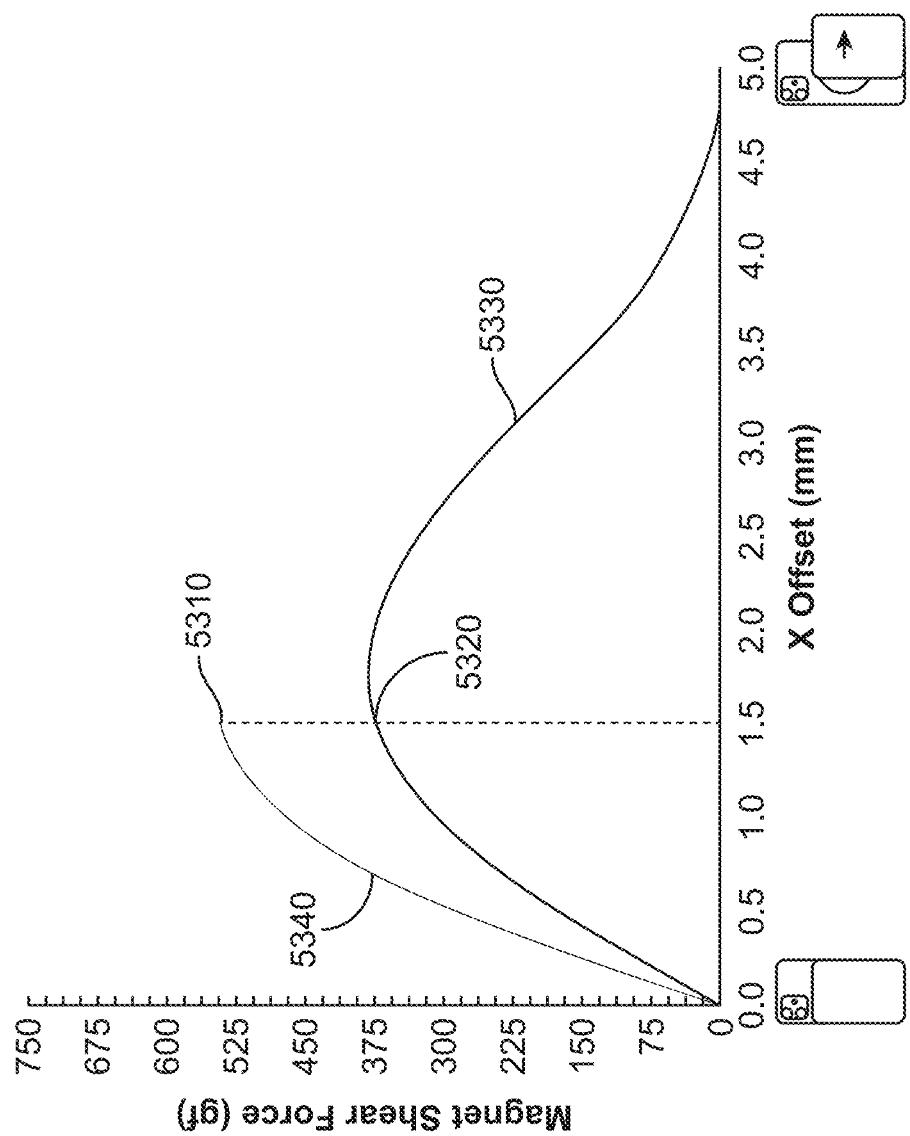
FIG. 53 illustrates a shear force between a first magnet in a first electronic device and a second magnet in a second electronic device.

FIG. 53 illustrates a shear force between a first magnet in a first electronic device and a second magnet in a second electronic device as a function of a lateral offset between them. With no offset between first magnet 4910 and second magnet 4970, there it is no shear force to move second magnet 4970 relative to first magnet 4910, as shown in FIG. 51. As the offset is increased, the shear force, that is the force attempting to realign the magnets, can increase along curve 5340. At discontinuity 5310, first magnet 4910 and shield 4940 can return to return plate 4950 (as shown in FIG. 49 and FIG. 50), thereby decreasing the magnetic shear force to point 5320. The magnetic shear force can continue to drop off along curve 5330 as the offset increases. The difference between curve 5330 and curve 5340 can show the increase in magnetic attraction between a phone or other electronic device, such as second electronic device 4960 and wireless charger, such as first electronic device 4900, that results from first magnet 4910 being able to move axially. It should also be noted that in this example first magnet 4910 does not move in a lateral direction, though in other examples it is capable of such movement. Where first magnet 4910 is capable of moving in a lateral direction, curve 5330 can remain at zero until the lateral movement of the second magnet 4970 overcomes the range of possible lateral movement of first magnet 4910.

For various applications, it may be desirable to enable a device having a magnetic alignment component to identify other devices that are brought into alignment. In some embodiments where the devices support a wireless charging standard that defines a communication protocol between devices, the devices can use that protocol to communicate. For example, the Qi standard for wireless power transfer defines a communication protocol that enables a power-receiving device (i.e., a device that has an inductive coil to receive power transferred wirelessly) to communicate information to a power-transmitting device (i.e., a device that has an inductive coil to generate time-varying magnetic fields to transfer power wirelessly to another device) via a modulation scheme in the inductive coils. The Qi communication protocol or similar protocols can be used to communicate information such as device identification or charging status or requests to increase or decrease power transfer from the power-receiving device to the power-transmitting device.

In some embodiments, a separate communication subsystem, such as an NFC subsystem can be provided to enable additional communication between devices. For example, each device that has an annular magnetic alignment component can also have an NFC coil that can be disposed inside and concentric with the annular magnetic alignment component. Where the device also has an inductive charging coil (which can be a transmitter coil or a receiver coil), the NFC coil can be disposed in a gap between the inductive charging coil and an annular magnetic alignment component. In some embodiments, the NFC coils can be used to allow a portable electronic device to identify other devices, such as a wireless charging device and/or an auxiliary device, when the respective magnetic alignment components of the devices are brought into alignment. For example, the NFC coil of a power-receiving device can be coupled to an NFC reader circuit while the NFC coil of a power-transmitting device or an accessory device is coupled to an NFC tag circuit. When devices are brought into proximity, the NFC reader circuit of the power-receiving device can be activated to read the NFC tag of the power-transmitting device and/or the accessory device. In this manner, the power-receiving device can obtain information (e.g., device identification) from the power-transmitting device and/or the accessory device.

In some embodiments, an NFC reader in a portable electronic device can be triggered by detecting a change in the DC (or static) magnetic field generated by the magnetic alignment component of the portable electronic device that corresponds to a change expected when another device with a complementary magnetic alignment component is brought into alignment. When the expected change is detected, the NFC reader can be activated to read an NFC tag in the other device, assuming the other device is present.

In some embodiments, an NFC tag may be located in a device that includes a wireless charger and an annular alignment structure. The NFC tag can be positioned and configured such that when the wireless charger device is aligned with a portable device having a complementary annular alignment structure and an NFC reader, the NFC tag is readable by the NFC reader of the portable electronic device.

Figure 54:
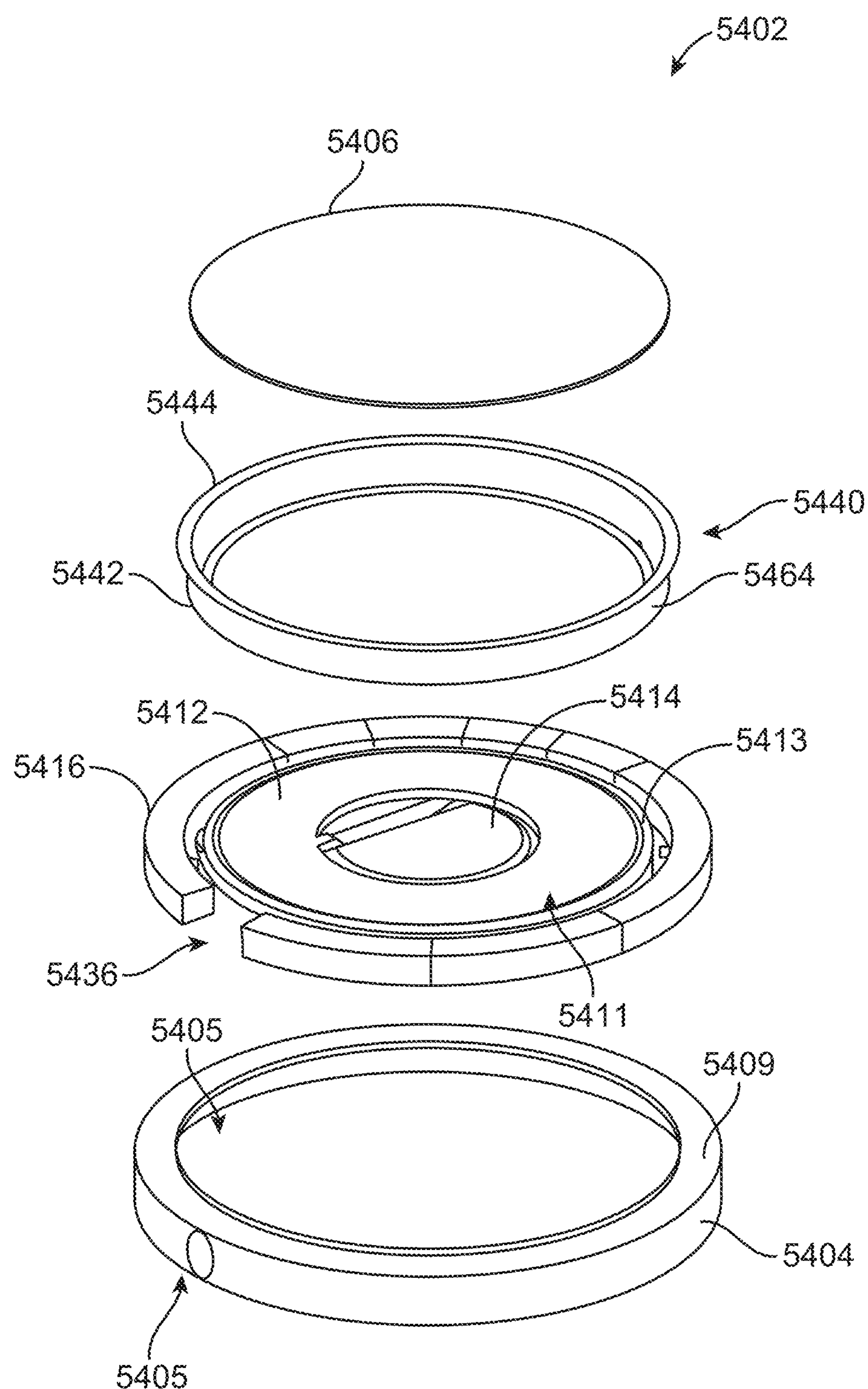
FIG. 54 shows an exploded view of a wireless charger device incorporating an NFC tag circuit according to some embodiments.
Figure 55:
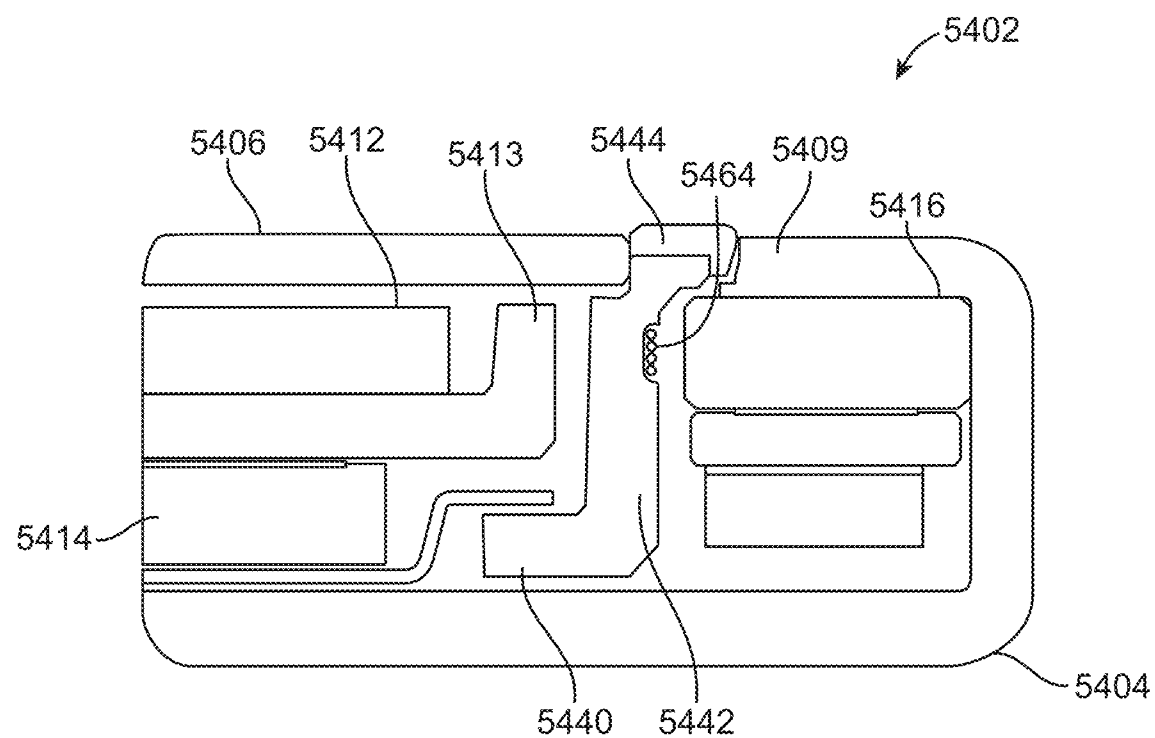
FIG. 55 shows a partial cross-section view of a wireless charger device according to some embodiments.

FIG. 54 shows an exploded view of a wireless charger device 5402 incorporating an NFC tag according to some embodiments, and FIG. 55 shows a partial cross-section view of wireless charger device 5402 according to some embodiments. As shown in FIG. 54, wireless charger device 5402 can include an enclosure 5404, which can be made of plastic or metal (e.g., aluminum), and a charging surface 5406, which can be made of silicone, plastic, glass, or other material that is permeable to AC and DC magnetic fields. Charging surface 5406 can be shaped to fit within a circular opening 5403 at the top of enclosure 5404.

A wireless transmitter coil assembly 5411 can be disposed within enclosure 5404. Wireless transmitter coil assembly 5411 can include a wireless transmitter coil 5412 for inductive power transfer to another device as well as AC magnetic and/or electric shield(s) 5413 disposed around some or all surfaces of wireless transmitter coil 5412. Control circuitry 5414 (which can include, e.g., a logic board and/or power circuitry) to control wireless transmitter coil 5412 can be disposed in the center of coil 5412 and/or underneath coil 5412. In some embodiments, control circuitry 5414 can operate wireless transmitter coil 5412 in accordance with a wireless charging protocol such as the Qi protocol or other protocols.

A primary annular magnetic alignment component 5416 can surround wireless transmitter coil assembly 5411. Primary annular magnetic alignment component 5416 can include a number of arcuate magnet sections arranged in an annular configuration as shown. Each arcuate magnet section can include an inner arcuate region having a magnetic polarity oriented in a first axial direction, an outer arcuate region having a magnetic polarity oriented in a second axial direction opposite the first axial direction, and a central arcuate region that is not magnetically polarized. In some embodiments, the diameter and thickness of primary annular magnetic alignment component 5416 is chosen such that arcuate magnet sections of primary annular magnetic alignment component 5416 fit under a lip 5409 at the top surface of enclosure 5404, as best seen in FIG. 55. For instance, each arcuate magnet section can be inserted into position under lip 5409, either before or after magnetizing the inner and outer regions. In some embodiments, primary annular magnetic alignment component 5416 can have a gap 5436 between two adjacent arcuate magnet sections. Gap 5436 can be aligned with an opening 5407 in a side surface of enclosure 5404 to allow external wires to be connected to wireless transmitter coil 5412 and/or control circuitry 5414.

A support ring subassembly 5440 can include an annular frame 5442 that extends in the axial direction and a friction pad 5444 at the top edge of frame 5442. Friction pad 5444 can be made of a material such as silicone or thermoplastic elastomers (TPE) such as thermoplastic urethane (TPU) and can provide support and protection for charging surface 5406. Frame 5442 can be made of a material such as polycarbonate (PC), glass-fiber reinforced polycarbonate (GFPC), or glass-fiber reinforced polyamide (GFPA). Frame 5442 can have an NFC coil 5464 disposed thereon. For example, NFC coil 5464 can be a four-turn or five-turn solenoidal coil made of copper wire or other conductive wire that is wound onto frame 5442. In some embodiments, NFC coil 5464 can be electrically connected to NFC tag circuitry (not shown) that can be disposed on frame 5442. The relevant design principles of NFC circuits are well understood in the art and a detailed description is omitted. Frame 5442 can be inserted into a gap region 5417 between primary annular magnetic alignment component 5416 and wireless transmitter coil assembly 5411. In some embodiments, gap region 5417 is shielded by AC shield 5413 from AC electromagnetic fields generated in wireless transmitter coil 5412 and is also shielded from DC magnetic fields of primary annular magnetic alignment component 5416 by the closed-loop configuration of the arcuate magnet sections.

Figure 56:
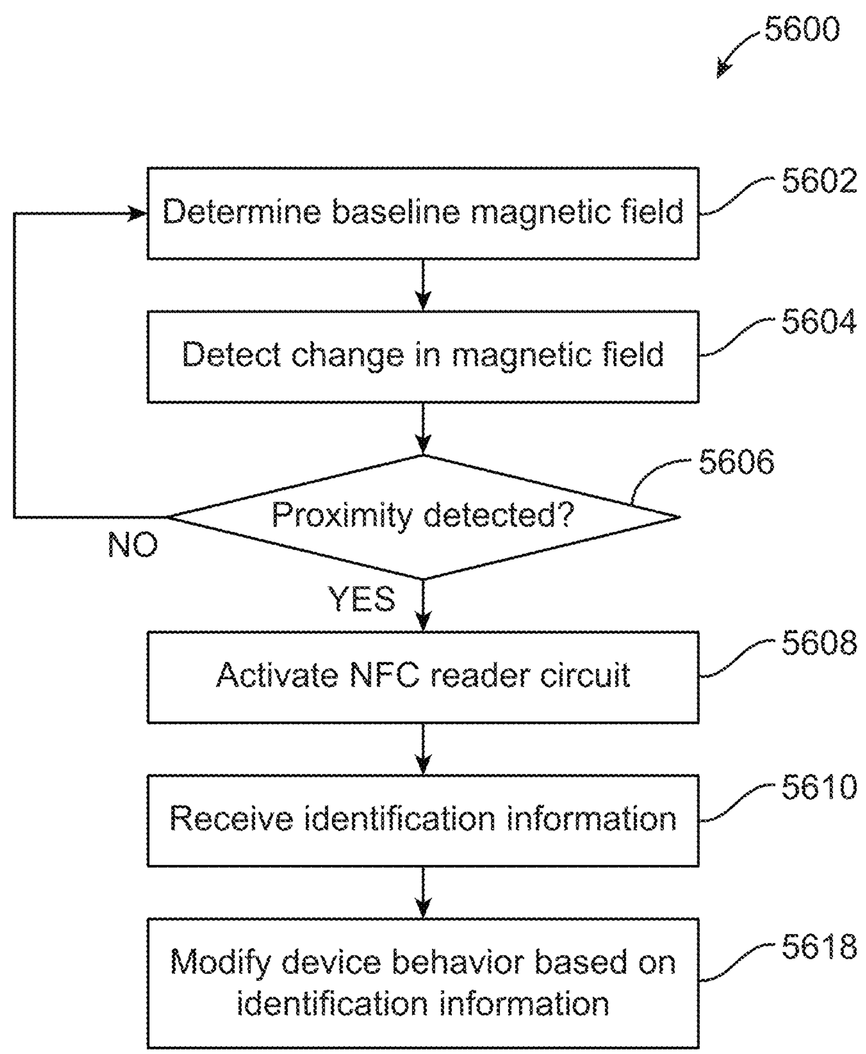
FIG. 56 shows a flow diagram of a process that can be implemented in a portable electronic device according to some embodiments.

FIG. 56 shows a flow diagram of a process 5600 that can be implemented in portable electronic device 5004 according to some embodiments. In some embodiments, process 5600 can be performed iteratively while portable electronic device 5004 is powered on. At block 5602, process 5600 can determine a baseline magnetic field, e.g., using magnetometer 5080. At block 5604, process 5600 can continue to monitor signals from magnetometer 5080 until a change in magnetic field is detected. At block 5606, process 5600 can determine whether the change in magnetic field matches a magnitude and direction of change associated with alignment of a complementary magnetic alignment component. If not, then the baseline magnetic field can be updated at block 5602. If, at block 5606, the change in magnetic field matches a magnitude and direction of change associated with alignment of a complementary alignment component, then at block 5608, process 5600 can activate the NFC reader circuitry associated with NFC coil 5060 to read an NFC tag of an aligned device. At block 5610, process 5600 can receive identification information read from the NFC tag. At block 5612, process 5600 can modify a behavior of portable electronic device 5004 based on the identification information, for example, generating a color wash effect as described above. After block 5612, process 5600 can optionally return to block 5602 to provide continuous monitoring of magnetometer 5080. It should be understood that process 5600 is illustrative and that other processes may be performed in addition to or instead of process 5600.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A wireless charger for an electronic device, the wireless charger comprising:
- a base having a passage, the passage defined by an inner sidewall extending from a top surface of the base to a bottom surface of the base;
- a wireless charging assembly comprising:
  - a housing including an enclosure covered by a cap, the cap forming a charging surface; and
  - a magnet array in the housing;
- a hinge comprising:
  - a stem having a sleeve having an opening at a first end, the stem further comprising a joining portion having a first end attached to the sleeve and a second end attached to the wireless charging assembly;
  - a first support block attached to the base and having a slot;
  - a first shaft having a first end inserted into the opening at the first end of the sleeve and a second end supported by the first support block; and
  - a first clip having a loop portion around the first shaft and a tab attached to a first end of the loop portion, the tab in the slot in the first support block.

2. The wireless charger of claim 1 wherein the opening at the first end of the sleeve is cylindrical, the first shaft is cylindrical, and the sleeve further comprises a cylindrical opening at a second end, wherein the hinge further comprises:
- a second support block attached to the base and having a slot;
- a second cylindrical shaft having a first end inserted into the opening at the second end of the sleeve and a second end supported by the second support block; and
- a second clip having a loop portion around the second cylindrical shaft and a tab attached to a first end of the loop portion, the tab in the slot in the second support block.

3. The wireless charger of claim 2 wherein the wireless charging assembly is movable between down position in which the wireless charging assembly is disposed within the passage and an up position in which the wireless charging assembly extends outside the base.

4. The wireless charger of claim 3 wherein as the wireless charging assembly moves from the down position to the up position, the loop portion of the first clip loosens around the first shaft and as the wireless charging assembly moves from the up position to the down position, the loop portion of the first clip tightens around the first shaft.

5. The wireless charger of claim 4 wherein the magnet array is movable within the wireless charging assembly to increase a magnetic attraction to a corresponding magnet array in the electronic device.

6. The wireless charger of claim 5 wherein the cap for the housing for the wireless charging assembly comprises a silicone layer over a polycarbonate layer.

7. The wireless charger of claim 6 wherein the enclosure for the wireless charging assembly comprises stainless steel.

8. The wireless charger of claim 6 wherein the enclosure for the wireless charging assembly comprises aluminum.

9. The wireless charger of claim 4 wherein the wireless charging assembly further comprises a first closure magnet and the base further comprises a second closure magnet, wherein when the wireless charging assembly is in the down position, the first closure magnet and the second closure magnet position the wireless charging assembly in the passage in the base.

10. The wireless charger of claim 4 wherein the wireless charging assembly further comprises a first closure magnet and the base further comprises a step, the step housing a second closure magnet, wherein when the wireless charging assembly is in the down position, the wireless charging assembly rests on the step, and the first closure magnet and the second closure magnet position the wireless charging assembly in the passage in the base.

11. The wireless charger of claim 4 wherein the wireless charging assembly further comprises a charging coil, the wireless charger further comprising:
- a wire to provide power to the charging coil, wherein the wire is routed through the sleeve and a slot in the stem of the hinge, wherein the hinge further comprises a cap over the slot in the stem of the hinge.

12. A wireless charger for an electronic device, the wireless charger comprising:
- a base having a passage, the passage defined by an inner sidewall extending from a top surface of the base to a bottom surface of the base;
- a wireless charging assembly comprising:
  - a housing including an enclosure covered by a cap, the cap forming a charging surface; and
  - a magnet array in the housing;
- a hinge comprising:
  - a stem having a sleeve having an opening at a first end, the stem further comprising a joining portion having a first end attached to the sleeve and a second end attached to the wireless charging assembly;
  - a first support block having a top surface attached to the base;
  - a first shaft having a first end inserted into the opening at the first end of the sleeve and a second end supported by the first support block; and
  - a first wrapped spring having a first end attached to a bottom surface of the first support block, the first wrapped spring wrapped around the first shaft.

13. The wireless charger of claim 12 wherein the opening at the first end of the sleeve is cylindrical, the first shaft is cylindrical, and the sleeve further comprises a cylindrical opening at a second end, wherein the hinge further comprises:
- a second support block having a top surface attached to the base;

a second cylindrical shaft having a first end inserted into the opening at the second end of the sleeve and a second end supported by the second support block; and a second wrapped spring having a first end attached to a bottom surface of the second support block, the second wrapped spring wrapped around the second cylindrical shaft.

14. The wireless charger of claim 13 wherein the first wrapped spring includes a tapered portion wherein the first wrapped spring narrows towards a second end.

15. The wireless charger of claim 14 wherein the wireless charging assembly is movable between down position in which the wireless charging assembly is disposed within the passage and an up position in which the wireless charging assembly extends outside the base.

16. The wireless charger of claim 15 wherein as the wireless charging assembly moves from the down position to the up position, the first wrapped spring loosens around the first shaft and as the wireless charging assembly moves from the up position to the down position, the first wrapped spring tightens around the first shaft.

17. The wireless charger of claim 15 wherein the magnet array is movable within the wireless charging assembly to increase a magnetic attraction to a corresponding magnet array in the electronic device.

18. The wireless charger of claim 12 wherein the wireless charging assembly further comprises a charging coil, the wireless charger further comprising:

a wire to provide power to the charging coil, wherein the wire is routed through the sleeve and a slot in the stem of the hinge, wherein the hinge further comprises a cap over the slot in the stem of the hinge.

19. A wireless charger for an electronic device, the wireless charger comprising:

a base having a passage, the passage defined by an inner sidewall extending from a top surface of the base to a bottom surface of the base;

a wireless charging assembly comprising:

a housing including an enclosure covered by a cap, the cap forming a charging surface; and a magnet array in the housing;

a hinge comprising:

a stem having a sleeve having an opening at a first end, the stem further comprising a joining portion having a first end attached to the sleeve and a second end attached to the wireless charging assembly;

a first support block attached to the base and having a slot;

a first shaft having a first end inserted into the opening at the first end of the sleeve and a second end supported by the first support block, the first shaft including a plurality of lengthwise slots; and a first plurality of bearings, each located in one of the slots in the first shaft, wherein each bearing in the first plurality of bearings is biased.

20. The wireless charger of claim 19 wherein the opening at the first end of the sleeve is cylindrical, the first shaft is cylindrical, and the wireless charging assembly further comprises a charging coil, the wireless charger further comprising:

a wire to provide power to the charging coil, wherein the wire is routed through the sleeve and a slot in the stem of the hinge, wherein the hinge further comprises a cover over the slot in the stem of the hinge.

* * * * *